(12) United States Patent
Shibata et al.

(10) Patent No.: US 11,412,767 B2
(45) Date of Patent: Aug. 16, 2022

(54) LIQUID OR SEMI-SOLID EMULSION SEASONING, METHOD FOR MANUFACTURING SAME AND FLAVOR IMPROVING METHOD

(71) Applicant: MIZKAN HOLDINGS CO., LTD., Aichi (JP)

(72) Inventors: Eri Shibata, Aichi (JP); Minoru Takeuchi, Aichi (JP); Hideaki Taguchi, Aichi (JP)

(73) Assignee: Mizkan Holdings Co., Ltd., Aichi (JP)

( * ) Notice: Subject to any disclaimer, the term of this patent is extended or adjusted under 35 U.S.C. 154(b) by 103 days.

(21) Appl. No.: 16/798,933

(22) Filed: Feb. 24, 2020

(65) Prior Publication Data

US 2020/0205455 A1 Jul. 2, 2020

Related U.S. Application Data

(63) Continuation of application No. PCT/JP2018/030872, filed on Aug. 21, 2018.

(30) Foreign Application Priority Data

Aug. 24, 2017 (JP) .............................. JP2017-161410

(51) Int. Cl.
*A23L 27/00* (2016.01)
*A23L 33/24* (2016.01)
(Continued)

(52) U.S. Cl.
CPC ............... *A23L 27/80* (2016.08); *A23L 27/10* (2016.08); *A23L 27/2028* (2016.08);
(Continued)

(58) Field of Classification Search
CPC .......... A23L 27/80; A23L 33/24; A23L 33/22; A23L 27/60; A23L 27/10; A23L 27/2028
(Continued)

(56) References Cited

U.S. PATENT DOCUMENTS

| 5,462,761 | A | 10/1995 | McGinley et al. |
| 5,690,981 | A | 11/1997 | Watanabe et al. |

(Continued)

FOREIGN PATENT DOCUMENTS

| EP | 3539389 A1 | 9/2019 |
| JP | 0358770 A | 3/1991 |

(Continued)

OTHER PUBLICATIONS

Translation of JP-2012110244-A (Year: 2012).*

(Continued)

*Primary Examiner* — Brent T O'Hern
(74) *Attorney, Agent, or Firm* — Osha Bergman Watanabe & Burton LLP

(57) ABSTRACT

A liquid or semisolid emulsion seasoning may include fine food particles comprising dietary fibers, a fat or oil, an organic acid, and a food-derived emulsifier. The dietary fibers may include a water-soluble dietary fiber and a water-insoluble dietary fiber. The emulsion seasoning may contain the dietary fibers in a total amount of 0.8% to 23% by mass. The fine food particles may have a modal diameter of 0.3 μm to 115 μm, and the emulsion seasoning may have a water content of 20% by mass or more.

10 Claims, 11 Drawing Sheets

(51) Int. Cl.
  *A23L 33/22* (2016.01)
  *A23L 27/60* (2016.01)
  *A23L 27/10* (2016.01)
  *A23L 27/20* (2016.01)
(52) U.S. Cl.
  CPC .............. *A23L 27/60* (2016.08); *A23L 33/22* (2016.08); *A23L 33/24* (2016.08)
(58) Field of Classification Search
  USPC ........................................................ 426/605
  See application file for complete search history.

(56) References Cited

U.S. PATENT DOCUMENTS

| | | |
|---|---|---|
| 6,495,190 B1 | 12/2002 | Yaginuma et al. |
| H2095 H | 1/2004 | Young |
| 2002/0160094 A1 | 10/2002 | Belmar et al. |
| 2005/0089621 A1 | 4/2005 | Aquino et al. |
| 2005/0249861 A1 | 11/2005 | Shimazaki et al. |
| 2010/0119650 A1 | 5/2010 | Moca et al. |
| 2013/0260008 A1* | 10/2013 | Bialek ............... A23L 11/05 426/602 |

FOREIGN PATENT DOCUMENTS

| | | | |
|---|---|---|---|
| JP | H1146722 A | | 2/1999 |
| JP | 200234503 A | | 2/2002 |
| JP | 2008073007 A | | 4/2008 |
| JP | 2008115143 A | | 5/2008 |
| JP | 200955861 A | | 3/2009 |
| JP | 2009125002 A | | 6/2009 |
| JP | 2009189345 A | | 8/2009 |
| JP | 2011193762 A | | 10/2011 |
| JP | 2011239725 A | * | 12/2011 |
| JP | 2011239725 A | | 12/2011 |
| JP | 2012110244 A | * | 6/2012 |
| JP | 2012110244 A | | 6/2012 |
| JP | 2016106584 A | | 6/2016 |
| JP | 201712194 A | | 1/2017 |
| JP | 201777219 A | | 4/2017 |
| JP | 201799308 A | | 6/2017 |
| WO | 2006082640 A1 | | 8/2006 |
| WO | 2013122127 A1 | | 8/2013 |
| WO | 2014001031 A1 | | 1/2014 |
| WO | 2017080872 A1 | | 5/2017 |
| WO | 2018155488 A1 | | 8/2018 |
| WO | 2019039478 A1 | | 2/2019 |

OTHER PUBLICATIONS

Translation of JP-2011239725-A (Year: 2011).*
Aleksandra Torbica, et al., "Nutritional, rheological, and sensory evaluation of tomato ketchup with increased content ol natural fibres made from fresh tomato pomace", Food and Bioproducts Processing, vol. 98, Mar. 2, 2016, pp. 299-309 (11 pages).
European Search Report issued in corresponding European Application No. 18848801.9, dated May 13, 2020 (6 pages).
"Dipping sauce with almond milk," Mar. 27, 2017 (8 pages).
"Dense almond Milk," Tsukuba Dairy Products, Co., Ltd., Jun. 5, 2017 (6 pages).
Test Report dated Mar. 10, 2020 (4 pages).
Kikkoman's Wagaya-wa-Yakiniku-ya-san (Our Family is a Yakiniku Restaurant), W Rich, Salty sauce, Jun. 16, 2017 (3 pages).
Kikkoman, Yakiniku-ya-san (Yakiniku Restaurant), Salty sauce, 370 g, retrieved Apr. 10, 2020 (4 pages).
Kikkoman's Yakiniku-sa-san (Yakiniku Restaurant), Salty sauce, Jun. 19, 2012 (5 pages).
Yakiniku Cheers, Rich salty sauce, Jun. 30, 2017 (3 pages).
"Standard Tables of Food Composition in Japan," 7th revised, Dec. 25, 2015 (8 pages).
"Popular antiaging beverage, "Almond milk", close interview with its instigator!" May 12, 2014 (12 pages).
Shiori's "Wish to make for you", Almond Effect Recipe, "Cold DanDanMian Noodles," Apr. 10, 2017 (4 pages).
"Almond Effect / Almond Effect Calorie light," retrieved Apr. 10, 2020 (4 pages).
Ezaki Glico, Almond Effect, 1L, the lowest price, Mar. 28, 2016 (2 pages).
"Low sugar Almond milk, sesame sauce," retrieved Apr. 10, 2020 (2 pages).
Tomato cream soup pasta with Almond Milk, Dec. 1, 2014 (8 pages).
Stewed tomato sauce, 2 kg, Sep. 8, 2016 (3 pages).
Hikari Foods, Organic tomato sauce, light tomato flavor, 365 g, Apr. 12, 2010 (5 pages).
Delmonte's Basic fully matured tomato sauce, Apr. 20, 2017 (3 pages).
"Dispersion state of emulsion by using miso as an emulsifier," The Japan Society of Home Economics, Feb. 15, 1992, vol. 43, No. 2, pp. 159-163 (7 pages).
Notice of Opposition filed by a third-party in corresponding Japanese Patent No. 6589150; dated Apr. 15, 2020 (51 pages) with partial translation.
International Search Report issued in corresponding International Application No. PCT/JP2018/030872; dated Nov. 20, 2018 (2 pages).
Written Opinion of the International Searching Authority issued in corresponding International Application No. PCT/JP2018/030872; dated Nov. 20, 2018 (7 pages).
Redondo-Cuenca. A. et al., "Chemical composition and dietary fibre of yellow and green commercial soybeans (Glycine max)", Food Chemistry 101 (3) 2006, pp. 1216-1222 (7 pages).
Middelbos, IS and Fahey, GC, Soybean Carbohydrates. Chapter 9 of "Soybeans Chemistry, Production, Processing, and Utilization", 2008, pp. 269-296 (including front page and copyright page (D4a and D4b) (30 pages).
F. Guillon and M. M.-J. Champ, "Carbohydrate fractions of legumes: uses in human nutrition and potential for health", British Journal of Nutrition, 2002.88, Supl. 3, S292-S306 (14 pages).
Alejandra Castro, et al., "Parsnip (Pastinaca sativa L.): Dietary fibre composition and physicochemical characterization of its homogenized suspensions", Food Research International, vol. 48, Issue 2, Oct. 2012, pp. 598-608; (11 pages).
Abstract "Amount of dietary fiber contained in vegetables", derived from website https:www.otsuka.co.jp/en/health-and-illness/fiber/intake/foods-amount/, presenting information from the "Standard Tables of Food Composition in Japan 2010-Minisry of Education, Culture, Sports, Science and Technology" (4 pages).
Communication of a notice of opposition issued by the EPO dated May 13, 2022 including Notice of Opposition by a third party filed with the EPO on May 4, 2022 (25 pages).

* cited by examiner

| ELAPSED TIME (MIN) | WATER ABSORPTION RATE (% BY MASS PER GRAM OF SAMPLE) | | | |
|---|---|---|---|---|
| | COMPARATIVE EXAMPLE 1 (EGG USED, WITHOUT THICKENER) | COMPARATIVE EXAMPLE 2 (SOYBEAN USED, WITHOUT THICKENER) | COMPARATIVE EXAMPLE 3 (STARCH USED, WITH THICKENER) | TEST EXAMPLE 1-1 (SOYBEAN USED, WITHOUT THICKENER) |
| 0 | 0.00 | 0.00 | 0.00 | 0.00 |
| 1 | 0.10 | -0.98 | 0.32 | 0.14 |
| 2 | 0.08 | -1.42 | 0.34 | 0.14 |
| 3 | 0.06 | -1.82 | 0.34 | 0.08 |
| 5 | 0.06 | -2.70 | 0.36 | 0.06 |
| 10 | 0.06 | -3.70 | 0.40 | 0.06 |
| 15 | 0.04 | -4.42 | 0.42 | 0.06 |
| 20 | 0.04 | -4.82 | 0.44 | 0.06 |
| 30 | 0.04 | -5.54 | 0.48 | 0.06 |
| 40 | 0.04 | -6.18 | 0.50 | 0.06 |
| 50 | 0.04 | -6.76 | 0.50 | 0.06 |
| 60 | 0.04 | -7.16 | 0.50 | 0.04 |
| 90 | 0.02 | -8.10 | 0.50 | 0.02 |

| ELAPSED TIME (MIN) | OIL ABSORPTION RATE (% BY MASS PER GRAM OF SAMPLE) | | | |
|---|---|---|---|---|
| | COMPARATIVE EXAMPLE 1 (EGG USED, WITHOUT THICKENER) | COMPARATIVE EXAMPLE 2 (SOYBEAN USED, WITHOUT THICKENER) | COMPARATIVE EXAMPLE 3 (STARCH USED, WITH THICKENER) | TEST EXAMPLE 1-1 (SOYBEAN USED, WITHOUT THICKENER) |
| 0 | 0.00 | 0.00 | 0.00 | 0.00 |
| 1 | 0.20 | 0.68 | 0.58 | 0.82 |
| 2 | 0.48 | 0.86 | 0.90 | 0.90 |
| 3 | 0.46 | 0.90 | 0.92 | 0.96 |
| 5 | 0.44 | 0.98 | 0.96 | 1.00 |
| 10 | 0.42 | 0.96 | 1.02 | 1.02 |
| 15 | 0.40 | 0.92 | 1.02 | 1.04 |
| 20 | 0.40 | 0.88 | 1.04 | 1.06 |
| 30 | 0.38 | 0.82 | 1.04 | 1.06 |
| 40 | 0.36 | 0.76 | 1.04 | 1.08 |
| 50 | 0.34 | 0.72 | 1.04 | 1.08 |
| 60 | 0.32 | 0.68 | 1.04 | 1.08 |
| 90 | 0.28 | 0.62 | 1.00 | 1.06 |

| ELAPSED TIME (MIN) | WATER ABSORPTION RATE (% BY MASS PER GRAM OF SAMPLE) | | | |
|---|---|---|---|---|
| | COMPARATIVE EXAMPLE 30 (WITHOUT THICKENER) | COMPARATIVE EXAMPLE 31 (WITHOUT THICKENER) | COMPARATIVE EXAMPLE 32 (WITH THICKENER) | TEST EXAMPLE 41 (WITHOUT THICKENER) |
| 0 | 0.00 | 0.00 | 0.00 | 0.00 |
| 1 | 0.00 | 0.00 | 0.00 | 0.00 |
| 2 | 0.24 | -0.16 | 0.18 | -0.02 |
| 3 | 0.28 | -0.30 | 0.14 | -0.04 |
| 5 | 0.24 | -0.44 | 0.00 | -0.04 |
| 10 | 0.20 | -0.69 | -0.08 | -0.22 |
| 15 | 0.10 | -0.93 | -0.14 | -0.32 |
| 20 | 0.02 | -1.19 | -0.19 | -0.42 |
| 30 | -0.06 | -1.50 | -0.25 | -0.56 |
| 40 | -0.10 | -1.76 | -0.31 | -0.64 |
| 50 | -0.12 | -1.96 | -0.37 | -0.72 |
| 60 | -0.16 | -2.16 | -0.43 | -0.78 |
| 90 | -0.26 | -2.61 | -0.60 | -0.96 |

| ELAPSED TIME (MIN) | OIL ABSORPTION RATE (% BY MASS PER GRAM OF SAMPLE) | | | |
|---|---|---|---|---|
| | COMPARATIVE EXAMPLE 30 (WITHOUT THICKENER) | COMPARATIVE EXAMPLE 31 (WITHOUT THICKENER) | COMPARATIVE EXAMPLE 32 (WITH THICKENER) | TEST EXAMPLE 41 (WITHOUT THICKENER) |
| 0 | 0.00 | 0.00 | 0.00 | 0.00 |
| 1 | 0.84 | 0.60 | 0.98 | 0.51 |
| 2 | 0.90 | 0.46 | 0.90 | 1.36 |
| 3 | 1.02 | 0.40 | 0.86 | 1.26 |
| 5 | 0.90 | 0.16 | 0.78 | 1.20 |
| 10 | 0.78 | -0.14 | 0.70 | 1.12 |
| 15 | 0.72 | -0.44 | 0.56 | 1.08 |
| 20 | 0.66 | -0.68 | 0.42 | 1.02 |
| 30 | 0.54 | -1.05 | 0.24 | 0.93 |
| 40 | 0.44 | -1.49 | 0.02 | 0.77 |
| 50 | 0.36 | -1.93 | -0.10 | 0.59 |
| 60 | 0.30 | -2.29 | -0.18 | 0.47 |
| 90 | 0.20 | -3.08 | -0.36 | 0.16 |

LIQUID OR SEMI-SOLID EMULSION SEASONING, METHOD FOR MANUFACTURING SAME AND FLAVOR IMPROVING METHOD

FIELD OF THE INVENTION

One or more embodiments of the present invention relate to a liquid or semi-solid emulsion condiment and a manufacturing method thereof and a method for flavor improvement.

BACKGROUND

Examples of liquid or semi-solid emulsion condiments include a dressing, a tomato-containing sauce, mayonnaise, mayonnaise-like condiment, and the like, in some of which an organic acid is used for acidification, or egg yolk, soybean, almond, or tomato paste having an emulsifying effect is used.

In addition, fat/oil is used therein which is indispensable as a liquid or semi-solid emulsion condiment.

However, these organic acids, egg yolk, soybean, almond, tomato paste, and fat/oil were sometimes averse to consumers due to the strong irritation derived from acid odor and sourness of the organic acids.

In egg yolks, their unique raw odors and unpleasant odors resembling sulfur odors were felt, and in soybeans, almonds, and tomato pastes, their blue odors and dirty odors were felt, which resulted in food repellency.

For fats/oils, the occurrence of oiliness per se, unpleasant odors peculiar to fats/oils, so-called "return odors (odors produced by the initial oxidation of oils)" may lead to eating repellent.

In addition, those containing all of these ingredients, such as mayonnaise, mayonnaise-like seasonings, and a tomato-containing sauce, may suffer from particularly strong eating aversion due to their sourness and acid odor, unpleasant flavor from eggs, soybeans, and almonds, oily oils, and return odors.

As a method of suppressing the acidity and acid odor of organic acids, a method of suppressing "vinegar corner" by adding a basic amino acid such as ornithine, citrulline, arginine, or the like or a salt thereof to foods and drinks that contain vinegar has been disclosed (Patent Literature 1).

Also disclosed is a method for blending powdered eggs with acidic liquid seasonings such as mayonnaise and dressings to suppress acidity (Patent Literature 2). In addition, methods have been disclosed in which a large amount of minute gas bubbles are stably contained in order to suppress acidity derived from vinegar of an acidic oil-in-water emulsified food (Patent Literature 3).

As a method of suppressing unpleasant flavor derived from egg yolk and soybean, a method of selecting and using a palm soft oil having a Y-value of 4 to 24 in a lobby bond colorimeter as a fat/oil to be used for an acidic oil-in-water seasoning containing egg and soybean is disclosed (Patent Literature 4).

Also disclosed is a method of using concentrated soybean milk at concentrations of 20 to 40 as a method of suppressing the bluish odor and goodness peculiar to soybean in mayonnaise-like foods using soybean milk (Patent Literature 5).

As a method of suppressing unpleasant odors derived from fats/oils, a method of causing a vegetable oil to contain roasted oil such as roasted sesame in an acidic seasoning is disclosed (Patent Literature 6).

As a method of suppressing the oiliness and odor of fat/oil in food, a method of containing triglycerides having medium chain fatty acids at 50 mass % or more based on the mass of edible fat/oil has been disclosed (Patent Literature 7).

[Patent Literature 1] JP-A-2008-73007
[Patent Literature 2] JP-A-2009-189345
[Patent Literature 3] JP-A-2009-125002
[Patent Literature 4] JP-A-2012-110244
[Patent Literature 5] JP-A-2002-34503
[Patent Literature 6] JP-A-2009-55861
[Patent Literature 7] JP-A-2017-12194

As described above, various technologies have been developed to suppress unpleasant flavors (taste and odor) derived from organic acids, food-derived emulsifiers (e.g., egg yolk, pulses, nuts/seeds, tomato paste), and condiments containing fats/oils.

However, a composite food containing various raw materials such as condiments tends to lose the favorable flavor (taste or flavor) inherent to the flavoring material included in the condiments due to the influence of various materials or treatments, and it may be difficult to provide certain artificial flavors, various miscellaneous tastes, and textures.

Therefore, there has been a strong demand for the development of a simpler and easier method.

SUMMARY

Therefore, one or more embodiments of the present invention aim to provide an emulsified flavoring agent which simultaneously suppresses unpleasant flavors (taste and smell) derived from organic acids, food-derived emulsifiers (e.g., egg yolk, pulses, seeds/nuts, tomato paste) and fats/oils, without sacrificing the preferred taste and flavor of the flavoring agent, and which sufficiently feels the preferred taste and flavor inherent to the flavoring agent, in a flavoring agent which contains organic acids, food-derived emulsifiers (e.g., egg yolk, legumes, seeds, tomato paste).

Further, one or more embodiments of the present invention provide an effect of improving texture, an effect of improving emulsion stability and shape retention (resistance to separation of oil and water), and an effect of improving taste of a food to be added.

As a result of intensive studies in view of the above-mentioned circumstances, the present inventors have focused on the effects of dietary fiber, which are not available in the prior art.

The present inventors have completed one or more embodiments of the present invention by further vigorously researching based on the above-mentioned finding.

Namely, one or more embodiments of the present invention may provide the following [1] to [20].

[1] A liquid or semisolid emulsion seasoning comprising fine food particles comprising dietary fibers, a fat/oil, an organic acid, and a food-derived emulsifier, wherein (1) the dietary fibers include (A1) a water-soluble dietary fiber and (A2) a water-insoluble dietary fiber, and a total amount thereof is 0.8% by mass or more and 23% by mass or less;

(2) the fine food particles have a modal diameter of 0.3 μm or more and 115 μm or less; and (3) a water content is 20% by mass or more.

[2] The emulsion seasoning according to [1], wherein the content ratio of the water-soluble dietary fiber (A1) to the water-insoluble dietary fiber (A2), (A1/A2), is 0.1 or more and 4 or less.

[3] The emulsion seasoning according to [1] or [2], wherein as the dietary fibers, the water-soluble dietary fiber (A1) is one or more selected from the group consisting of pectin, alginic acid, glucomannan, inulin, and fucoidan; and the water-insoluble dietary fiber (A2) is one or more selected from the group consisting of cellulose, hemicellulose, β-glucan, lignin, and chitin.

[4] The emulsion seasoning according to any one of [1] to [3], wherein the dietary fibers are derived from plant raw materials.

[5] The emulsion seasoning according to any one of [1] to [4], wherein the food-derived emulsifier comprises one or more selected from the group consisting of egg yolk, beans, seeds, and tomato paste.

[6] The emulsion seasoning according to [5], wherein the beans are one or more selected from the group consisting of soybeans, lentils, and chickpeas.

[7] The emulsion seasoning according to [5], wherein the seeds are almonds.

[8] The emulsion seasoning according to any one of [1] to [7], which comprises a vegetable.

[9] The emulsion seasoning according to any one of [1] to [8], which comprises one or more selected from the group consisting of grains, potatoes, mushrooms, and algae.

[10] The emulsion seasoning according to any one of [1] to [9], wherein the organic acid comprises acetic acid.

[11] The emulsion seasoning according to any one of [1] to [10], which is mayonnaise, a mayonnaise-like seasoning, or a tomato-containing sauce.

[12] The emulsion seasoning according to any one of [1] to [11], wherein a maximum water absorption rate in a period of 2 minutes to 90 minutes after the start of measurement by a "modified method for measuring water absorption of cereal flour" is 0.20% by mass or less per gram of the emulsion seasoning, and a maximum oil absorption rate by the same method is 1.0% by mass or more per gram of the emulsion seasoning.

[13] A method for manufacturing a liquid or semisolid emulsion seasoning, the method comprising the steps (a) and (b):
(a) mixing fine food particles comprising dietary fibers, a fat/oil, an organic acid, and a food-derived emulsifier to produce a mixed liquid having a water content adjusted to 20% by mass or more, and a total dietary fiber content adjusted to 0.8% by mass or more and 23% by mass or less; and
(b) performing pulverization treatment and emulsification treatment such that the fine food particles have a modal diameter of 0.3 μm or more and 115 μm or less.

[14] The method according to [13], wherein a majority of the pulverization treatment in (b) is performed under a pressurized condition of 0.01 MPa or more.

[15] A method for improving the flavor of a liquid or semisolid emulsion seasoning, the method comprising the steps (c) and (d):
(c) mixing fine food particles comprising dietary fibers, a fat/oil, an organic acid, and a food-derived emulsifier to prepare a mixed liquid having a water content adjusted to 20% by mass or more, and a total dietary fiber content adjusted to 0.8% by mass or more and 23% by mass or less; and
(d) performing pulverization treatment and emulsification treatment such that the fine food particles have a modal diameter of 0.3 μm or more and 115 μm or less.

[16] The method according to [15], wherein a majority of the pulverization treatment in (d) is performed under a pressurized condition of 0.01 MPa or more.

[17] A method for improving the emulsion stability and shape retention properties of a liquid or semisolid emulsion seasoning, the method comprising the steps (e) and (f):
(e) mixing fine food particles comprising dietary fibers, a fat/oil, an organic acid, and a food-derived emulsifier to prepare a mixed liquid having a water content adjusted to 20% by mass or more, and a total dietary fiber content adjusted to 0.8% by mass or more and 23% by mass or less; and
(f) performing pulverization treatment and emulsification treatment such that the fine food particles have a modal diameter of 0.3 μm or more and 115 μm or less.

[18] The method according to [17], wherein a majority of the pulverization treatment in (f) is performed under a pressurized condition of 0.01 MPa or more.

[19] A method for improving, by a liquid or semisolid emulsion seasoning, a texture and a flavor of a food to which the emulsion seasoning is added, the method comprising the steps (g) and (h):
(g) mixing fine food particles comprising dietary fibers, a fat/oil, an organic acid, and a food-derived emulsifier to prepare a mixed liquid having a water content adjusted to 20% by mass or more, and a total dietary fiber content adjusted to 0.8% by mass or more and 23% by mass or less; and
(h) performing pulverization treatment and emulsification treatment such that the fine food particles have a modal diameter of 0.3 μm or more and 115 μm or less.

[20] The method according to [19], wherein a majority of the pulverization treatment in (h) is performed under a pressurized condition of 0.01 MPa or more.

According to one or more embodiments of the present invention, in a seasoning containing an organic acid, an emulsifier derived from a food (e.g., egg yolk, legumes, seeds, tomato paste, or the like), and a fat/oil, it is possible to simultaneously suppress an unpleasant flavor (taste or odor) derived from an organic acid, an emulsifier derived from a food, or a fat/oil, and to provide an emulsified seasoning in which the taste of the seasoning or the flavoring originally contained in the food is sufficiently utilized to improve the eatability and palatability.

The emulsion seasoning of one or more embodiments of the present invention is an emulsified seasoning having resistance to both freezing and heat and improved stability to emulsification (resistance to oil-water separation) and shape retention.

Further, the emulsion seasoning of one or more embodiments of the present invention is an emulsified seasoning having an effect of improving the texture and flavor of the target food by suppressing the oiliness of the target food and easily feeling a favorable texture and the original flavor of the ingredients due to its low water absorption and high oil absorption without impairing the moistness inherent to the target food due to its low water absorption and the soft texture and flavor associated therewith.

DETAILED DESCRIPTION

Figure 1A:
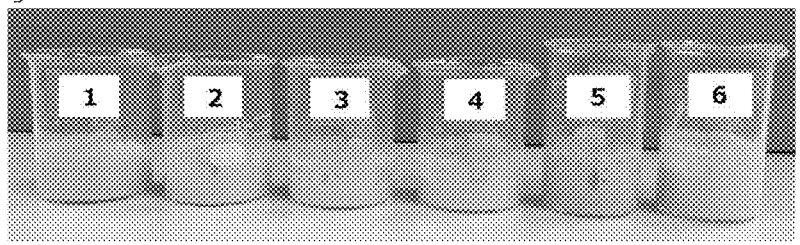
FIGS. 1A-B are diagrams (photographs) showing the state of each seasoning before freezing (FIG. 1A) and after freezing (FIG. 1B) at −20° C. and thawing in Example 7. 1: Comparative Example 27 of Example 7, 2: Comparative Example 28 of Example 7, 3: Comparative Example 2 of Example 7, 4: Comparative Example 29 of Example 7, 5: Comparative Example 1 of Example 7, 6: Test Example 1-1 of Example 7.
Figure 1B:
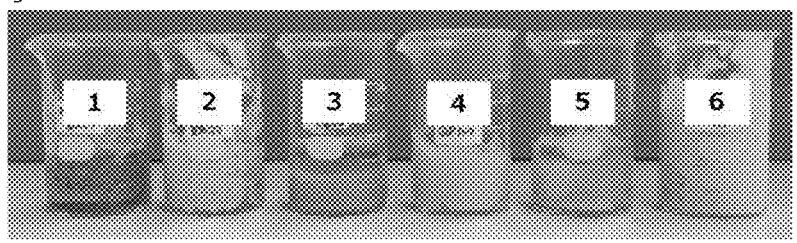
Figure 2A:
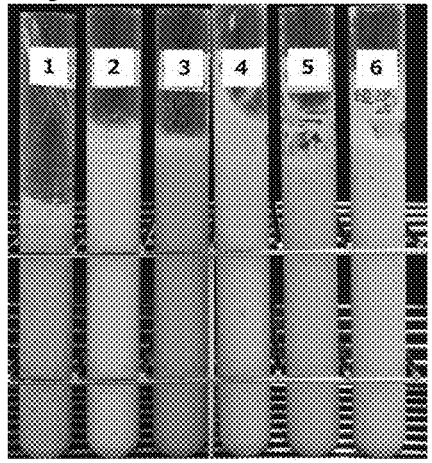
FIGS. 2A-C are diagrams (photographs) showing the state of each seasoning before heating (FIG. 2A) and after heating (FIG. 2B: at 90° C. for 30 mins, and FIG. 2C: at 100° C. for 20 mins) in Example 7. 1: Comparative Example 27 of Example 7, 2: Comparative Example 28 of Example 7, 3: Comparative Example 2 of Example 7, 4: Comparative Example 29 of Example 7, 5: Comparative Example 1 of Example 7, 6: Test Example 1-1 of Example 7.
Figure 2B:
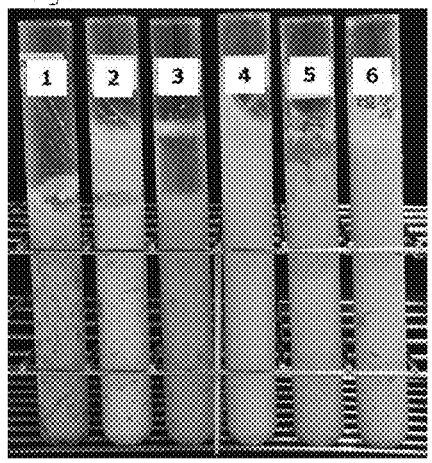
Figure 2C:
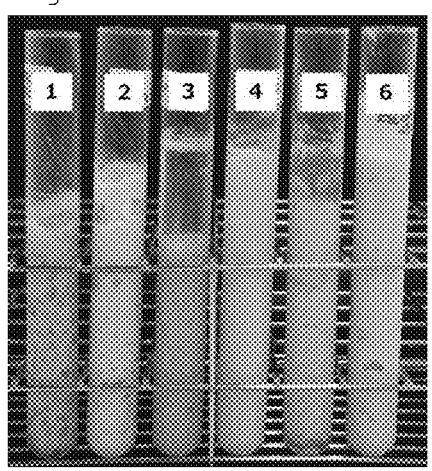
Figure 3A:
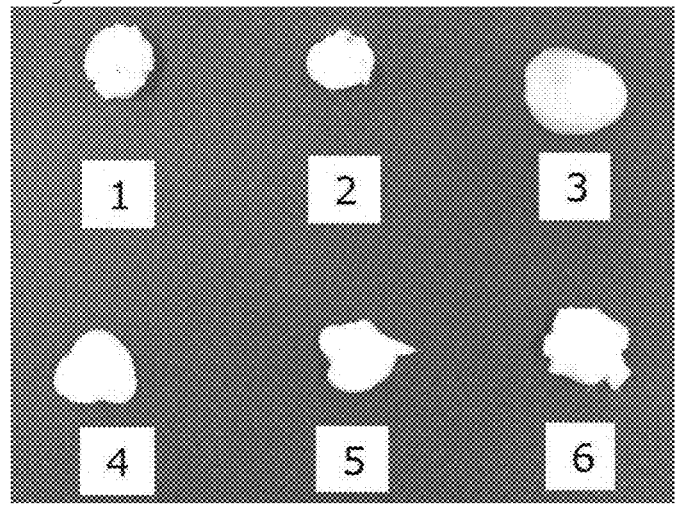
FIGS. 3A-B are diagrams (photographs) showing the state of each seasoning before heating (FIG. 3A) and after heating (FIG. 3B) in Example 7. 1: Comparative Example 27 of Example 7, 2: Comparative Example 28 of Example 7, 3: Comparative Example 2 of Example 7, 4: Comparative Example 29 f Example 7, 5: Comparative Example 1 of Example 7, 6: Test Example 1-1 of Example 7.
Figure 3B:
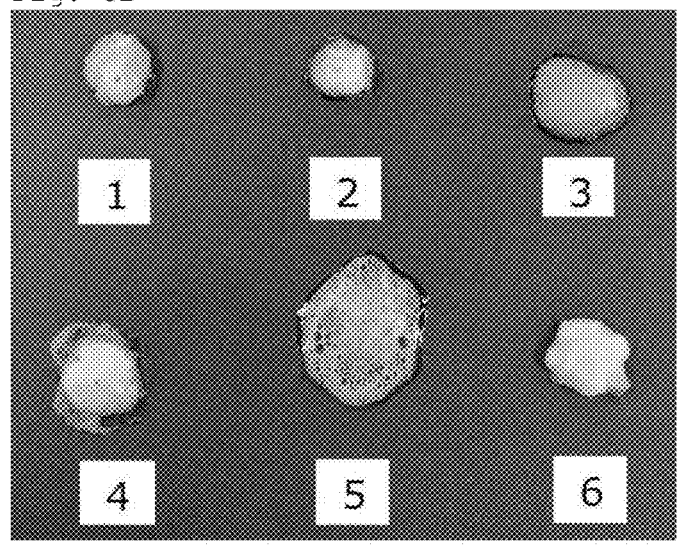
Figure 4A:
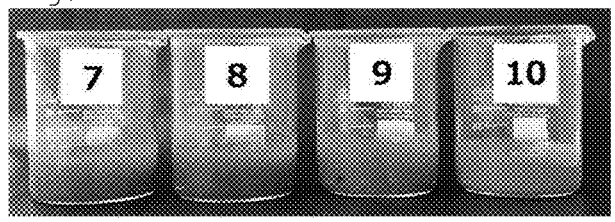
FIGS. 4A-B are diagrams (photographs) showing the state of each seasoning before freezing (FIG. 4A) and after freezing and thawing (FIG. 4B) in Example 7. 7: Comparative Example 30 of Example 7, 8: Comparative Example 31 of Example 7, 9: Comparative Example 32 of Example 7, 10: Test Example 41 of Example 7.
Figure 4B:
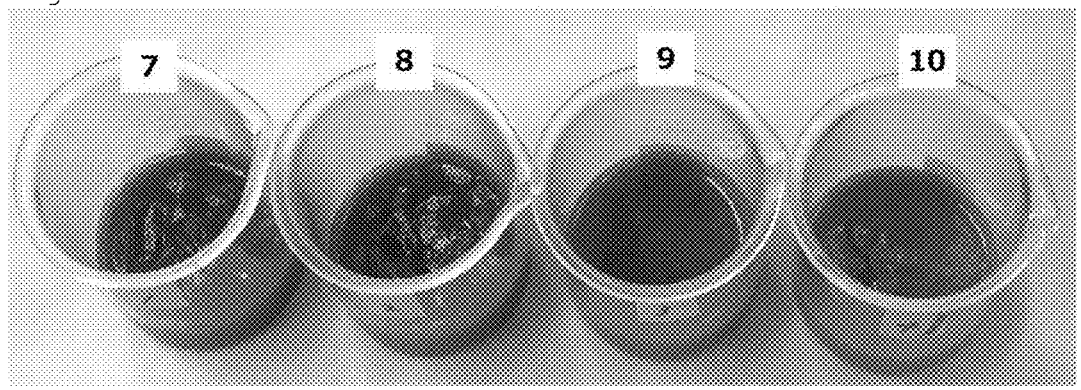

The following describes the liquid or semisolid emulsion seasoning, the method for manufacturing the same, the flavor-improving method, the emulsion stability-improving method, and the method for improving the texture and flavor of foods to which the liquid or semisolid emulsion seasoning is added (target foods) of one or more embodiments of the present invention.

One or more embodiments of the present invention relate to a liquid or semisolid emulsion seasoning containing fine food particles containing dietary fibers, a fat/oil, an organic acid, and a food-derived emulsifier, wherein (1) the dietary fibers include (A1) a water-soluble dietary fiber and (A2) a water-insoluble dietary fiber, and the total amount thereof is 0.8% by mass or more and 23% by mass or less;

(2) the fine food particles have a modal diameter of 0.3 μm or more and 115 μm or less; and (3) the water content is 20% by mass or more.

The emulsion seasoning of one or more embodiments of the present invention comprises (A) fine food particles comprising dietary fibers.

In one or more embodiments of the present invention, the term "dietary fiber" refers to indigestible components in foods that are not digested by human digestive enzymes, and the quantitative determination method thereof includes the modified Prosky method. The method described in the "Ministry of Education, Culture, Sports, Science and Technology, 'Analysis Manual of Standard Tables of Food Composition in Japan—2015—(Seventh Revised Version),' http://www.mext.go.jp/a_menu/syokuhinseibun/1368931.htm, pp 31-38" can be used for determination. Specifically, the following operations may be performed.

Sampling

A uniform sample is collected, and dried by freeze-drying or at 70° C. overnight. The dried product is ground to fine particles in size of 2 mm or less, and the ground product is subjected to analysis. For degreasing, 5 g of a powder sample is accurately collected in a 200-mL centrifuge tube, and 25 mL of petroleum ether is added per gram of the powder sample. The resulting mixture is allowed to stand for 15 minutes while stirring occasionally, and then centrifuged. The supernatant is filtered through a glass filter. This operation is repeated twice for the precipitated residue. Finally, the whole amount of the residue is filtered through a glass filter, and the filtered residue is air-dried and then weighed to give a powder. Changes in mass due to drying and degreasing are recorded, and weight loss ratio from the raw sample is calculated.

2) Heat-Resistant Amylase Treatment

Next, 1 to 10 g of the degreased and dried powder sample is accurately weighed into tall beakers (two beakers, W1 and W2, are prepared), one for protein measurement and the other for ash measurement. 50 mL of 0.08 mol/L phosphate buffer (pH 6.0) is added to each beaker, and it is confirmed that the pH is 6.0±0.5. 0.1 mL of heat-stable α-amylase solution ("Termamyl", manufactured by Novo Nordisk) is added thereto, and the beaker is covered with aluminum foil, placed in a boiling water bath, and allowed to stand for 30 minutes while stirring every 5 minutes.

3) Protease Treatment

Regarding the (Sp), after the beaker is cooled, about 10 mL of 0.275 mol/L sodium hydroxide solution is added to adjust the pH to 7.5±0.1. 0.1 mL of protease solution (No. P-5380, manufactured by Sigma, 50 mg/mL, dissolved in 0.08 mol/L phosphate buffer (pH 6.0)) is added thereto. The beaker is covered again with aluminum foil, and the reaction is carried out for 30 minutes while shaking in a water bath at 60° C.±2° C.

4) Amyloglucosidase Treatment

Regarding the (Sa), after the beaker is cooled, about 10 mL of 0.325 mol/L hydrochloric acid is added to adjust the pH to 4.3±0.3. 0.1 mL of amyloglucosidase solution (No. A-9913, manufactured by Sigma) is added thereto. The beaker is covered again with aluminum foil, and the reaction is carried out for 30 minutes while shaking in a water bath at 60° C.±2° C.

5) Filtration (Division into Water-Soluble and Water-Insoluble Dietary Fibers)

The above enzyme treatment liquid is poured into a crucible glass filter while sucking, and divided into residue (a water-insoluble dietary fiber fraction) and filtrate (a water-soluble dietary fiber fraction). The residues on the inner wall of the tall beaker and on the filter are washed with about 10 mL of water, and the washing liquid is combined with the filtrate.

6) Quantification of Water-Soluble Dietary Fiber

At room temperature, ethanol (95 v/v %) equivalent to 4 times the amount of enzyme reaction liquid is heated to 60° C.±2° C. and then added to the enzyme reaction liquid. The resulting mixture is allowed to stand at room temperature precisely for 60 minutes, and the dietary fibers are precipitated. Suction filtration is performed in the same manner as in 5) to divide the resultant into the residue and filtrate. The residue collected on the crucible glass filter is sequentially washed three times with 20 mL of 78 v/v % ethanol, twice with 10 mL of 95 v/v % ethanol, and twice with 10 mL of acetone. The whole filter is dried at 105±50° C. overnight, and then cooled in a desiccator. Thereafter, the residue is weighed to 0.1 mg for use in non-digestible protein measurement (R1) and ash measurement (R2). The protein (P1) and ash (A1) in the residues are quantified by the methods shown in 8) and 9), respectively, and subtracted from the residue mass.

7) Quantification of Water-Insoluble Dietary Fiber

The residue on the filter obtained by the filtration operation in 5) is sequentially washed twice with 10 mL of 95 v/v % ethanol and twice with 10 mL of acetone. The whole filter is dried at 105±5° C. overnight, and then cooled in a desiccator. Thereafter, the residue is weighed to 0.1 mg for use in non-digestible protein measurement (R3) and ash measurement (R4). The protein (P2) and ash (A2) in the residues are quantified by the methods shown in 8) and 9), respectively, and subtracted from the residue mass.

8) Quantification of Protein in Residue

The residues R1, Rb1 and R3, Rb3 are each scraped together with diatomaceous earth, and the nitrogen content of the residue is determined by the Kjeldahl method. This is multiplied by a nitrogen coefficient of 6.25 to give the protein content (P1, Pb1 and P2, Pb2).

9) Quantification of Ash in Residue

The residues R2, Rb2 and R4, Rb4 are each scraped together with diatomaceous earth, and subjected to ashing treatment together with the whole glass filter at 525+5° C. for 5 hours, and then allowed to cool in a desiccator. Thereafter, the residue is weighed to 0.1 mg to give the ash content of the residue (A1, Ab1 and A2, Ab2).

10) Blank Test

The same treatment as in 1) to 9) is performed in a system that does not contain a sample, and the following eight blank test values are obtained.

| Water-soluble dietary fiber equivalent blank test | Residue | Rb1, Rb2 g |
| --- | --- | --- |
| | Residue | Protein in Rb1: Pb1 g |
| | Residue | Ash in Rb2: Ab1 g |
| Water-insoluble dietary fiber equivalent blank test | Residue | Rb3, Rb4 g |
| | Residue | Protein in Rb3: Pb2 g |
| | Residue | Ash in Rb4: Ab2 g |

11) Calculation

The contents of water-soluble dietary fiber and water-insoluble dietary fiber are calculated by the following formulas.

$$\text{Water-soluble dietary fiber content (g/100 g)} = \{[[(R1+R2)/2] \times [1-(P1/R1)+(A1/R2)]-Bs]/[(W1+W2)/2]\} \times 100,$$

wherein $Bs = [(Rb1+Rb2)/2] \times [1-(Pb1/Rb1+Ab1/Rb2)]$ $$\text{Water-insoluble dietary fiber content (g/100 g)} = \{[[(R3+R4)/2] \times [1-(P2/R3)+(A2/R4)]-Bi]/[(W1+W2)/2]\} \times 100,$$

wherein $Bi = [(Rb2+Rb4)/2] \times [1-(Pb2/Rb3+Ab2/Rb4)]$

| W1, W2: | | Sampling amount (g) |
| --- | --- | --- |
| R1, R2: | Water-soluble | Residue (g) |
| P1: | dietary fiber | Protein in residue (g) |
| A1: | | Ash in residue (g) |
| Rb1, Rb2: | Water-soluble | Blank test residue (g) |
| Pb1: | dietary fiber | Protein in blank test residue (g) |
| Ab1: | | Ash in blank test residue (g) |
| R3, R4: | Water-insoluble | Residue (g) |
| P2: | dietary fiber | Protein in residue (g) |
| A2: | | Ash in residue (g) |
| Rb3, Rb4: | Water-insoluble | Blank test residue (g) |
| Pb2: | dietary fiber | Protein in blank test residue (g) |
| Ab2: | | Ash in blank test residue (g) |

The degreased and air-dried sample is converted to the original sample by the following formula:

$$\text{Dietary fiber content of original sample (g/100 g)} = D \times [1-(Wd/100)],$$

wherein D: water-soluble or water-insoluble dietary fiber content (g/100 g) of degreased and air-dried sample
Wd: loss (%) due to degreasing and air-drying The emulsion seasoning of one or more embodiments of the present invention is an emulsion seasoning containing (A1) a water-soluble dietary fiber and (A2) a water-insoluble dietary fiber, wherein the total content thereof is 0.8% by mass or more and 23% by mass or less.

As the water-soluble dietary fiber (A1) of one or more embodiments of the present invention, one or more selected from the group consisting of pectin, alginic acid, glucomannan, inulin, and fucoidan are preferable. As the water-insoluble dietary fiber (A2), one or more selected from the group consisting of cellulose, hemicellulose, β-glucan, lignin, and chitin are preferable.

As the dietary fibers, gums as thickeners are preferably excluded. Examples of gums include guar gum, xanthan gum, tamarind gum, gum arabic, and *psyllium* seed gum. This is because these gums, when added to emulsion seasonings, have the actions of viscosity adjustment and emulsion stability; however, they have unique artificial viscosity and cause an unpleasant feeling during eating.

In one or more embodiments of the present invention, the total content of the water-soluble dietary fiber (A1) and the water-insoluble dietary fiber (A2) may be, in the dry state, 0.8% by mass or more, preferably 1.6% by mass or more, and more preferably 2.4% by mass or more, in terms of the action and effect of suppressing stimulation caused by sour taste and sour odor, suppressing the unpleasant flavor of egg yolk, and suppressing unpleasant flavor derived from the fat/oil. On the other hand, in terms of physical properties with excellent eatability, the total content may be 23% by mass or less, preferably 20% by mass or less, and more preferably 16% by mass or less.

In one or more embodiments of the present invention, the content mass ratio of the water-soluble dietary fiber (A1) to the water-insoluble dietary fiber (A2), (A1/A2), in the dry state is not particularly limited; and in terms of the action and effect of suppressing stimulation caused by sour taste and sour odor, suppressing the unpleasant flavor of egg yolk, and suppressing unpleasant flavor derived from the fat/oil, the content mass ratio is preferably 0.1 or more, more preferably 0.17 or more, and even more preferably 0.3 or more. On the other hand, in terms of physical properties with excellent eatability, the content mass ratio is preferably 4 or less, more preferably 2.4 or less, and even more preferably 1 or less.

The water-soluble dietary fiber and the water-insoluble dietary fiber of one or more embodiments may be refined products or may be derived from plant raw materials (hereinafter simply referred to as "food materials" when the refined products, plant raw materials, and other food raw materials are included). The origins thereof are not limited. When the fiber is derived from a plant raw material, any foods suitable for eating and drinking can be used. Examples thereof include one or more selected from the group consisting of vegetables, grains, potatoes, mushrooms, algae, beans, fruits, and seeds, and processed products thereof (including products that have been subjected to pre-treatment, such as heat-cooking, removal of harshness, peeling, removal of seeds, ripening, salting, and pericarp processing). Each of the above food materials can be used, regardless of the distinction between their edible parts and inedible parts.

As the vegetables, any vegetables can be used as long as they are vegetables provided for eating and drinking as foods, and processed products thereof (including products that have been subjected to pre-treatment, such as heat-cooking, removal of harshness, peeling, ripening, salting, and skin-processing). In particular, examples include radish, carrot, burdock, rutabaga, beet, beetroot, parsnip, turnip, black salsify, lotus root, kuwai, shallot, garlic, rakkyou, lily bulb, dogtooth violet, kale, onion, asparagus, udo, cabbage, lettuce, spinach, Chinese cabbage, rape, komatsuna, bok choy, leek, spring onion, nozawana, butterbur, fudansou (Swiss chard), potherb mustard, tomato, eggplant, pumpkin, bell pepper, cucumber, Japanese ginger, cauliflower, broccoli, edible chrysanthemum, bitter melon, okra, artichoke, zucchini, sugar beet, ginger, perilla, wasabi, paprika, herbs (watercress, coriander, water spinach, celery, tarragon, chives, chervil, sage, thyme, laurel, parsley, mustard green (leaf mustard), mustard (Japanese mustard and Western mustard), Japanese ginger, mugwort, basil, oregano, rosemary, peppermint, savory, lemongrass, dill, wasabi leaf, leaf of Japanese pepper, stevia, bracken, Asian royal fern, kudzu, tea plant (tea), and bamboo shoot. These plant raw materials may be used singly or in combination of two or more. Cruciferous plants are desirable because they have the effect of enhancing the umami and pungent tastes of the seasoning liquid; it is more desirable to use one or more of broccoli, cabbage, cauliflower, kale, and mustard (Japanese mustard and Western mustard); and it is particularly desirable to use two or more of broccoli, cabbage, cauliflower, kale, and mustard (Japanese mustard and Western mustard). The vegetables are preferably contained as fine particles so that the emulsion seasoning has a modal diameter within a specific range described later. Each of the above food materials can be used, regardless of the distinction between their edible parts and inedible parts.

As the grains, any grains can be used as long as they are grains provided for eating and drinking, or processed products thereof (including products that have been subjected to pre-treatment, such as heat-cooking, removal of harshness, peeling, ripening, salting, skin-processing, and fermentation). In particular, examples thereofinclude corn, rice, wheat, barley, sorghum, oat, triticale, rye, buckwheat, *Digitaria exilis*, quinoa, Japanese barnyard millet, foxtail millet, millet, giant corn, sugar cane, and amaranth. Among them, it is preferable to use rice (in particular, brown rice); in particular, products obtained by liquefying rice by treatment with enzymes, such as *Aspergillus oryzae* (e.g., amazake), are preferable, because sweetness and emulsifying action are enhanced. Further, when rice (in particular, brown rice, further an enzyme-treated rice liquefied product) is used as the grain, it is more preferable to use rice in combination with beans (in particular, soybeans) or seeds (in particular, almonds, further almond milk) to further improve emulsion stability. The grains are preferably contained as fine particles so that the emulsion seasoning has a modal diameter within a specific range described later. Each of the above food materials can be used, regardless of the distinction between their edible parts and inedible parts.

Moreover, it is preferable to use potatoes (sweet potato, cassava, yacon, taro, aroid, konjac yam, tashiroimo (Polynesian arrowroot), potato, purple sweet potato, Jerusalem artichoke, yam, yamanoimo, and nagaimo), because the shape retention properties are enhanced. The potatoes are preferably contained as fine particles so that the emulsion seasoning has a modal diameter within a specific range described later. Each of the above food materials can be used, regardless of the distinction between their edible parts and inedible parts.

Moreover, it is more preferable to use mushrooms (shiitake, matsutake, Jew's ear, hen of the woods, polypore, oyster mushroom, king trumpet mushroom, enoki mushroom, shimeji, honey mushroom, common mushroom, butterscotch mushroom, Jersey cow mushroom, hatsutake, and chichitake), because the umami and pungent tastes are further enhanced. The mushrooms are preferably contained as fine particles so that the emulsion seasoning has a modal diameter within a specific range described later. Each of the above food materials can be used, regardless of the distinction between their edible parts and inedible parts.

Moreover, it is preferable to use algae, because the fine food particles of the seasoning are less likely to settle, and stability is improved. As the algae, any algae can be used as long as they are provided for eating and drinking, including large algae, such as kelp, wakame, nori, green laver, and gelidiaceae; and microalgae, such as green algae, red algae, blue-green algae, dinoflagellate, and euglena. In particular, examples include sea lettuce, green laver, anaaosa, sea grape (kubirezuta), katashiogusa, kuromiru, tamamiru, Japanese sea lily, hitoegusa, hiraaonori, fusaiwazuta, gutweed, akamoku, amijigusa, sea oak, antokume, ishige, ichimegasa, iroro, iwahige, umi toranoo, umi uchiwa, oobamoku, Okinawa mozuku, kaigaraamanori, kagomenori, kajime, kajime (sea oak), kayamonori, gibasa (akamoku, ginnbasou, jinbasou, jibasa), sanadagusa, shiwanokawa, shiwayahazu, Petalonia fascia, tsuruarame, nanori (kayamonori), nebarimo, nokogirimoku, habanori, hijiki, hirome, fukuronori, futomozuku, hondawara, makonbu, hornwort, mugiwaranori (kayamonori), muchimo, mozuku, yuna, wakame, asakusanori, ibotsunomata, ushikenori, usukawakaninote, ezotsunomata (kurohaginansou), oobusa, ogonori, okitsunori, obakusa, katanori, kabanori, kamogashiranori, kijinoo, kurohaginansou (ezotsunomata), sakuranori, shiramo, tanbanori, tsunomata, tsurushiramo, tsurutsuru, tosakanori, tosakamatsu, nogenori (fukurofunori), nori (susabinori), hanafunori, harigane, hiragaragara, hirakusa, hiramukade, pirihiba, fukurofunori, fushitsunagi, makusa, marubaamanori, mitsutesozo, euglena, chlorella, mirin, mukadenori, yuikiri, yukari, and gelidiaceae. Each of the above food materials can be used, regardless of the distinction between their edible parts and inedible parts.

Since algae are rich in polysaccharides and are difficult to pulverize, it is more preferable to use them in the form of extract, such as soup stock.

Further, one or more selected from the group consisting of the grains, potatoes, mushrooms, and algae mentioned above is preferably contained, in terms of improving the flavor titer of the liquid or semisolid emulsion seasoning of one or more embodiments of the present invention.

As the beans, any beans can be used as long as they are beans provided for eating and drinking, or processed products thereof (including products that have been subjected to pre-treatment, such as heat-cooking, removal of harshness, peeling, ripening, salting, and skin-processing). In particular, examples include *Phaseolus vulgaris*, kidney beans, red kidney beans, white kidney beans, black beans, pinto beans, *Phaseolus vulgaris* L., lima beans, runner beans, peas, pigeon beans, mung beans, cowpeas, azuki beans, broad beans, soybeans, edamame (soybeans harvested with pods in an immature state; green appearance), chickpeas, *Lens culinaris*, hiramame, lentils, peanuts, lupine beans, grass peas, locust beans (carob), petai, *Parkia biglobosa*, coffee beans, cacao beans, Mexican jumping beans, black gram, moth beans, tepary beans, ricebeans, hyacinth beans, horsegram, bambara beans, geocarpa grand beans, sword beans, jack beans, cluster beans, winged beans, *Mucuna pruriens*, lupine, tamarind, and amaranth. In particular, in terms of the emulsifying action thereof, one or more selected from the group consisting of soybeans (in particular, edamame), lentils, and chickpeas is preferable. The beans are preferably contained as fine particles so that the emulsion seasoning has a modal diameter within a specific range described later. Each of the above food materials can be used, regardless of the distinction between their edible parts and inedible parts.

As the seeds, any seeds can be used as long as they are seeds provided for eating and drinking, or processed products thereof (including products that have been subjected to pre-treatment, such as heat-cooking, removal of harshness, peeling, ripening, salting, skin-processing, and squeezing). Particular examples include almonds, cashews, pecans, macadamia nuts, pistachios, hazelnuts, coconuts, pine nuts, sunflower seeds, pumpkin seeds, watermelon seeds, acorn, walnuts, chestnuts, ginkgo nuts, sesame seeds, and Brazil nuts. Among them, almonds, cashews, macadamia nuts, pistachios, hazelnuts, and coconuts are used. In particular, in terms of the emulsifying action thereof, almonds are preferable, and products obtained by pasting almonds (e.g., almond milk) are more preferable. The seeds are preferably contained as fine particles so that the emulsion seasoning has a modal diameter within a specific range described later. Each of the above food materials can be used, regardless of the distinction between their edible parts and inedible parts.

In one or more embodiments of the present invention, the plant raw materials containing dietary fibers are not limited; and in terms of high dietary fiber content per dry matter (i.e., less protein and starch contents), leafy vegetables (e.g., cabbage, onion, and garlic) and fruit vegetables (e.g., corn and paprika) are preferred. Additionally, it is preferable to use one or more selected from the group consisting of soybeans, lentils, and chickpeas; almond, almond milk, or tomato paste, because they have an emulsifying action.

The tomato paste of one or more embodiments may be obtained by crushing tomato fruit by an ordinary method, followed by heat concentration under reduced pressure, to form a fine and smooth paste. There are no particular limitations on the tomato varieties and concentration ratios.

Dry food materials are preferably used as the plant raw materials containing the water-soluble dietary fiber and the water-insoluble dietary fiber, and the food materials having an emulsifying action, in terms of dispersion uniformity due to the pulverization thereof, the strength of action and effect, and workability. However, since egg yolk, almond milk, and tomato paste have the above-mentioned suitability in the wet state, they are not necessarily in the dry state.

The liquid or semisolid emulsion seasoning of one or more embodiments of the present invention contains a food-derived emulsifier. The food-derived emulsifier is not limited as long as it is a component that can be used as a food material, and that can emulsify the other components (fine food particles, organic acids, fats/oils, salts, etc.) of the seasoning. Examples include egg yolk, beans, and tomato paste. In terms of the intensity of the unpleasant odor and allergy thereof, it is preferable not to use egg yolk, and it is preferable to use plant raw materials. Specifically, it is preferable to use one or more selected from the group consisting of soybeans, lentils, and chickpeas; almond, almond milk, or tomato paste.

As for the quality of the dry food material, the water activity is preferably 0.95 or less, in terms of easy expression of viscosity during addition of water, and the expansion of the application range to various foods and beverages. The water activity is more preferably 0.9 or less, even more preferably 0.8 or less, and still more preferably 0.65 or less.

The method for drying the food materials may be any method generally used to dry foods. Examples of drying methods include sun drying, shade drying, freeze drying, air drying (e.g., hot-air drying, fluidized-bed drying, spray drying, drum drying, and low-temperature drying), pressure drying, vacuum drying, microwave drying, and oil heat drying. It is more preferable to use a method using air drying (in particular, hot-air drying) or freeze drying, both of which are easy to control the water content regardless of the material, and are convenient for industrial mass treatment.

In addition, it is more preferable to perform pulverization treatment in the presence of a fat/oil using pre-dried food materials, because a larger amount of food materials can be treated.

The method for grinding treatment or pulverization treatment used in one or more embodiments of the present invention is not particularly limited, and may be any methods that can treat foods with high shear force for a short period of time under pressurized conditions. Any equipment called a blender, a mixer, a mill, a kneader, a grinder, a disintegrator, a pulverizer, or the like may be used. Either dry grinding or wet grinding may be used. Any one of high-temperature grinding, normal-temperature grinding, and low-temperature grinding may be used.

Examples of dry grinders may include medium-stirring mills such as dry bead mills and ball mills (e.g., tumbling or vibration type), jet mills, high-speed rotary impact mills (e.g., pin mill), roll mills, and hammer mills. Usable examples of wet grinders include medium-stirring mills such as bead mills and ball mills (e.g., tumbling, vibration, or planetary type mills), roll mills, colloid mills, starbursts, and high-pressure homogenizers. For liquid or semisolid emulsion seasonings after wet grinding treatment, a colloid mill, a medium-stirring mill (a ball mill or a bead mill), or a high-pressure homogenizer can be more suitably used.

For example, a high-pressure homogenizer or a stirring medium mill can be preferably used. Specifically, in a bead mill grinder using beads having a particle size of 2 mm or less, crushing is performed by one-pass treatment (the treatment time is usually less than 30 minutes) under pressurized conditions, described later, in addition to normal pressure as the outlet pressure, whereby a liquid or semisolid emulsion seasoning having the characteristics of one or more embodiments of the present invention can be preferably obtained.

Any method may be used to create pressurized conditions equal to or higher than normal pressure during pulverization treatment. In particular, in order to preferably obtain the pressurized conditions using a bead mill grinder, it is preferable to install a filter of appropriate size at the treatment outlet, to adjust the pressurized conditions while adjusting the feeding rate of the contents, and to perform the treatment. The pulverization treatment is performed at preferably 0.01 MPa or more, and more preferably 0.02 MPa or more, during the majority of the treatment time. When the treatment is performed using a medium-stirring mill, the value of the viscosity of the contents before treatment measured (measurement temperature: 20° C.) using a Bostwick viscometer (specifically measurable with a KO Bostwick viscometer (manufactured by Fukayatekkousyo, having a trough length of 28.0 cm and a Bostwick viscosity, i.e., the maximum flow-down distance of the sample in the trough, of 28.0 cm)) is preferably 28.0 cm or less per second, because the pressure can be easily adjusted. If the pressurized conditions are too harsh, the equipment may be damaged; thus, when the treatment is performed using a medium-stirring mill, the upper limit of the pressurized condition during pulverization treatment is preferably 1.0 MPa or less, and more preferably 0.50 MPa or less.

By performing pulverization treatment using a high-pressure homogenizer, the treatment can be preferably performed under pressurized conditions. The treatment can be more suitably performed by performing medium-stirring mill treatment before high-pressure homogenizer treatment, or by performing medium-stirring mill treatment after high-pressure homogenizer treatment. As the high-pressure homogenizer, any device that can be generally used as a high-pressure homogenizer can be used. Examples include PANDA 2K Homogenizer (manufactured by Niro Soavi), Sonator (manufactured by Sonic Corporation), Cavitron (manufactured by Eurotech), LAB2000 (manufactured by SMT), and APV-2000 (manufactured by SPX FLOW). As the treatment conditions, for example, pulverization treatment can be performed by performing high-pressure homogenization treatment under 100 MPa one time or multiple times. When the above pulverization treatment is performed, the food is preferably pulverized in a grinding solvent. In particular, when the grinding solvent contains water, the food tends to be easily pulverized by subjecting the food to pulverization treatment in a state in which the water content of the food is lower than that of the grinding solvent; thus, it is easily adjusted within the range of one or more embodiments of the present invention, and is useful. Specifically, a dried food is preferably subjected to pulverization treatment using a fat/oil or water as a grinding solvent. In particular, medium-stirring mill treatment of foods with a pungent taste (e.g., mustard) in a grinding solvent results in a quality with an overly strong pungent taste; thus, it is preferable to add a product that has been separately subjected to pulverization treatment after medium-stirring mill treatment. The viscosity (20° C.) of a food-containing solvent in which food is contained in fat/oil or water before pulverization treatment is preferably 20 mPa·s or less, and pulverization treatment efficiency is further increased at a viscosity of 8 mPa·s or less, which is useful. In terms of the shape retention properties of the composition containing fine food particles, the viscosity is preferably 100 mPa·s or more, and more preferably 500 mPa·s or more. In one or more embodiments of the present invention, the simple expression "viscosity (20° C.)" represents a value measured using a rotational viscometer, and this value can be measured by an ordinary method using a B-type viscometer. In the measurement, while attention is being paid to the upper limit of measurement, the measured value of a sample adjusted to 20° C. is obtained using a rotor (No. 1 to No. 4) at an appropriate rotational speed (6 rpm to 60 rpm), and the measured value is multiplied by the conversion multiplier according to the rotor used and the number of revolutions, whereby the value of "viscosity (20° C.)" can be measured. In the measurement, a combination is selected so that the expected viscosity value of the measurement sample is close to the full scale of the upper limit of measurement derived from the rotor and the rotational speed. If the viscosity is completely unknown, the viscosity can be measured by starting from the measurement setting of the highest viscosity range (No. 4 rotor, rotational speed: 6 rpm), and then gradually changing it to low viscosity range setting. For example, a No. 3 rotor at a rotational speed of 60 rpm allows measurement up to 2,000 mPa·s, and the numerical value of "viscosity (20° C.)" can be measured by multiplying the measured value by 20, which is the conversion multiplier.

In particular, a grinding method using a wet bead mill is preferable because it makes the resulting liquid or semisolid emulsion seasoning less likely to undergo oil-fat separation when allowed to stand, than by other treatment methods, and provides a highly stable quality. Although the principle is not clear, this is assumed to be because the particle state of fine food particles is preferably changed by the bead mill treatment. As for the conditions during wet bead mill treatment, the size and filling ratio of beads, the outlet mesh size, the feeding rate of raw material slurry, the mill rotation strength, whether to use a method involving a single passage (one-pass) or a method involving multiple circulations (circulation type), and the like may be suitably selected and adjusted according to the size and properties of the food material, and the properties of the intended liquid or semisolid emulsion seasoning. However, one-pass treatment is preferable. From the viewpoint that pulverization is further promoted, the treatment time is more preferably 1 second or longer, and most preferably 3 seconds or longer. On the other hand, in terms of treatment efficiency, the treatment time is more preferably 90 minutes or less, and most preferably 60 minutes or less. The treatment time in one or more embodiments of the present invention represents the time during which the treatment sample is sheared. For example, when a sample is subjected to one-pass treatment at a rate of 200 mL per minute, without circulation, in a bead mill grinder with a grinding chamber volume of 100 mL and a bead filling rate of 50%, the empty size in the grinding chamber is 50 mL, and the sample treatment time is thus 50/200=0.25 minutes (15 seconds).

Further, food materials that have been coarsely ground in advance using a jet mill, a pin mill, a stone mill, or the like as a pre-treatment are preferably subjected to pulverization treatment. Although the principle is not clear, powdered food materials adjusted to a median diameter of 1,000 μm or less and 100 μm or more are more preferably subjected to pulverization treatment, because adhesion to the objects is further enhanced. Moreover, in the bead mill treatment, the bead material and the material of the bead mill inner cylinder are preferably the same; and both materials are more preferably zirconia.

In the emulsion seasoning of one or more embodiments of the present invention, the modal diameter of the fine food particles is 0.3 μm or more and 115 μm or less. It is preferable to adjust the modal diameter within this range, because the water-soluble dietary fiber and the water-insoluble dietary fiber are refined to improve dispersion uniformity in the seasoning, and the surface area of each fiber increases, which strengthens the internetworking of the water-soluble/water-insoluble dietary fibers. The modal diameter of the fine food particles is preferably 100 μm or less, more preferably 50 μm or less, even more preferably 15 μm or less, and most preferably 10 μm or less. If the modal diameter is less than 0.3 μm, productivity is deteriorated. In addition, for ultrafine particles of size smaller than this, in terms of concerns about the safety of nanomaterials, a modal diameter of 0.3 μm or more is efficient and safe for production; 1.0 μm or more is more efficient and safe; and 2.0 μm or more is the most efficient and safe.

The particle sizes in one or more embodiments of the present invention all represent those measured in terms of volume. Unless otherwise specified, the measured particle size value represents a result obtained by analyzing an ultrasonicated sample (there is a tendency that ultrasonication breaks clusters formed of multiple fine particles, and that the measured value is about several times to several tens of times smaller; therefore, a value completely different from the measured particle size value before ultrasonication may be obtained).

The "modal diameter" in one or more embodiments of the present invention represents, regarding a particle size distribution for each channel obtained by measuring the liquid or semisolid emulsion seasoning using a laser diffraction particle size distribution analyzer, the particle size of a channel having the largest particle frequency %. When there are multiple channels having exactly the same particle frequency %, the particle size of a channel having the smallest particle size among those channels is employed. When the particle size distribution is a normal distribution, the value matches the median diameter (a numerical value at which, when the particle size distribution obtained by measurement with a laser diffraction particle size distribution analyzer is divided into two at a certain particle size, the cumulative values of particle frequency % on the larger side and the smaller side are equal, and which is also denoted as d50); however, when the particle size distribution is biased, in particular, when there are multiple particle size distribution peaks, the numerical values vary greatly. The measurement of the particle size distribution of a sample by a laser diffraction particle size distribution analyzer can be carried out, for example, in the following manner.

As the laser diffraction particle size distribution analyzer, for example, the Microtrac MT3300 EX2 system manufactured by MicrotracBEL Corp. can be used. The details are shown in the following [Method for measuring the particle size distribution (modal diameter, specific surface area, and maximum particle size)].

When the particle size distribution is measured for each channel (CH) in one or more embodiments of the present invention, the measurement can be performed by using the particle size for each measurement channel shown in Table 1 as a standard. The particle size specified for each channel is also referred to as the "particle size of XX channel." The particle frequency % of each channel (also referred to as the "particle frequency % of XX channel") can be determined by measuring, for each channel, the frequency of particles having a particle size that is equal to or smaller than the particle size specified for each channel, and that is larger than the particle size specified for a channel having one larger number (in the largest channel in the measurement range, the particle size at the lower measurement limit), and using the total frequency of all the channels within the measurement range as a denominator. For example, the particle frequency % of 1 channel represents the frequency % of particles in size of 2,000.00 μm or less and more than 1,826.000 μm. A specific method is described below.

[Method for Measuring the Particle Size Distribution (Modal Diameter, Specific Surface Area, and Maximum Particle Size)]

The particle size distribution of the emulsion seasoning of one or more embodiments is measured using the Microtrac MT3300 EX2 system of MicrotracBEL Corp. as the laser diffraction particle size distribution analyzer. Distilled water is used as the solvent for measurement, and DMS2 (Data Management System Version 2, MicrotracBEL Corp.) is used as the measurement application software. In the measurement, the cleaning button of the measurement application software is pressed to perform cleaning, then the Setzoro button of the software is pressed to perform zero adjustment, and a sample is directly loaded until an appropriate concentration range is reached by sample loading. After reaching the concentration range, the ultrasonic treatment button of the software is pressed to perform ultrasonic treatment at 40 W for 180 seconds. After defoaming treatment is performed three times, the result of laser diffraction at a flow rate of 60% for a measurement time of 10 seconds is used as a measured value.

The measurement conditions are as follows: distribution indicator: volume, particle refractive index: 1.60, solvent refractive index: 1.333, upper measurement limit (μm)=2,000.00 μm, lower measurement limit (μm)=0.021 μm.

When the particle size distribution is measured for each channel in one or more embodiments of the present invention, the particle size for each measurement channel shown in Table 1 is used as a standard. The particle frequency % of each channel is determined by measuring, for each channel, the frequency of particles having a particle size that is equal to or smaller than the particle size specified for each channel, and that is larger than the particle size specified for a channel having one larger number (in the largest channel in the measurement range, the particle size at the lower measurement limit), and using the total frequency of all the channels within the measurement range as a denominator. Specifically, particle frequency % is measured for each of the following 132 channels.

Regarding the results obtained by measurement, the particle size of a channel having the largest particle frequency % is denoted as the modal diameter. When there are multiple channels having exactly the same particle frequency %, the particle size of a channel having the smallest particle size among those channels is employed as the modal diameter. Of the channels in which the particle frequency is recognized, the particle size of a channel having the largest particle size is employed as the maximum particle size.

TABLE 1

| Channel | Particle size (μm) |
|---------|--------------------|
| 1 | 2000 |
| 2 | 1826 |
| 3 | 1674 |
| 4 | 1535 |
| 5 | 1408 |
| 6 | 1291 |
| 7 | 1184 |
| 8 | 1086 |
| 9 | 995.6 |
| 10 | 913.0 |
| 11 | 837.2 |

TABLE 1-continued

| Channel | Particle size (μm) |
|---|---|
| 12 | 767.7 |
| 13 | 704.0 |
| 14 | 645.6 |
| 15 | 592.0 |
| 16 | 542.9 |
| 17 | 497.8 |
| 18 | 456.5 |
| 19 | 418.6 |
| 20 | 383.9 |
| 21 | 352.0 |
| 22 | 322.8 |
| 23 | 296.0 |
| 24 | 271.4 |
| 25 | 248.9 |
| 26 | 228.2 |
| 27 | 209.3 |
| 28 | 191.9 |
| 29 | 176.0 |
| 30 | 161.4 |
| 31 | 148.0 |
| 32 | 135.7 |
| 33 | 124.5 |
| 34 | 114.1 |
| 35 | 104.7 |
| 36 | 95.96 |
| 37 | 88.00 |
| 38 | 80.70 |
| 39 | 74.00 |
| 40 | 67.86 |
| 41 | 62.23 |
| 42 | 57.06 |
| 43 | 52.33 |
| 44 | 47.98 |
| 45 | 44.00 |
| 46 | 40.35 |
| 47 | 37.00 |
| 48 | 33.93 |
| 49 | 31.11 |
| 50 | 28.53 |
| 51 | 26.16 |
| 52 | 23.99 |
| 53 | 22.00 |
| 54 | 20.17 |
| 55 | 18.50 |
| 56 | 16.96 |
| 57 | 15.56 |
| 58 | 14.27 |
| 59 | 13.08 |
| 60 | 12.00 |
| 61 | 11.00 |
| 62 | 10.09 |
| 63 | 9.250 |
| 64 | 8.482 |
| 65 | 7.778 |
| 66 | 7.133 |
| 67 | 6.541 |
| 68 | 5.998 |
| 69 | 5.500 |
| 70 | 5.044 |
| 71 | 4.625 |
| 72 | 4.241 |
| 73 | 3.889 |
| 74 | 3.566 |
| 75 | 3.270 |
| 76 | 2.999 |
| 77 | 2.750 |
| 78 | 2.522 |
| 79 | 2.312 |
| 80 | 2.121 |
| 81 | 1.945 |
| 82 | 1.783 |
| 83 | 1.635 |
| 84 | 1.499 |
| 85 | 1.375 |
| 86 | 1.261 |
| 87 | 1.156 |
| 88 | 1.060 |

TABLE 1-continued

| Channel | Particle size (μm) |
|---|---|
| 89 | 0.972 |
| 90 | 0.892 |
| 91 | 0.818 |
| 92 | 0.750 |
| 93 | 0.688 |
| 94 | 0.630 |
| 95 | 0.578 |
| 96 | 0.530 |
| 97 | 0.486 |
| 98 | 0.446 |
| 99 | 0.409 |
| 100 | 0.375 |
| 101 | 0.344 |
| 102 | 0.315 |
| 103 | 0.289 |
| 104 | 0.265 |
| 105 | 0.243 |
| 106 | 0.223 |
| 107 | 0.204 |
| 108 | 0.187 |
| 109 | 0.172 |
| 110 | 0.158 |
| 111 | 0.145 |
| 112 | 0.133 |
| 113 | 0.122 |
| 114 | 0.111 |
| 115 | 0.102 |
| 116 | 0.094 |
| 117 | 0.086 |
| 118 | 0.079 |
| 119 | 0.072 |
| 120 | 0.066 |
| 121 | 0.061 |
| 122 | 0.056 |
| 123 | 0.051 |
| 124 | 0.047 |
| 125 | 0.043 |
| 126 | 0.039 |
| 127 | 0.036 |
| 128 | 0.033 |
| 129 | 0.030 |
| 130 | 0.028 |
| 131 | 0.026 |
| 132 | 0.023 |

In the liquid or semisolid emulsion seasoning of one or more embodiments of the present invention, a method of performing pulverization so that the maximum particle size is larger than 30 μm is preferable, in terms of treatment efficiency.

The maximum particle size can be measured, for example, in the following manner. Specifically, regarding a particle size distribution for each channel obtained by measuring the liquid or semisolid emulsion seasoning using a laser diffraction particle size distribution analyzer, the particle size of a channel having the largest particle size, among channels in which particle frequency % is recognized, can be denoted as the maximum particle size.

As for the particle size of the seasoning of one or more embodiments of the present invention, the 50% cumulative diameter (d50) is preferably 80 μm or less, because the seasoning surface after discharge is further improved. The 50% cumulative diameter is more preferably 50 μm or less, even more preferably 20 μm or less, still more preferably 15 μm or less, and most preferably 10 μm or less. Moreover, in terms of not reducing productivity, and in terms of concerns about the safety of nanomaterials, a 50% cumulative diameter of 0.3 μm or more is efficient and safe for production, and 1.0 μm or more is more efficient and safe.

Moreover, as for the particle size of the seasoning of one or more embodiments of the present invention, the 90% cumulative diameter (d90) is preferably 400 µm or less, because the physical properties after discharge are further improved. The 90% cumulative diameter is more preferably 300 µm or less, even more preferably 200 µm or less, still more preferably 100 µm or less, and most preferably 50 µm or less. Moreover, a 90% cumulative diameter of 0.4 µm or more is efficient and safe for production, and 4.0 µm or more is the most efficient and safe. The 90% cumulative diameter represents a numerical value at which, when the particle size distribution obtained by measuring the liquid or semisolid emulsion seasoning using a laser diffraction particle size distribution analyzer is divided into two at a certain particle size, the ratio between the cumulative values of particle frequency % on the larger side and the smaller side is 1: 9, and which is also denoted as d90.

Moreover, the seasoning of one or more embodiments of the present invention is preferably adjusted to the modal diameter and/or median diameter as described above, and the arithmetic standard deviation is preferably 150 µm or less, because the physical properties after discharge are further improved. The arithmetic standard deviation is more preferably 90 µm or less, particularly preferably 60 µm or less, more particularly preferably 30 µm or less, and most preferably 10 µm or less. Furthermore, the "arithmetic standard deviation/modal diameter" ratio is preferably 10 or less, and more preferably 9 or less.

For seasonings of one or more embodiments with an extremely small arithmetic standard deviation, the production efficiency is extremely lowered. Therefore, an arithmetic standard deviation of 1 µm or more is efficient for production, and 1.8 µm or more is more efficient.

The content of fine food particles in the emulsion seasoning of one or more embodiments of the present invention refers to the weight of a precipitated fraction from which the supernatant separated by centrifugation is sufficiently removed, among 9-mesh passed fractions in the composition. Since part of the fat/oil and part of the water are incorporated into the precipitated fraction, the total amount of fine food particles represents the total weight of those components incorporated into the precipitated fraction, and the food. The content of fine food particles in the emulsion seasoning may be 2% by mass or more and 98% by mass or less; however, if the content of fine food particles is less than 2% by mass, the seasoning has an oily taste, which is not preferable. If the content of fine food particles exceeds 98% by mass, the texture is "mealy," so that the emulsion seasoning is difficult to eat, which is not preferable. The composition of the first aspect has a quality such that a large amount of fine food particles can be easily eaten, without causing a "mealy" texture or an oily taste in the mouth; thus, the content of fine food particles is preferably 2% by mass or more, more preferably 8% by mass or more, even more preferably 15% by mass or more, and most preferably 30% by mass or more. Particularly in terms of the "mealy" texture, the content of fine food particles is preferably 98% by mass or less, more preferably 95% by mass or less, even more preferably 85% by mass or less, and most preferably 80% by mass or less. The "mealy" texture expresses the texture of a food that is dry, less moistness, and difficult to swallow.

The content of fine food particles in one or more embodiments of the present invention can be measured, for example, by passing a given amount of composition through a 9-mesh (Tyler mesh), then centrifuging the passed fraction at 15,000 rpm for 1 minute, and measuring the weight of the precipitated fraction from which the separated supernatant is sufficiently removed, whereby the content of fine food particles in the composition can be measured. The residue on the mesh during passage through a 9-mesh is sufficiently allowed to stand until the residue on the mesh passes through the mesh, after which the passed fraction is obtained. If the residue on the mesh does not pass through the mesh even after sufficient standing, the passed fraction may be obtained by applying a weak force that does not change the particle size, for example, by slightly vibrating the mesh.

In one or more embodiments of the present invention, the "fats/oils" are not particularly limited. Examples of fats/oils include edible fats/oils, various fatty acids, and foods using them as raw materials; and edible fats/oils are preferably used.

Examples of edible fats/oils include sesame oil, rapeseed oil, soybean oil, palm oil, palm kernel oil, fractionated palm oil (PMF), cottonseed oil, corn oil, sunflower oil, safflower oil, olive oil, linseed oil, rice oil, camellia oil, perilla oil, flavor oil, coconut oil, grape seed oil, peanut oil, almond oil, avocado oil, salad oil, canola oil, fish oil, beef tallow, lard, chicken fat, medium-chain fatty acid triglyceride (MCT), diglyceride, hardened oil, transesterified oil, milk fat, and ghee. Among these, preferable are liquid edible fats/oils, such as sesame oil, olive oil, rapeseed oil, soybean oil, corn oil, palm oil, and sunflower oil, because they are effective to enhance the smoothness of the liquid or semisolid emulsion seasoning, and allow the more efficient use of one or more embodiments of the present invention.

The edible fats/oils of one or more embodiments may be those contained in the food materials of the liquid or semisolid emulsion seasoning; however, it is preferable to add an extracted and refined fat/oil separately from the food materials, because of better miscibility with the food materials. It is preferable to add an extracted and refined fat/oil in an amount of 10% by mass or more of the total fats/oils; and it is more preferable to add an extracted and refined fat/oil in an amount of 30% by mass or more.

The edible fat/oil of one or more embodiments preferably have a higher proportion of unsaturated fatty acids (total proportion of monounsaturated fatty acid and polyunsaturated fatty acid) than the proportion of saturated fatty acids in the composition, because pulverization treatment can be efficiently performed; and the proportion of unsaturated fatty acids is more preferably higher than twice the proportion of saturated fatty acids.

Examples of foods using edible fats/oils as raw materials include butter, margarine, shortening, fresh cream, and soy milk cream (e.g., Kokurimu (registered trademark), manufactured by Fuji Oil Co., Ltd.). In particular, foods having liquid physical properties can be conveniently used. Two or more of these, and foods further using these as raw materials, may be used in combination at any ratio.

The content of fat/oil in the seasoning of one or more embodiments of the present invention is preferably 5% by mass or more, in terms of the pulverization efficiency of the food materials containing dietary fibers, the emulsion stability of the seasoning, and imparting of appropriate fluidity. In terms of the action and effect of the dietary fibers on the oily feeling (oiliness) and oily odor derived from the fat/oil, the content of fat/oil in the seasoning is preferably 80% by mass or less, more preferably 65% by mass or less, and even more preferably 50% by mass or less.

In terms of bacteriostatic effects, the content of organic acid in the emulsion seasoning of one or more embodiments of the present invention is preferably 0.1% by mass or more, more preferably 0.2% by mass or more, and even more preferably 0.3% by mass or more. Moreover, in terms of the stimulating flavor of sour taste and sour odor, the content of organic acid is preferably 2.0% by mass or less, and more preferably 1.0% by mass or less. Regarding the organic acid, not only the aspect of addition as an organic acid, but also the aspect of addition as a food containing an organic acid may be acceptable, as long as a certain amount of organic acid is contained in the final seasoning. The organic acid may be an organic acid per se or an organic acid salt. Specific examples of the organic acids include citric acid, acetic acid, tartaric acid, malic acid, gluconic acid, lactic acid, fumaric acid, and succinic acid. Among these, acetic acid or citric acid is preferable in terms of their flavor, and acetic acid is particularly preferable. It is preferable to use acetic acid and citric acid in combination because the sour taste of organic acid becomes mild. Examples of the addition method thereof include a method using acetic acid or citric acid per se; a method using acetic acid-containing foods and beverages, such as rice vinegar, grain vinegar, sake vinegar, apple vinegar, wine vinegar (grape vinegar), synthetic vinegar, black vinegar, Chinese vinegar, and balsamic vinegar; a method using citric acid-containing foods and beverages, such as lemon juice; and a combination of these methods. Among these, in terms of the balance with the sour taste of the seasoning, it is preferable, when acetic acid is used, that part or all of the acetic acid contains acetic acid derived from fruit vinegar; it is more preferable to use apple vinegar, balsamic vinegar, or wine vinegar (grape vinegar) as the fruit vinegar. The majority of the derived acetic acids is preferably derived from foods and/or beverages containing these acetic acids. When citric acid is used, it is more preferable to use, as part or all of the citric acid, fruit juice or fruits, and processed products using them as raw materials; and the majority of the derived citric acids is preferably derived from foods and beverages containing these citric acids.

The emulsion seasoning of one or more embodiments of the present invention contains 20% by weight or more of "water," in terms of the emulsion stability of the seasoning, and imparting of appropriate fluidity. The water content of the emulsion seasoning is desirably 25% by mass or more, and more desirably 30% by mass or more. The water content of the emulsion seasoning of one or more embodiments of the present invention represents the weight ratio of the total water content of the whole composition (i.e., the total water content including water contained in the food and other optional components, as well as water added during preparation of the seasoning) to the whole composition. The water content of the whole composition can be measured, for example, by analyzing the composition using the "water content" measurement method prescribed in the Law Concerning Standardization, etc. of Agricultural and Forestry Products (JAS Law).

The emulsion seasoning of one or more embodiments of the present invention preferably contains a "dietary salt." The dietary salt may be the dietary salts contained in the food materials of the emulsion seasoning; however, it is preferable to add a refined dietary salt separately from the food materials, because of better miscibility with the food materials. In one or more embodiments of the present invention, the mass ratio of the total salt content of the emulsion seasoning (i.e., the total salt content including the dietary salts contained in the food fine particles and other optional components, as well as the salts added during preparation of the composition) to the whole seasoning is preferably 0.1% by mass or more, more preferably 0.2% by mass or more, and even more preferably 0.3% by mass or more, in terms of bacteriostatic effects. On the other hand, in terms of moderate seasoning effects, the mass ratio is preferably 20% by mass or less, more preferably 7.0% by mass or less, and even more preferably 5.0% by mass or less.

The seasoning of one or more embodiments of the present invention may contain, if necessary, various foods, food additives, and the like that are used for general foods. Examples include soy sauce, miso, alcohols, amino acids, sugars (glucose, sucrose, fructose, glucose fructose liquid sugar, and high-fructose corn syrup), sugar alcohols (xylitol, erythritol, and maltitol), artificial sweeteners (sucralose, aspartame, saccharin, and acesulfame K), minerals (calcium, potassium, sodium, iron, zinc, magnesium, and salts thereof), flavorings, pH adjusters (sodium hydroxide, potassium hydroxide, lactic acid, citric acid, tartaric acid, malic acid, and acetic acid), cyclodextrin, antioxidants (vitamin E, vitamin C, tea extract, raw coffee bean extract, chlorogenic acid, spice extract, caffeic acid, rosemary extract, vitamin C palmitate, rutin, quercetin, wax myrtle extract, and sesame extract). Further, emulsifiers (glycerin fatty acid ester, acetic acid monoglyceride, lactic acid monoglyceride, citric acid monoglyceride, diacetyl tartaric acid monoglyceride, succinic acid monoglyceride, polyglycerin fatty acid ester, polyglycerin condensed ricinoleic acid ester, quillaja extract, soy saponin, tea seed saponin, and sucrose fatty acid esters) and colorants can also be added. Due to the recent increasing awareness of natural food orientation, a quality free from emulsifiers and/or colorants is desirable, and a quality free from food additives in general (e.g., those listed in the Pocketbook of Food Additive Labelling (2016 edition)) is most desirable.

Further, in order to impart topping effects (effects of making the appearance better and adjusting the flavor and nutritional balance), food materials with large particles, such as meat and seafood, may be added, as appropriate, after pulverization treatment of the emulsion seasoning of one or more embodiments.

The emulsion seasoning of one or more embodiments of the present invention is liquid or semisolid. The term semisolid used herein includes a paste form. Examples include a paste form and source form that can be pressed from a tube or the like.

The emulsion seasoning of one or more embodiments of the present invention preferably has the form of mayonnaise, a mayonnaise-like seasoning, or a tomato-containing sauce. Further, these are preferably in the form of an egg yolk-free mayonnaise-like seasoning or tomato-containing sauce.

The seasoning of one or more embodiments of the present invention exhibits actions and effects, particularly depending on the total content of the refined fine water-soluble dietary fiber and water-insoluble dietary fiber. Although the mechanism thereof is not necessarily clear, it is presumed that the water-soluble dietary fiber embraces water-soluble organic acids and various water-soluble unpleasant flavor components together with water; that the water-insoluble dietary fiber embraces various lipophilic unpleasant flavor components together with fats/oils, and that these refined water-soluble dietary fiber and water-insoluble dietary fiber are uniformly dispersed in the emulsion seasoning to form a network structure of some kind, so that these fibers are retained in the liquid without separation, whereby various unpleasant flavors (taste and odor) are suppressed.

Preferably, the emulsion seasoning of one or more embodiments of the present invention does not undergo oil-water separation even after being frozen at −20° C. for 3 days and then allowed to stand at room temperature for half a day for natural thawing. The freezing temperature may be any temperature of 0° C. or lower as long as the emulsion seasoning is frozen, and the freezing period is not limited;

and freezing is preferably performed at −20° C. or higher within 3 days. The thawing method may be natural thawing or forced rapid thawing, and the method is not limited; and thawing is preferably performed by natural thawing for about half a day. General emulsion seasonings are supposed to be refrigerated after opening. Even in the refrigerator, the temperature may be locally low depending on the storage location and the packing condition of goods, and oil-water separation may occur; however, the emulsion seasoning of one or more embodiments of the present invention is also effective for such oil-water separation in the refrigerator, and preferably, oil-water separation does not occur.

Therefore, for preparation requirements that affect the flavor of the emulsion seasoning, such as pH, organic acid concentration, salt concentration, sugar concentration, water activity, and bacteriostatic agent for lengthening the period of storing the emulsion seasoning, and for achieving bacteriostatic conditions to make the inside of the refrigerator in a bacteriostatic state, the freezing resistance of one or more embodiments of the present invention gives a wider degree of freedom to designing of the flavor of the emulsion seasoning, and can widely respond to various consumer preferences.

Preferably, the emulsion seasoning of one or more embodiments of the present invention does not undergo oil-water separation when heated at 90° C. for 30 minutes, and further heated at 100° C. for 20 minutes. Accordingly, the emulsion seasoning of one or more embodiments of the present invention can be applied to vegetables boiled at a high temperature and freshly fried foods in such a fresh state that they are not cooled. Therefore, seasoning is possible without impairing the taste of the freshly cooked target foods. For mayonnaise or a mayonnaise-like seasoning, the term "oil-water separation" used herein refers to a state in which the oil is separated as an oil layer on the surface of the emulsion seasoning or separated like oil droplets inside the emulsion seasoning. For a tomato-containing sauce, this term refers to a state in which the oil is separated as an oil layer on the surface of the emulsion seasoning or separated like oil droplets inside the emulsion seasoning, or in which coarse particles with aggregated solids are generated to form a grainy state or further a gel state.

Furthermore, preferably, the emulsion seasoning of one or more embodiments of the present invention does not undergo oil-water separation even under conditions reaching a temperature of 180° C., and the emulsion stability and shape retention properties are maintained even during high-temperature heating or high-temperature baking, such as a hot plate and an oven. Conventionally, when okonomiyaki or the like is baked on a hot plate, an emulsion seasoning is sometimes applied thereto during baking. However, because the temperature of the target food is too high, the emulsion seasoning may undergo oil-water separation thereon, and the flavor of the emulsion seasoning and the flavor of the target food may be impaired. When bread or the like that is filled with an emulsion seasoning is baked in an oven, the emulsion seasoning may undergo oil-water separation due to high-temperature treatment, the dough may be moistened, and the texture, the flavor of the target food, and the effect of the flavor of the emulsion seasoning per se may be impaired. The term "oil-water separation" used herein refers to a state in which oil is separated and spreads around the emulsion seasoning in a liquid state, water is separated and most of it evaporates so that solids are burnt, and consequently, the emulsion stability and shape retention properties are not maintained.

The oil-water separation resistance and shape retention properties under high-temperature conditions of 180° C. or more in one or more embodiments of the present invention impart a great degree of freedom to applications to target foods that have been inapplicable until now, and flavoring.

In some cases, the freezing resistance and high-temperature resistance at about 90° C. to 100° C. in one or more embodiments of the present invention can be imparted by the addition of thickeners (gums), without incorporating the refined dietary fibers. However, thickeners are not preferable because they cause artificial viscosity in the oral cavity and change the taste. Further, it was impossible to maintain oil-water separation resistance and shape retention properties at an extremely high temperature of 180° C. or higher in one or more embodiments of the present invention. Therefore, the action and effect of one or more embodiments of the present invention are effective in maintaining the emulsion stability and shape retention properties in a wide temperature range from extremely low temperatures to extremely high temperatures, without causing uncomfortable taste in the emulsion seasonings; a remarkable effect can be deemed to be exhibited. The effect of improving emulsion stability at low and high temperatures is not correlated with the salt content or lipid, but is correlated with the dietary fiber content. If the dietary fiber content is too low, oil-water separation resistance at high temperatures is weak. If the dietary fiber content is too high, oil-water separation resistance is higher; however, the physical properties are extremely hard and dry, resulting in poor eatability. Moreover, if the modal diameter is too small, oil-water separation resistance is higher; however, this seasoning is unsuitable as a food in terms of concerns about the safety of nanomaterials. If the modal diameter is too large, oil-water separation resistance is weak, even though the dietary fiber content is high. Furthermore, if the water content is too low, the oil-water separation resistance is higher; however, the physical properties are extremely hard and dry, resulting in poor eatability. Therefore, it can be understood that, in order to maintain emulsion stability in the low and high temperature ranges, it is necessary that the dietary fibers be refined within a specific range, that the dietary fiber content be within a specific range, and that the water content of the emulsion seasoning be within a specific range.

The emulsion seasoning of one or more embodiments of the present invention has a low water absorption rate and a high oil absorption rate. Preferably, the maximum water absorption rate of the emulsion seasoning of one or more embodiments of the present invention in the period of 2 minutes to 90 minutes after the start of measurement by a "modified method for measuring water absorption of cereal flour" is 0.20% by mass or less per gram of the emulsion seasoning, and the maximum oil absorption rate by the same method is 1.0% by mass or more per gram of the emulsion seasoning.

The "modified method for measuring water absorption of cereal flour" is a method for measuring the water absorption and oil absorption of emulsion seasonings, modified from the "method for measuring water absorption of cereal flour" reported in the National Food Research Institute, National Agriculture and Food Research Organization, "Food Science and Technology," No. 55, p. 63, published on Mar. 29, 2017, "Evaluation and Control of Water Absorption of Cereal Flour Samples," Junko Matsuki et al. (http://www.naro.affrc.go.jp/publicity_report/pub2016 or later/files/nfri_shokuryo55orange.pdf).

The difference between the "method for measuring water absorption of cereal flour" and the "modified method"

thereof is that, due to the difference that flour is able to be absorbed by capillary action, but emulsion seasonings are not, metal mesh is used instead of filter paper, and placed on the bottom of the container in which a sample is placed, so that the emulsion seasoning is in direct contact with water and oil. There are no other significant differences.

Specifically, a plastic container with a bottom diameter of 4.5 cm, a height of 11 cm, and a lid diameter of 5 cm (manufactured by SCP SCIENSE) is used as a container for storing a sample. An air hole with a diameter of 1 mm is formed in the lid, and four holes with a diameter of 6.4 mm are formed in the bottom surface. Before placing a sample, a stainless steel 100-mesh screen (manufactured by Advantech) with a diameter of 4.1 mm is placed on the bottom of the container so that the mesh portion is in contact with the bottom surface. 50 g of the emulsion seasoning is weighed therein and subjected to a test.

As mentioned above, filter paper is replaced by metal mesh for the following reason. If filter paper is used, measured values would have large variation, and the filter paper would affect the evaluation of water absorption and oil absorption. If metal mesh is used, that the influence thereof would be able to be avoided because the emulsion seasoning is in direct contact with water and oil; in fact, the measured values had less variation.

For the evaluation of water absorption and oil absorption, a metal vat with a width of 27.5 cm, a length of 21 cm, and a height of 3.5 cm is used. 1 L of tap water is poured for the evaluation of water absorption, and 1 L of canola oil (manufactured by Nisshin Oillio Group) is poured for the evaluation of oil absorption. Then, two sheets of kitchen paper are stacked on the bottom, and two spatulas are arranged side by side so that the bottom of the container containing a sample does not stick thereto, and the container is held in the air.

As described above, after the container weighing the emulsion seasoning is immersed in water or oil (liquid depth: about 2 cm; the upper surface of the emulsion seasoning from the liquid level: about 2 cm from the liquid level), the weight of the container is measured at the time of 1 minute, 2 minutes, 3 minutes, 5 minutes, 10 minutes, 15 minutes, 20 minutes, 30 minutes, 40 minutes, 50 minutes, 60 minutes, and 90 minutes using a stopwatch. At the elapsed time, the water or oil adhering to the container is sufficiently and quickly wiped off with a Kim towel, and the total weight of the container is measured using an electronic balance (of course, the total weight of the container before immersion is also measured; hereinafter referred to as the initial weight). The upper surface of the emulsion seasoning in the container is positioned higher than the liquid level is for the following reason. That is, this is purely for measuring the amounts of water absorbed and oil absorbed by the emulsion seasoning per se, rather than penetration due to the weight of water or oil per se, by applying pressure to the bottom surface by gravity. Moreover, since the measured value after an elapse of 1 minute is assumed to be affected by the openings in the bottom surface of the container, the measured values after an elapse of 2 minutes or more are used for the evaluation of the measured values.

From the measured value, the amount of water absorbed or amount of oil absorbed at each elapsed time is calculated by the difference from the initial amount, divided by the weight (about 50 g) of the weighed emulsion seasoning to determine the water absorption rate (% by mass) and oil absorption rate (% by mass) per gram of the emulsion seasoning.

Figure 7A:
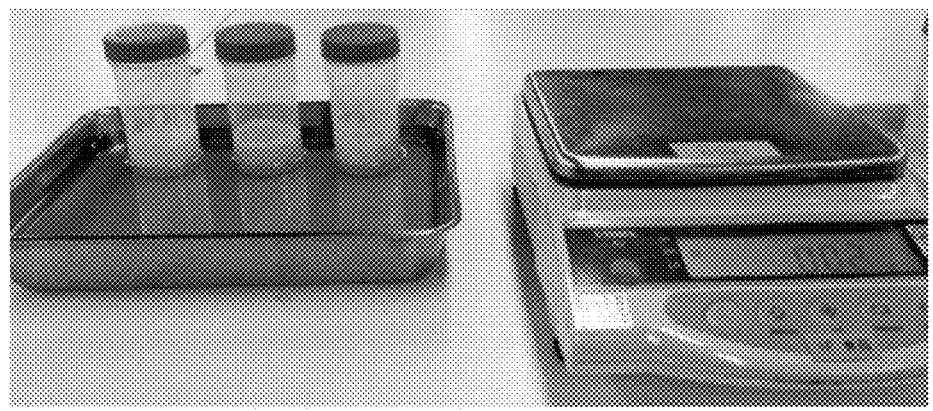
FIGS. 7A-B are schematic diagrams showing the outline of a "modified method for measuring water absorption of cereal flour," (FIG. 7A) and the bottom surface of a container (FIG. 7B).
Figure 7B:
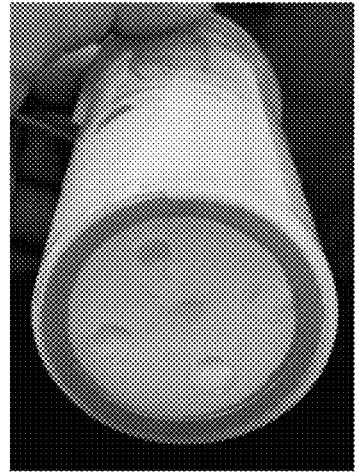
Figures 8A, 8B:
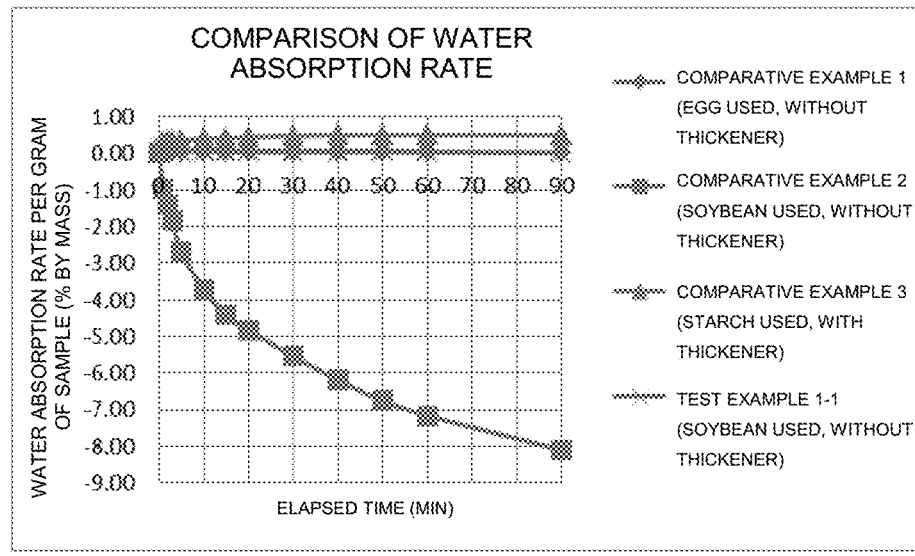
FIGS. 8A-B depict the measured values in Example 10 (water absorption rate of mayonnaise and a mayonnaise-like seasoning).
Figures 9A, 9B:
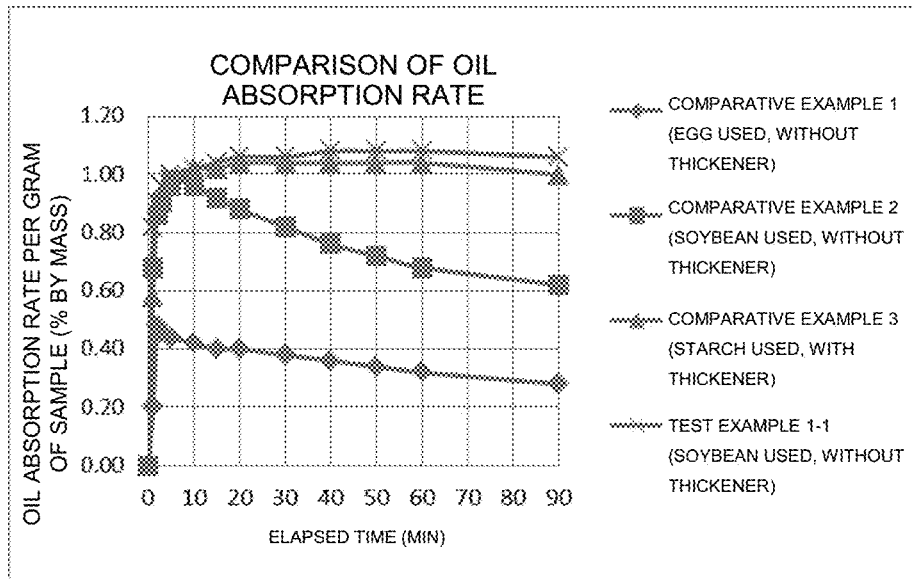
FIGS. 9A-B depict the measured values in Example 10 (oil absorption rate of mayonnaise and a mayonnaise-like seasoning).
Figures 10A, 10B:
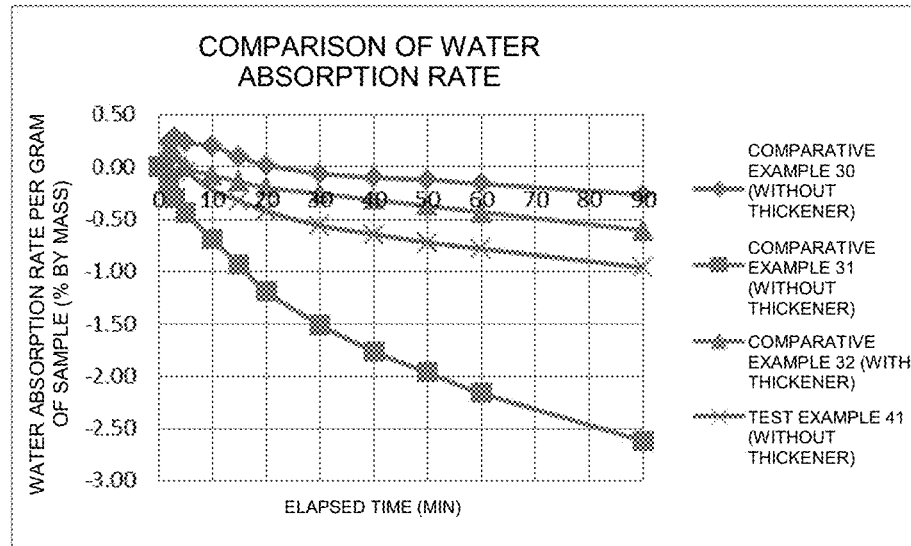
FIGS. 10A-B depict the measured values in Example 10 (water absorption rate of a tomato-containing sauce).
Figures 11A, 11B:
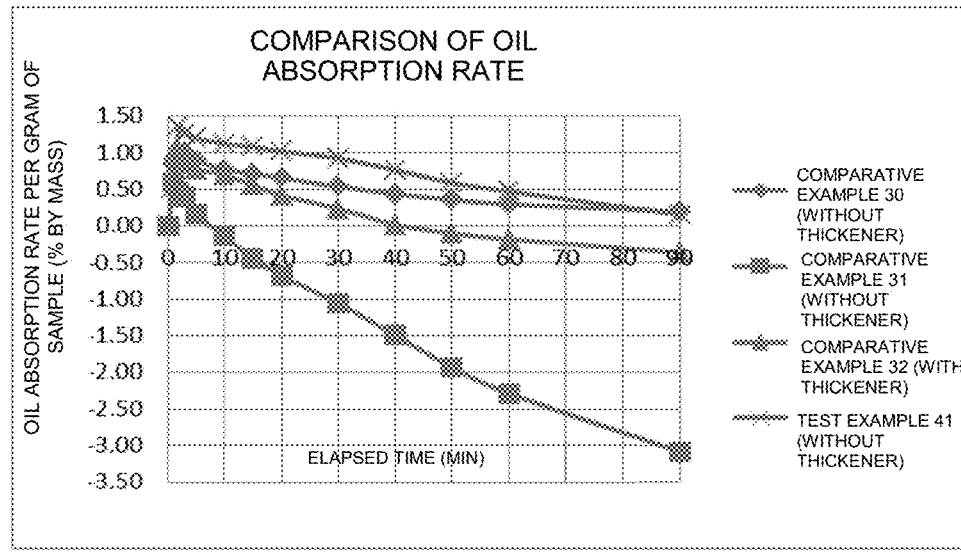
FIGS. 11A-B depict the measured values in Example 10 (oil absorption rate of a tomato-containing sauce).

FIGS. 7A-B show a test system of the "modified method for measuring water absorption of cereal flour".

According to the "modified method for measuring water absorption of cereal flour," the amount of water absorbed and amount of oil absorbed by mayonnaise and a mayonnaise-like seasoning are measured. Further, the amount of water absorbed and amount of oil absorbed by a tomato-containing sauce are measured in the same manner. The measured values are divided by the weight of the weighed emulsion seasoning to determine the water absorption rate (% by mass) and oil absorption rate (% by mass) per gram of each emulsion seasoning.

The above measurement results of the amount of water absorbed and the amount of oil absorbed show that high water absorption is not preferable because the moistness inherent to the target food, the soft texture associated therewith, and the taste are impaired; and when applied to or placed on foods with a high oil content (e.g. fried tofu and deep-fried food), the emulsion seasoning preferably has high oil absorption because the oiliness of the target foods is suppressed, making it easier to feel the favorable texture associated therewith and the original flavor of the food materials. From these points of view, preferably, the maximum water absorption rate of the emulsion seasoning of one or more embodiments of the present invention in the period of 2 minutes to 90 minutes after the start of measurement by the "modified method for measuring water absorption of cereal flour" is 0.20% by mass or less per gram of the emulsion seasoning, and the maximum oil absorption rate by the same method is 1.0% by mass or more per gram of the emulsion seasoning.

The measured values of the amount of water absorbed and amount of oil absorbed by the above "modified method for measuring water absorption of cereal flour" are small as absolute values; however, they are based on the measurement method for objectively showing water absorption and oil absorption. The actual mode of applying or placing the emulsion seasoning of one or more embodiments of the present invention onto target foods during eating is generally performed such that the emulsion seasoning is applied thinly and broadly. Even if the measured values of the "modified method for measuring water absorption of cereal flour" used in this test are small, they do not directly express the magnitude of the water absorption/oil absorption effects in actual target foods. In fact, it is apparent that when the emulsion seasoning is applied thinly and broadly, higher water absorption/oil absorption effects than indicated by the values measured by this method are obtained. On the other hand, even if water absorption and oil absorption are hardly recognized or show negative values, the same tendency appears during actual eating.

In fact, as the emulsion seasoning of one or more embodiments of the present invention was placed on a food with a high water content and a food with a high oil content for eating evaluation, as described above, in raw vegetable salad as a representative example of foods with a high water content, the emulsion seasoning of one or more embodiments of the present invention with low water absorption and high oil absorption did not affect the moistness of the raw vegetable salad, the soft texture associated therewith, and the taste; thus, while fully feeling the original flavor of vegetables, the salad was eaten tastier than before, while feeling the seasoning effect of the emulsion seasoning. In contrast, in pork cutlet as a representative example of foods with a high oil content, the emulsion seasoning of one or more embodiments of the present invention with low water absorption and high oil absorption absorbed excess oil on the surface of the pork cutlet, enhanced the crispy texture of the freshly fried clothing, suppressed the flavor of oil by absorption, and enhanced the original flavor of pork, which was an ingredient of the pork cutlet; thus, the pork cutlet was eaten tastier than before, while feeling the seasoning effect of the emulsion seasoning. Regarding the effect of improving the taste and texture of target foods by the low water absorption and high oil absorption of the emulsion seasoning, if the dietary fiber content is too low, it can cause the target food to contain more moisture, which is not suitable. If the fiber content is too high, the physical properties are extremely hard and dry, and the miscibility with the target food becomes worse, so that the action and effect are less likely to be exhibited. Moreover, if the modal diameter is too small, the oil absorption becomes high; however, this emulsion seasoning is unsuitable as a food in terms of concerns about the safety of nanomaterials. If the modal diameter is too large, it can cause the target food to contain moisture, which is not suitable. Furthermore, if the water content is too small, the oil absorption becomes high; however, the physical properties are extremely hard and dry, and the miscibility with the target food becomes worse, so that the action and effect are less likely to be exhibited. Therefore, it can be understood that in order to exhibit the effect of improving the taste and texture of target foods, it is necessary that the dietary fibers be refined within a specific range, that the dietary fiber content be within a specific range, and that the water content of the emulsion seasoning be within a specific range.

Accordingly, one or more embodiments of the present invention also include the following processes.

(1) A method for manufacturing a liquid or semisolid emulsion seasoning, the method comprising the steps (a) and (b):

(a) mixing fine food particles comprising dietary fibers, a fat/oil, an organic acid, and a food-derived emulsifier to produce a mixed liquid having a water content adjusted to 20% by mass or more, and a total dietary fiber content adjusted to 0.8% by mass or more and 23% by mass or less; and (b) performing pulverization treatment and emulsification treatment such that the fine food particles have a modal diameter of 0.3 μm or more and 115 μm or less.

(2) The above method, wherein the majority of the pulverization treatment in (b) is performed under a pressurized condition of 0.01 MPa or more.

(3) A method for improving the flavor of a liquid or semisolid emulsion seasoning, the method comprising the steps (c) and (d):

(c) mixing fine food particles comprising dietary fibers, a fat/oil, an organic acid, and a food-derived emulsifier to prepare a mixed liquid having a water content adjusted to 20% by mass or more, and a total dietary fiber content adjusted to 0.8% by mass or more and 23% by mass or less; and (d) performing pulverization treatment and emulsification treatment such that the fine food particles have a modal diameter of 0.3 μm or more and 115 μm or less.

(4) The method according to (3) above, wherein the majority of the pulverization treatment in (d) is performed under a pressurized condition of 0.01 MPa or more.

(5) A method for improving the emulsion stability and shape retention properties of a liquid or semisolid emulsion seasoning, the method comprising the steps (e) and (f):

(e) mixing fine food particles comprising dietary fibers, a fat/oil, an organic acid, and a food-derived emulsifier to prepare a mixed liquid having a water content adjusted to 20% by mass or more, and a total dietary fiber content adjusted to 0.8% by mass or more and 23% by mass or less; and (f) performing pulverization treatment and emulsification treatment such that the fine food particles have a modal diameter of 0.3 μm or more and 115 μm or less.

(6) The method according to (5) above, wherein the majority of the pulverization treatment in (f) is performed under a pressurized condition of 0.01 MPa or more.

(7) A method for improving, by a liquid or semisolid emulsion seasoning, the texture and flavor of a food to which the emulsion seasoning is added, the method comprising the steps (g) and (h):

(g) mixing fine food particles comprising dietary fibers, a fat/oil, an organic acid, and a food-derived emulsifier to prepare a mixed liquid having a water content adjusted to 20% by mass or more, and a total dietary fiber content adjusted to 0.8% by mass or more and 23% by mass or less; and (h) performing pulverization treatment and emulsification treatment such that the fine food particles have a modal diameter of 0.3 μm or more and 115 μm or less.

(8) The method according to (7) above, wherein the majority of the pulverization treatment in (h) is performed under a pressurized condition of 0.01 MPa or more.

EXAMPLES

One or more embodiments of the present invention will be described in more detail below with reference to Examples; however, these Examples are merely provided for convenience of explanation, and the present invention is not limited to these Examples in any way.

[Example 1] Method for Preparing Liquid or Semisolid Emulsion Seasoning

Liquid or semisolid emulsion seasonings were prepared as follows.

Mixed liquids were prepared by mixing the pulverized raw materials shown in Table 2, and pulverization treatment was further performed under the conditions shown in the table, as necessary. As the liquid or semisolid emulsion seasoning used herein, as described above, mayonnaise containing all of an organic acid, egg yolk, and a fat/oil, was selected as a representative example.

TABLE 2

| Formulation | Test Example 1-1 | Test Example 1-2 | Test Example 2 | Test Example 3 | Average value |
|---|---|---|---|---|---|
| Yield (g) | 1000.0 | 1000.0 | 1000.0 | 1000.0 | |
| Water | 0.0 | 0.0 | 200.0 | 182.8 | |
| Kelp stock (kelp:water (weight ratio) = 19:1, extraction at 60° C. for 2 hr) | 467.0 | 467.0 | 0.0 | 0.0 | |

TABLE 2-continued

|  | Formulation | Test Example 1-1 | Test Example 1-2 | Test Example 2 | Test Example 3 | Average value |
|---|---|---|---|---|---|---|
|  | Salt | 14.5 | 14.5 | 16.2 | 16.2 |  |
|  | White wine vinegar | 80.0 | 80.0 | 80.0 | 80.0 |  |
|  | Cabbage paste | 0.0 | 0.0 | 266.3 | 276.0 |  |
|  | Onion paste | 0.0 | 0.0 | 40.0 | 40.0 |  |
|  | Enoki mushroom powder paste | 0.0 | 0.0 | 0.0 | 10.0 |  |
|  | Roasted soybean powder | 67.5 | 67.5 | 67.5 | 65.0 |  |
|  | Freeze-dried onion powder | 5.0 | 5.0 | 0.0 | 0.0 |  |
|  | Potato powder | 35.0 | 35.0 | 0.0 | 0.0 |  |
|  | Mustard powder | 8.0 | 8.0 | 7.0 | 7.0 |  |
|  | Canola oil | 323.0 | 323.0 | 323.0 | 323.0 |  |
| Treatment method | Pulverized particle size (μm or less) during purification of raw materials | 350 | 350 | 350 | 350 |  |
| *Post-treatment after mixing the above raw materials | Pulverization treatment Mode (first) | No (hand mixing) | Wet bead mill (one-pass) | Wet bead mill (two-pass) | Wet bead mill (one-pass) |  |
|  | Mode (second) |  | No | No | High-pressure homogenizer treatment |  |
|  | Deaeration treatment | Yes | Yes | Yes | Yes |  |
|  | Sterilization treatment | Temperature reaching 85° C. | Temperature reaching 85° C. | Temperature reaching 85° C. | Temperature reaching 85° C. |  |
| Viscosity/ particle size | Water content (% by mass) | 54.7 | 54.7 | 43.3 | 42.1 |  |
|  | Viscosity (Pa · s, 20° C.) | 16.72 | 7.04 | 6.38 | 4.86 |  |
| particle size (μm) | Modal diameter | 20.17 | 5.998 | 4.625 | 5.500 |  |
|  | Median diameter (d50) | 24.84 | 5.284 | 6.385 | 8.337 |  |
|  | Median diameter (d90) | 296.5 | 17.78 | 118.6 | 142.2 |  |
|  | Arithmetic standard deviation | 88.91 | 4.920 | 52.47 | 39.00 |  |
| Dietary fiber content | Water-soluble dietary fiber (% by mass) | 0.355 | 0.355 | 0.295 | 0.326 | 0.326 |
|  | Water-insoluble dietary fiber (% by mass) | 1.060 | 1.060 | 1.288 | 1.561 | 1.303 |
|  | Total amount of dietary fiber (% by mass) | 1.415 | 1.415 | 1.583 | 1.887 | 1.629 |
| Dietary fiber (ratio) | Water-soluble/water-insoluble ratio | 0.335 | 0.335 | 0.229 | 0.209 | 0.258 |

*The pulverization treatment during purification of raw materials was grinding using Wonder Crusher WC-3 (manufactured by Osaka Chemical Co., Ltd.).
*As the wet bead mill treatment, one- or two-pass treatment was performed using a wet bead mill pulverizer Starmill Labstar Mini LMZ015 (manufactured by Ashizawa Finetech Ltd.) with zirconia beads having a diameter of 1 mm at 3,884 rpm at a feeding rate of 45 rpm (required time: 5 minutes/time).
*The high-pressure homogenizer treatment was performed using PANDA 2K Homogenizer (manufactured by Niro Soavi) at 100 MPa for 2 minutes.
*The particle size after preparation was measured using a laser diffraction particle size distribution analyzer Microtrac MT3300 EX 2 system (manufactured by MicrotracBEL Corp.).
*The viscosity was measured using a B-type viscometer (20° C., 30 rpm, manufactured by Tokyo Keiki Inc.).
*The dietary fiber content was measured by an enzyme-weight method (modified Prosky method).

As the raw materials, a formulation using soybean as an emulsion base material, in place of egg yolk, was assembled, white wine vinegar was selected an organic acid, and canola oil was selected as a fat/oil. In addition, various fine powdered vegetables, mushrooms, and potatoes were used to construct mayonnaise-like physical properties, and mustard powder, kelp stock, and salt were used for flavoring.

A mixture of these were then mixed well by hand, and further subjected to pulverization treatment (the pulverization treatment was performed under a pressurized condition of 0.01 MPa or more by wet bead mill treatment or high-pressure homogenizer treatment). After deaeration, the resultant was sealed in a jam jar, sterilized at a temperature reaching 85° C., and cooled with water to give mayonnaise-like seasonings.

The prepared mayonnaise-like seasonings were calculated for viscosity, particle size, dietary fiber content (water-soluble/water-insoluble), and the ratio of water-soluble dietary fiber to water-insoluble dietary fiber. The methods thereof are as shown in Table 2. In particular, the particle sizes, such as modal diameter, were measured according to the measurement procedure described in the "Method for measuring the particle size distribution (modal diameter, specific surface area, and maximum particle size)". The dietary fiber content, etc., were measured according to the measurement procedure described in the "modified Prosky method". The water content was measured according to the procedure described in the "measurement method prescribed in the Law Concerning Standardization, etc. of Agricultural and Forestry Products (JAS Law)". The other items were measured by ordinary analysis methods.

Further, for these prepared mayonnaise-like seasonings (Test Examples 1 to 3), among commercially available mayonnaise (Comparative Example 1, "Kewpie Mayonnaise (manufactured by Kewpie Corporation)") and commercially available mayonnaise-like seasonings (Comparative Example 2, semisolid dressing, "Special soybean mayonnaise using whole soybean powder without using 'egg' (manufactured by Soycom)) and Comparative Example 3, "Nisshin Mayodore (manufactured by Nisshin Oillio Group)"), Comparative Example 1 was used as a control, and the "intensity of stimulation caused by sour taste and sour odor derived from the organic acid," "strength of unpleasant flavor derived from egg yolk, soybean, almond, or tomato," "strength of unpleasant flavor derived from the fat/oil," and "overall evaluation" were evaluated according to the following criteria. The evaluation was conducted by six professional panelists, and their average evaluation value (rounded to the nearest decimal place) was used.

(Evaluation Criterion 1: Intensity of Stimulation Caused by Sour Taste and Sour Odor Derived from the Organic Acid)
5: Intense stimulation
4: Slightly intense stimulation
3: No difference from the control
2: Slightly weak stimulation
1: Weak stimulation (Evaluation Criterion 2: Strength of Unpleasant Flavor Derived from Egg Yolk, Soybean, Almond, or Tomato)
5: Strong unpleasant flavor
4: Slightly strong unpleasant flavor
3: No difference from the control
2: Slightly weak unpleasant flavor
1: Weak unpleasant flavor (Evaluation Criterion 3: Strength of Unpleasant Flavor Derived from the Fat/Oil)
5: Strong unpleasant flavor
4: Slightly strong unpleasant flavor
3: No difference from the control
2: Slightly weak unpleasant flavor
1: Weak unpleasant flavor (Evaluation Criterion 4: Physical Properties)
5: Soft
4: Slightly soft
3: No difference from the control
2: Slightly hard
1: Hard and dry (Evaluation Criterion 5: Overall Evaluation)
5: Superior in the unpleasant flavor-suppressing effect and the eatability due to the physical properties
4: Slightly superior in the unpleasant flavor-suppressing effect and the eatability due to the physical properties
3: No difference from the control
2: Slightly inferior in the unpleasant flavor-suppressing effect and the eatability due to the physical properties.
1: Inferior in the unpleasant flavor-suppressing effect and the eatability due to the physical properties.

Table 3 shows the results.

TABLE 3

| Formulation | Comparative Example 1 | Comparative Example 2 | Comparative Example 3 | Test Example 1-1 | Test Example 1-2 | Test Example 2 | Test Example 3 |
| --- | --- | --- | --- | --- | --- | --- | --- |
| Emulsion base material | Egg yolk | Soybean | Thickener/modified starch | Soybean | Soybean | Soybean | Soybean |
| Water content (% by mass) | 20.8 | 23.4 | 32.5 | 54.7 | 54.7 | 43.3 | 42.1 |
| Acetic acid content (% by mass) | 0.61 | 0.88 | 0.72 | 0.68 | 0.68 | 0.61 | 0.59 |
| pH | 4.12 | 4.21 | 3.71 | 4.43 | 4.43 | 4.57 | 4.55 |
| Salt content (% by mass) | 1.83 | 1.74 | 2.58 | 1.64 | 1.64 | 1.73 | 1.70 |
| Sugar (% by mass) | 0.0 | 0.0 | 0.0 | 0.0 | 0.0 | 0.0 | 0.0 |
| Lipid content (% by mass) | 74.7 | 61.3 | 57.3 | 34.0 | 34.0 | 34.0 | 33.9 |
| Viscosity (Pa · s, 20° C.) | 41.3 | 8.72 | 85.6 | 16.72 | 7.04 | 6.38 | 4.86 |
| Dietary fiber (% by mass) | 0.000 | 0.700 | 0.000 | 1.415 | 1.415 | 1.583 | 1.887 |
| Intensity of stimulation by sour taste and sour odor derived from organic acid | 3 | 2 | 4 | 2 | 1 | 1 | 1 |
| Strength of unpleasant flavor derived from egg yolk or soybean | 3 | 4 | 2 | 2 | 1 | 1 | 1 |
| Strength of unpleasant flavor derived from fat/oil | 3 | 3 | 4 | 2 | 2 | 1 | 1 |
| Physical properties | 3 | 4 | 3 | 2 | 3 | 3 | 3 |
| Overall evaluation (evaluation including remarks) | 3 | 2 | 2 | 4 | 4 | 5 | 5 |
| Remarks | Control | Only soybean was used as a raw material, and the dietary fiber content was slightly low | Artificial viscosity was felt in the oral cavity, and change in taste was felt | Smooth | Smooth | Smooth | Smooth |

\* The measurement items other than viscosity were measured according to ordinary methods.
\* The viscosity was measured using a B-type viscometer (20° C., 30 rpm, manufactured by Tokyo Keiki Inc.).

The results surprisingly showed that in the prepared products of Test Examples 1 to 3, the intensity of stimulation caused by sour taste and sour odor derived from the organic acid, the strength of unpleasant flavor derived from soybean, and the strength of unpleasant flavor derived from the fat/oil were more remarkably suppressed than in Comparative Examples 1 to 3, the physical properties tended to be smoother and better than the control, repellent action due to stimulation and unpleasant flavor was remarkably improved on the whole, and a quality with excellent eatability was obtained.

[Example 2] Verification of Effect of Suppressing Unpleasant Flavor of Liquid or Semisolid Emulsion Seasoning by Dietary Fiber The results of Example 1 showed that while the mayonnaise-like seasonings prepared in Test Examples 1 to 3 did not use egg yolk, but used an organic acid and a fat/oil, the quality improvement effect thereof was not correlated with the salt content, sugars, or viscosity, but was correlated with the fat/oil content and the dietary fiber content. However, regarding the fat/oil content, the above action and effect did not change even when the fat/oil content was made equivalent to that of the Comparative Example, although the details of the results were not shown. Then, since large amounts of vegetables were used in the prepared products of the Test Examples, the verification test was performed under the assumption that the above action and effect were derived from the dietary fibers.

As a method, commercially available mayonnaise ("Kewpie Mayonnaise (manufactured by Kewpie Corporation)") was used. As shown in Table 4, dietary fibers (a pectin preparation (Purified Pectin (manufactured by Sigma, derived from apple)) was used as a representative example of the water-soluble dietary fiber, and a cellulose preparation (NP Fiber W100F (manufactured by Nippon Paper Industries Co., Ltd.)) was used as a representative example of the water-insoluble dietary fiber) in amounts equivalent to those of a test product were added to 20 g of the mayonnaise, and the resulting mixture was stirred well for uniform dispersion. The dietary fibers added herein were fine powders previously passed through a 149-mesh (opening: 100 μm) using a JIS test sieve. The modal diameter was measured according to the measurement procedure described in the "Method for measuring the particle size distribution (modal diameter, specific surface area, and maximum particle size)". The water content was measured according to the procedure described in the "measurement method prescribed in the Law Concerning Standardization, etc. of Agricultural and Forestry Products (JAS Law)".

The quality of each prepared sample was evaluated according to the following criteria, while using a dietary fiber-free sample as a control. The evaluation was conducted by six professional panelists, and their average evaluation value (rounded to the nearest decimal place) was used.

(Evaluation Criterion 6: Intensity of Stimulation Caused by Sour Taste and Sour Odor Derived from the Organic Acid)
5: Stimulation was remarkably weaker than the control.
4: Stimulation was clearly weaker than the control.
3: Stimulation was weaker than the control.
2: Stimulation was slightly weaker than the control.
1: There was no difference from the control.
(Evaluation Criterion 7: Strength of Unpleasant Flavor Derived from Egg Yolk, Soybean, Almond, or Tomato)
5: Unpleasant flavor was remarkably weaker than the control.
4: Unpleasant flavor was clearly weaker than the control.
3: Unpleasant flavor was weaker than the control.
2: Unpleasant flavor was slightly weaker than the control.
1: There was no difference from the control.
(Evaluation Criterion 8: Strength of Unpleasant Flavor Derived from the Fat/Oil)
5: Unpleasant flavor was remarkably weaker than the control.
4: Unpleasant flavor was clearly weaker than the control.
3: Unpleasant flavor was weaker than the control.
2: Unpleasant flavor was slightly weaker than the control.
1: There was no difference from the control.
(Evaluation Criterion 9: Physical Properties)
5: No difference from the control
4: Slightly harder than the control
3: Harder than the control
2: Clearly harder than the control
1: Remarkably harder than the control and dry
(Evaluation Criterion 10: Overall Evaluation)
5: Superior in the unpleasant flavor-suppressing effect and the eatability due to the physical properties
4: Slightly superior in the unpleasant flavor-suppressing effect and the eatability due to the physical properties
3: No issue in the unpleasant flavor-suppressing effect and the eatability due to the physical properties
2: Slightly inferior in the unpleasant flavor-suppressing effect or the eatability due to the physical properties
1: Inferior in the unpleasant flavor-suppressing effect or the eatability due to the physical properties Table 4 shows the results.

TABLE 4

| | Dietary fiber content (% by mass) | | | Water-soluble/water-insoluble ratio | Total amount added per 20 g of | | Modal diameter |
| --- | --- | --- | --- | --- | --- | --- | --- |
| | Pectin | Cellulose | Total | of dietary fiber | mayonnaise | Remarks | (μm) |
| Comparative Example 4 | — | — | 0% | 0/0 | 0 mg | Control | 7.778 |
| Comparative Example 5 | 0.30% | — | 0.30% | 1/0 | 60 mg | Water-soluble alone | 7.778 |
| Comparative Example 6 | — | 1.30% | 1.30% | 0/1 | 260 mg | Water-insoluble alone | 7.778 |
| Test Example 4 | 0.30% | 1.30% | 1.60% | 0.231 | 320 mg | Water-soluble + water-insoluble | 7.778 |
| Comparative Example 7 | 1.60% | — | 1.60% | 1/0 | 320 mg | Water-soluble (total amount adjusted) | 7.778 |
| Comparative Example 8 | — | 1.60% | 1.60% | 0/1 | 320 mg | Water-insoluble (total amount adjusted) | 7.778 |

TABLE 4-continued

|  | Water content (% by mass) | Evaluation results | | | | |
|---|---|---|---|---|---|---|
|  |  | Stimulation by sour taste and sour odor | Unpleasant flavor of egg yolk | Unpleasant flavor derived from fat/oil | Physical properties | Overall evaluation |
| Comparative Example 4 | 20.8 | — | — | — | — | — |
| Comparative Example 5 | 20.7 | 1 | 1 | 1 | 5 | 1 |
| Comparative Example 6 | 20.5 | 1 | 1 | 1 | 5 | 1 |
| Test Example 4 | 20.5 | 4 | 4 | 4 | 5 | 4 |
| Comparative Example 7 | 20.5 | 1 | 1 | 1 | 5 | 1 |
| Comparative Example 8 | 20.5 | 1 | 1 | 1 | 5 | 1 |

The results of Table 4 showed that, compared with Comparative Example 4 as the control, the evaluation results of each evaluation item were not different from those of the control in the case of the water-soluble dietary fiber alone or the water-insoluble dietary fiber alone; whereas only in the case of the water-soluble dietary fiber and the water-insoluble dietary fiber in combination, suppression of stimulation caused by sour taste and sour odor, suppression of the unpleasant flavor of egg yolk, and suppression of unpleasant flavor derived from the fat/oil were clearly recognized. Therefore, it was assumed that the quality improvement recognized in Test Examples 1 to 3 prepared in Example 1 was attributable to the action of the coexistence of the water-soluble dietary fiber and the water-insoluble dietary fiber.

[Example 3] Verification of Blending Ratio of Water-Soluble Dietary Fiber to Water-Insoluble Dietary Fiber for Action and Effect The results of Example 2 indicated that the quality improvement effect in Test Examples 1 to 3 recognized in Example 1 was attributable to the action of the coexistence of the water-soluble dietary fiber and the water-insoluble dietary fiber; thus, the relationship between the content ratio of these fibers and the quality improvement effect was verified here. The modal diameter was measured according to the measurement procedure described in the "Method for measuring the particle size distribution (modal diameter, specific surface area, and maximum particle size)". The water content was measured according to the procedure described in the "measurement method prescribed in the Law Concerning Standardization, etc. of Agricultural and Forestry Products (JAS Law)".

The addition ratio of water-soluble dietary fiber and water-insoluble dietary fiber was varied as shown in Table 5 in the same manner as in Example 2, and the evaluation was conducted in the same manner as in Example 2. The total content of pectin, which was a representative of the water-soluble dietary fiber, and cellulose, which was a representative of the water-insoluble dietary fiber, was fixed at 1.60% by mass, as in Example 2. Table 5 shows the results.

TABLE 5

|  | Dietary fiber content (% by mass) | | | Water-soluble/water-insoluble ratio | Total amount added per 20 g of mayonnaise | Modal diameter (μm) | Water content (% by mass) |
|---|---|---|---|---|---|---|---|
|  | Pectin | Cellulose | Total | of dietary fiber |  |  |  |
| Comparative Example 4 | 0% | 0% | 0% | — (Control) | 320 mg | 7.778 | 20.8 |
| Comparative Example 9 | 0.04% | 1.56% | 1.60% | 0.0256 | 320 mg | 7.778 | 20.5 |
| Comparative Example 10 | 0.08% | 1.52% | 1.60% | 0.0526 | 320 mg | 7.778 | 20.5 |
| Test Example 5 | 0.16% | 1.44% | 1.60% | 0.111 | 320 mg | 7.778 | 20.5 |
| Test Example 6 | 0.24% | 1.36% | 1.60% | 0.176 | 320 mg | 7.778 | 20.5 |
| Test Example 7 | 0.32% | 1.28% | 1.60% | 0.250 | 320 mg | 7.778 | 20.5 |
| Test Example 8 | 0.40% | 1.20% | 1.60% | 0.333 | 320 mg | 7.778 | 20.5 |
| Test Example 9 | 0.48% | 1.12% | 1.60% | 0.429 | 320 mg | 7.778 | 20.5 |
| Test Example 10 | 0.64% | 0.96% | 1.60% | 0.667 | 320 mg | 7.778 | 20.5 |
| Test Example 11 | 0.80% | 0.80% | 1.60% | 1.00 | 320 mg | 7.778 | 20.5 |
| Test Example 12 | 0.96% | 0.64% | 1.60% | 1.50 | 320 mg | 7.778 | 20.5 |

TABLE 5-continued

| | | | | | | | |
|---|---|---|---|---|---|---|---|
| Test Example 13 | 1.12% | 0.48% | 1.60% | 2.33 | 320 mg | 7.778 | 20.5 |
| Test Example 14 | 1.28% | 0.32% | 1.60% | 4.00 | 320 mg | 7.778 | 20.5 |
| Comparative Example 11 | 1.44% | 0.16% | 1.60% | 9.00 | 320 mg | 7.778 | 20.5 |

| | Evaluation results | | | | |
|---|---|---|---|---|---|
| | Stimulation by sour taste and sour odor | Unpleasant flavor of egg yolk | Unpleasant flavor derived from fat/oil | Physical properties | Overall evaluation |
| Comparative Example 4 | — | — | — | — | — |
| Comparative Example 9 | 2 | 2 | 2 | 5 | 2 |
| Comparative Example 10 | 2 | 2 | 2 | 5 | 2 |
| Test Example 5 | 3 | 3 | 3 | 5 | 3 |
| Test Example 6 | 4 | 4 | 4 | 5 | 4 |
| Test Example 7 | 4 | 4 | 4 | 5 | 4 |
| Test Example 8 | 5 | 5 | 5 | 5 | 5 |
| Test Example 9 | 5 | 5 | 5 | 5 | 5 |
| Test Example 10 | 5 | 5 | 5 | 5 | 5 |
| Test Example 11 | 5 | 5 | 5 | 5 | 5 |
| Test Example 12 | 4 | 4 | 4 | 4 | 4 |
| Test Example 13 | 4 | 4 | 4 | 4 | 4 |
| Test Example 14 | 3 | 3 | 3 | 3 | 3 |
| Comparative Example 11 | 3 | 3 | 3 | 2 | 2 |

As a result, when the water-soluble dietary fiber and the water-insoluble dietary fiber were used in combination, suppression of stimulation caused by sour taste and sour odor, suppression of the unpleasant flavor of egg yolk, and suppression of unpleasant flavor derived from the fat/oil were recognized, regardless of the addition ratio of these fibers. It was also found that the content ratio of water-soluble dietary fiber to water-insoluble dietary fiber was preferably in the range of 0.1 or more and 4 or less. Further, it was found that the content ratio of water-soluble dietary fiber to water-insoluble dietary fiber was more preferably in the range of 0.17 or more and 2.4 or less, and even more preferably in the range of 0.3 or more and 1 or less, in terms of the strength of the action and effect.

[Example 4] Verification of Total Content of Water-Soluble Dietary Fiber and Water-Insoluble Dietary Fiber for Action and Effect Here, the influence of the total content of water-soluble dietary fiber and water-insoluble dietary fiber on the action and effect was further verified.

The total amount of water-soluble dietary fiber and water-insoluble dietary fiber added was changed as shown in Table 6-1 in the same manner as in Example 2, and the evaluation was conducted in the same manner as in Example 2. The content ratio of water-soluble dietary fiber to water-insoluble dietary fiber was fixed at 0.333, based on the results of Example 3. Table 6-1 shows the results. The modal diameter was measured according to the measurement procedure described in the "Method for measuring the particle size distribution (modal diameter, specific surface area, and maximum particle size)". The water content was measured according to the procedure described in the "measurement method prescribed in the Law Concerning Standardization, etc. of Agricultural and Forestry Products (JAS Law)".

TABLE 6-1

| | Dietary fiber content (% by mass) | | | Water-soluble/water-insoluble ratio | Total amount added per 20 g of dietary fiber mayonnaise | Modal diameter (µm) | Water content (% by mass) |
|---|---|---|---|---|---|---|---|
| | Pectin | Cellulose | Total | | | | |
| Comparative Example 4 | 0% | 0% | 0% | — (Control) | 0 (Control) | 7.778 | 20.8 |

TABLE 6-1-continued

| | | | | | | | |
|---|---|---|---|---|---|---|---|
| Comparative Example 12 | 0.025% | 0.075% | 0.10% | 0.333 | 0.02 | 7.778 | 20.8 |
| Comparative Example 13 | 0.050% | 0.150% | 0.20% | 0.333 | 0.04 | 7.778 | 20.8 |
| Comparative Example 14 | 0.10% | 0.30% | 0.40% | 0.333 | 0.08 | 7.778 | 20.7 |
| Test Example 15 | 0.20% | 0.60% | 0.80% | 0.333 | 0.16 | 7.778 | 20.6 |
| Test Example 16 | 0.40% | 1.20% | 1.60% | 0.333 | 0.32 | 7.778 | 20.5 |
| Test Example 17 | 0.60% | 1.80% | 2.40% | 0.333 | 0.48 | 7.778 | 20.3 |
| Test Example 18 | 0.80% | 2.40% | 3.20% | 0.333 | 0.64 | 7.778 | 20.2 |
| Test Example 19 | 1.00% | 3.00% | 4.00% | 0.333 | 0.80 | 7.778 | 20.0 |
| Comparative Example 15 | 1.20% | 3.60% | 4.80% | 0.333 | 0.96 | 7.778 | 19.8 |
| Comparative Example 16 | 1.40% | 4.20% | 5.60% | 0.333 | 1.12 | 7.778 | 19.7 |
| Comparative Example 17 | 2.00% | 6.00% | 8.00% | 0.333 | 1.60 | 7.778 | 19.3 |
| Comparative Example 18 | 2.50% | 7.50% | 10.00% | 0.333 | 2.00 | 8.482 | 18.9 |
| Comparative Example 19 | 3.00% | 9.00% | 12.00% | 0.333 | 2.40 | 8.482 | 18.6 |
| Comparative Example 20 | 3.50% | 10.50% | 14.00% | 0.333 | 2.80 | 8.482 | 18.2 |
| Comparative Example 21 | 4.00% | 12.00% | 16.00% | 0.333 | 3.20 | 8.482 | 17.9 |

| | Evaluation results | | | | |
|---|---|---|---|---|---|
| | Stimulation by sour taste and sour odor | Unpleasant flavor of egg yolk | Unpleasant flavor derived from fat/oil | Physical properties | Overall evaluation |
| Comparative Example 4 | — | — | — | — | — |
| Comparative Example 12 | 2 | 2 | 2 | 5 | 2 |
| Comparative Example 13 | 2 | 2 | 2 | 5 | 2 |
| Comparative Example 14 | 2 | 2 | 2 | 5 | 2 |
| Test Example 15 | 3 | 3 | 3 | 5 | 3 |
| Test Example 16 | 4 | 4 | 4 | 5 | 4 |
| Test Example 17 | 5 | 5 | 5 | 5 | 5 |
| Test Example 18 | 5 | 5 | 5 | 4 | 4 |
| Test Example 19 | 5 | 5 | 5 | 4 | 4 |
| Comparative Example 15 | 4 | 4 | 4 | 3 | 3 |
| Comparative Example 16 | 4 | 4 | 4 | 3 | 3 |
| Comparative Example 17 | 4 | 4 | 4 | 2 | 2 |
| Comparative Example 18 | 3 | 3 | 3 | 2 | 2 |
| Comparative Example 19 | 3 | 3 | 3 | 2 | 2 |
| Comparative Example 20 | 3 | 3 | 3 | 1 | 1 |
| Comparative Example 21 | 3 | 3 | 3 | 1 | 1 |

As a result, when the water-soluble dietary fiber and the water-insoluble dietary fiber were used in combination, suppression of stimulation caused by sour taste and sour odor, suppression of the unpleasant flavor of egg yolk, and suppression of unpleasant flavor derived from the fat/oil were recognized in Test Examples 15 to 19 and Comparative Examples 15 and 16. However, in Comparative Examples 15 to 21 (water content: less than 20% by mass), the physical properties became harder and the texture got drier, as the pectin and cellulose contents were higher. Accordingly, water was added to mayonnaise to adjust the water content to 50% by mass, and the resulting mixture was then emulsified again with increased water content, after which the test was conducted again.

Table 6-2 shows the results.

TABLE 6-2

| | Dietary fiber content (% by mass) | | | Water-soluble/water-insoluble ratio of dietary fiber | Total amount added per 20 g of mayonnaise | Modal diameter (μm) | Water content (% by mass) |
|---|---|---|---|---|---|---|---|
| | Pectin | Cellulose | Total | | | | |
| Comparative Example 22 | 0% | 0% | 0% | — (Control) | 0 (Control) | 7.778 | 50.1 |
| Test Example 20 | 0.80% | 2.40% | 3.20% | 0.333 | 0.64 | 7.778 | 48.5 |
| Test Example 21 | 1.00% | 3.00% | 4.00% | 0.333 | 0.80 | 7.778 | 48.2 |
| Test Example 22 | 1.20% | 3.60% | 4.80% | 0.333 | 0.96 | 7.778 | 47.8 |
| Test Example 23 | 1.40% | 4.20% | 5.60% | 0.333 | 1.12 | 7.778 | 47.4 |
| Test Example 24 | 2.00% | 6.00% | 8.00% | 0.333 | 1.60 | 7.778 | 46.4 |
| Test Example 25 | 2.50% | 7.50% | 10.00% | 0.333 | 2.00 | 8.482 | 45.5 |
| Test Example 26 | 3.00% | 9.00% | 12.00% | 0.333 | 2.40 | 8.482 | 44.7 |
| Test Example 27 | 3.50% | 10.50% | 14.00% | 0.333 | 2.80 | 8.482 | 43.9 |
| Test Example 28 | 4.00% | 12.00% | 16.00% | 0.333 | 3.20 | 8.482 | 43.2 |
| Test Example 29 | 4.50% | 13.50% | 18.00% | 0.333 | 3.60 | 9.250 | 42.5 |
| Test Example 30 | 5.00% | 15.00% | 20.00% | 0.333 | 4.00 | 9.250 | 41.7 |
| Test Example 31 | 5.50% | 16.50% | 22.00% | 0.333 | 4.40 | 9.250 | 41.1 |
| Comparative Example 23 | 6.00% | 18.00% | 24.00% | 0.333 | 4.80 | 9.250 | 40.4 |

| | Evaluation results | | | | |
|---|---|---|---|---|---|
| | Stimulation by sour taste and sour odor | Unpleasant flavor of egg yolk | Unpleasant flavor derived from fat/oil | Physical properties | Overall evaluation |
| Comparative Example 22 | — | — | — | — | — |
| Test Example 20 | 5 | 5 | 5 | 5 | 5 |
| Test Example 21 | 5 | 5 | 5 | 5 | 5 |
| Test Example 22 | 5 | 5 | 5 | 5 | 5 |
| Test Example 23 | 5 | 5 | 5 | 5 | 5 |
| Test Example 24 | 5 | 5 | 5 | 5 | 5 |
| Test Example 25 | 5 | 5 | 5 | 5 | 5 |
| Test Example 26 | 5 | 5 | 5 | 5 | 5 |
| Test Example 27 | 5 | 5 | 5 | 5 | 5 |
| Test Example 28 | 5 | 5 | 5 | 5 | 5 |
| Test Example 29 | 4 | 4 | 4 | 5 | 4 |
| Test Example 30 | 4 | 4 | 4 | 4 | 4 |
| Test Example 31 | 3 | 3 | 3 | 3 | 3 |
| Comparative Example 23 | 3 | 3 | 3 | 1 | 1 |

As a result, when the water content was high, even though the dietary fiber content was the same as in Comparative Examples 15 to 20 in Table 6-1 (Test Examples 22 to 27), suppression of stimulation caused by sour taste and sour odor, suppression of the unpleasant flavor of egg yolk, and suppression of unpleasant flavor derived from the fat/oil were recognized. Further, the same action and effect were also recognized in Test Examples 28 to 31, in which the dietary fiber content was high. However, in Comparative Example 23 (total amount of dietary fibers: 24% by mass), the physical properties were hard and the texture was dry.

This phenomenon was not solved even when the water raw material was further increased.

Taking these results together, it was found that the water content of the emulsion seasoning must be 20% or more, and that under this condition, the total amount of water-soluble dietary fiber and water-insoluble dietary fiber may be 0.8% by mass or more and 23% by mass or less. It was also found that, in terms of the strength of the action and effect, the total amount of water-soluble dietary fiber and water-insoluble dietary fiber was more preferably 0.8% by mass or more and 22% by mass or less, even more preferably 1.6% by mass or more and 20% by mass or less, and still more preferably 2.4% by mass or more and 16% by mass or less.

[Example 5] Preparation of Liquid or Semisolid Emulsion Seasonings Using Only Plant Raw Materials, and Verification of Action and Effect Examples 3 and 4 showed that when a water-soluble dietary fiber preparation and a water-insoluble dietary fiber preparation were added to emulsion seasonings in a specific ratio range and a specific content range, repellent action due to stimulation caused by the organic acid and the unpleasant flavor of egg, soybean, or fat/oil was remarkably improved. Accordingly, the above dietary fibers were added as plant raw materials, rather than preparation forms, and the correlation with the results of Examples 3 and 4 was verified for the exhibition of the action and effect. Samples were prepared in the same manner as in Example 1 according to the formulations shown in Table 7. The pulverization treatment was performed to 350 μm or less at the stage of purification of raw materials, and the raw materials were mixed, followed by high-pressure homogenizer treatment (the pulverization treatment was performed under a pressurized condition of 0.01 MPa or more). The modal diameter was measured according to the measurement procedure described in the "Method for measuring the particle size distribution (modal diameter, specific surface area, and maximum particle size)". The dietary fiber content, etc., were measured according to the measurement procedure described in the "modified Prosky method". The water content was measured according to the procedure described in the "measurement method prescribed in the Law Concerning Standardization, etc. of Agricultural and Forestry Products (JAS Law)".

TABLE 7

| Formulation | Test Example 1-1 | Test Example 2 | Test Example 3 | Test Example 32 | Test Example 33 | Test Example 34 | Test Example 35 | Test Example 36 |
|---|---|---|---|---|---|---|---|---|
| Yield (g) | 1000.0 | 1000.0 | 1000.0 | 1000.0 | 1000.0 | 1000.0 | 1000.0 | 1000.0 |
| Water | 0.0 | 200.0 | 182.8 | 0.0 | 200.0 | 200.0 | 354.0 | 200.0 |
| Kelp stock (kelp:water (weight ratio) = 19:1, extraction at 60° C. for 2 hr) | 467.0 | 0.0 | 0.0 | 518.8 | 0.0 | 0.0 | 0.0 | 0.0 |
| Salt | 14.5 | 16.2 | 16.2 | 14.5 | 15.0 | 15.0 | 15.0 | 15.0 |
| White wine vinegar | 80.0 | 80.0 | 80.0 | 80.0 | 80.0 | 80.0 | 80.0 | 80.0 |
| Cabbage paste | 0.0 | 266.3 | 276.0 | 0.0 | 0.0 | 0.0 | 0.0 | 0.0 |
| Onion paste | 0.0 | 40.0 | 40.0 | 0.0 | 307.5 | 0.0 | 0.0 | 0.0 |
| Enoki mushroom powder paste | 0.0 | 0.0 | 10.0 | 0.0 | 0.0 | 0.0 | 153.5 | 307.5 |
| Roasted soybean powder | 67.5 | 67.5 | 65.0 | 36.7 | 67.5 | 67.5 | 67.5 | 67.5 |
| Freeze-dried onion powder | 5.0 | 0.0 | 0.0 | 2.5 | 0.0 | 307.5 | 0.0 | 0.0 |
| Potato powder | 35.0 | 0.0 | 0.0 | 17.5 | 0.0 | 0.0 | 0.0 | 0.0 |
| Mustard powder | 8.0 | 7.0 | 7.0 | 7.0 | 7.0 | 7.0 | 7.0 | 7.0 |
| Canola oil | 323.0 | 323.0 | 323.0 | 323.0 | 323.0 | 323.0 | 323.0 | 323.0 |
| Modal diameter (μm) | 20.17 | 4.625 | 5.500 | 0.344 | 0.688 | 5.500 | 11.00 | 15.56 |
| Water content (% by mass) | 54.7 | 43.3 | 42.1 | 60.2 | 43.0 | 28.0 | 50.9 | 43.0 |
| Dietary fiber Water-soluble dietary fiber (% by mass) | 0.355 | 0.295 | 0.326 | 0.232 | 0.367 | 1.864 | 0.674 | 1.187 |
| Water-insoluble dietary fiber (% by mass) | 1.060 | 1.288 | 1.561 | 0.569 | 1.212 | 3.707 | 5.348 | 9.840 |
| Total amount of dietary fiber (% by mass) | 1.415 | 1.583 | 1.887 | 0.801 | 1.579 | 5.571 | 6.022 | 11.027 |
| Dietary fiber (ratio) Water-soluble/water-insoluble ratio | 0.335 | 0.229 | 0.209 | 0.408 | 0.303 | 0.503 | 0.126 | 0.121 |

| Formulation | Comparative Example 24 | Comparative Example 25 | Test Example 37 | Test Example 38 | Test Example 39 | Test Example 40 |
|---|---|---|---|---|---|---|
| Yield (g) | 1000.0 | 1000.0 | 1000.0 | 1000.0 | 1000.0 | 1000.0 |
| Water | 200.0 | 40.0 | 519.2 | 150.0 | 200.0 | 730.0 |
| Kelp stock (kelp:water (weight ratio) = 19:1, extraction at 60° C. for 2 hr) | 0.0 | 0.0 | 0.0 | 0.0 | 0.0 | 0.0 |
| Salt | 15.0 | 15.0 | 15.0 | 15.0 | 15.0 | 15.0 |
| White wine vinegar | 80.0 | 80.0 | 80.0 | 80.0 | 80.0 | 80.0 |
| Black Jew's ear powder | 307.5 | 0.0 | 0.0 | 117.5 | 160.5 | 0.0 |
| White Jew's ear powder | 0.0 | 0.0 | 0.0 | 0.0 | 0.0 | 60.0 |
| Shiitake powder | 0.0 | 227.5 | 35.0 | 0.0 | 0.0 | 0.0 |
| Roasted soybean powder | 67.5 | 307.5 | 15.0 | 307.5 | 214.5 | 0.0 |
| Pectin preparation | 0.0 | 0.0 | 5.8 | 0.0 | 0.0 | 0.0 |
| Mustard powder | 7.0 | 7.0 | 7.0 | 7.0 | 7.0 | 7.0 |

TABLE 7-continued

|  |  |  |  |  |  |  |  |
|---|---|---|---|---|---|---|---|
|  | Canola oil | 323.0 | 323.0 | 323.0 | 323.0 | 323.0 | 108.0 |
|  | Modal diameter (μm) | 88.00 | 33.93 | 31.11 | 80.70 | 67.66 | 40.35 |
|  | Water content (% by mass) | 28.0 | 12.0 | 59.9 | 23.0 | 28.0 | 81.0 |
| Dietary fiber (% by mass) | Water-soluble dietary fiber (% by mass) | 2.099 | 1.421 | 5.941 | 1.470 | 1.523 | 1.158 |
|  | Water-insoluble dietary fiber (% by mass) | 23.349 | 12.612 | 1.524 | 12.560 | 14.500 | 2.964 |
|  | Total amount of dietary fiber (% by mass) | 25.448 | 14.03 | 7.46 | 14.03 | 16.02 | 4.12 |
| Dietary fiber (ratio) | Water-soluble/water-insoluble ratio | 0.090 | 0.113 | 3.900 | 0.117 | 0.105 | 0.391 |

Next, each of the samples prepared above was evaluated in the same manner as in Example 2. As a comparative control, a commercially available mayonnaise-like seasoning containing soybean, brewed vinegar, rapeseed oil, and salt, and having a dietary fiber content of 0.7% by mass ("Special soybean mayonnaise using whole soybean powder without using 'egg'" (manufactured by Soycom)) was used. Table 8 shows the results.

The results clarified that in Test Example 1-1 to Test Example 3 and Test Example 32 to Test Example 40, in which the total amount of dietary fibers was within the range of Example 4, except for Comparative Example 24 (water-soluble dietary fiber+water-insoluble dietary fiber=25% by mass) and Comparative Example 25 (water content: 12% by mass), repellent action due to stimulation caused by the organic acid and the unpleasant flavor of soybean or fat/oil was remarkably improved. Therefore, it was reconfirmed

TABLE 8

|  | Test Example 1-1 | Test Example 2 | Test Example 3 | Test Example 32 | Test Example 33 | Test Example 34 | Test Example 35 | Test Example 36 |
|---|---|---|---|---|---|---|---|---|
| Water content (% by mass) | 54.7 | 43.3 | 42.1 | 60.2 | 43.0 | 28.0 | 50.9 | 43.0 |
| Dietary fiber (Water-soluble/water-insoluble ratio) | 0.335 | 0.229 | 0.209 | 0.408 | 0.303 | 0.503 | 0.126 | 0.121 |
| Total amount of dietary fiber (% by mass) | 1.415 | 1.583 | 1.887 | 0.801 | 1.579 | 5.571 | 6.022 | 11.027 |
| Stimulation by sour taste and sour odor | 4 | 4 | 5 | 4 | 4 | 5 | 5 | 5 |
| Unpleasant flavor of soybean | 4 | 4 | 4 | 4 | 4 | 5 | 4 | 4 |
| Unpleasant flavor derived from fat/oil | 4 | 4 | 4 | 4 | 4 | 5 | 5 | 5 |
| Physical properties | 5 | 5 | 5 | 5 | 5 | 5 | 5 | 5 |
| Overall evaluation (including remarks) | 4 | 4 | 4 | 4 | 4 | 5 | 5 | 5 |
| Remarks | — | — | — | — | — | — | — | — |

|  | Comparative Example 24 | Comparative Example 25 | Test Example 37 | Test Example 38 | Test Example 39 | Test Example 40 |
|---|---|---|---|---|---|---|
| Water content (% by mass) | 28.0 | 12.0 | 59.9 | 23.0 | 28.0 | 81.0 |
| Dietary fiber (Water-soluble/water-insoluble ratio) | 0.090 | 0.113 | 3.900 | 0.117 | 0.105 | 0.391 |
| Total amount of dietary fiber (% by mass) | 25.448 | 14.032 | 7.461 | 14.030 | 16.020 | 4.120 |
| Stimulation by sour taste and sour odor | 3 | 3 | 5 | 5 | 4 | 5 |
| Unpleasant flavor of soybean | 3 | 3 | 4 | 4 | 4 | 5 |
| Unpleasant flavor derived from fat/oil | 3 | 3 | 4 | 5 | 4 | 5 |
| Physical properties | 1 | 1 | 4 | 5 | 4 | 5 |
| Overall evaluation (including remarks) | 1 | 1 | 4 | 5 | 4 | 5 |
| Remarks | Remarkably hard and dry | Remarkably hard and dry | Combined use of pectin preparation and edible food material | — | — | — | that the range of the total amount of dietary fibers in Example 4, a more preferable range, an even more preferable range, etc., thereof were appropriate for the exhibition of the action and effect of one or more embodiments of the present invention. That is, in one or more embodiments of the present invention, as the water-soluble dietary fiber and water-insoluble dietary fiber, pectin, alginic acid, glucomannan, inulin, or fucoidan as the former contained in the plant materials in the above formulations, and cellulose, hemicellulose, β-glucan, lignin, or chitin as the latter were assumed to effectively function for the action and effect of one or more embodiments of the present invention.

In Examples 1 to 4, mayonnaise or a mayonnaise-like seasoning was selected and evaluated as a representative emulsion seasoning; a tomato-containing sauce containing tomato paste having an emulsifying action was also subjected to an evaluation test in the same manner as in Example 2. Table 9 shows the results. As a comparative control, a commercially available tomato-containing sauce containing tomato paste, brewed vinegar, soybean oil, and salt, and having a dietary fiber content of 2.6% by mass and a modal diameter of 271.4 μm (Comparative Example 32 in Table 12, "Pizza Sauce (manufactured by Megmilk Snow Brand Co., Ltd.)") was used. The pulverization treatment was performed to 350 μm or less at the stage of purification of raw materials, and the raw materials were mixed, followed by wet bead mill treatment (one-pass) (the pulverization treatment was performed under a pressurized condition of 0.01M Pa or more). Ingredients (cumin and caraway) were added after pulverization treatment, and then mixed and homogenized.

The results demonstrated that the action and effect of one or more embodiments of the present invention were also exhibited for the tomato-containing sauces, as shown in Test Examples 41 to 43. The fact that the action and effect were recognized in Test Examples 41 to 43 compared with the commercially available tomato-containing sauce as the comparative control, which also had a high dietary fiber content, was assumed to show that when dietary fibers were incorporated by using plant raw materials, it was more preferable to use multiple plant materials, as with the mayonnaise-like seasoning of Example 5.

[Example 6] Verification of Particle Size for Action and Effect of Improving Flavor (Modal Diameter, Specific Surface Area, and Maximum Particle Size)

Here, the influence of the particle size on the action and effect of improving the flavor of the emulsion seasoning of one or more embodiments of the present invention was verified. Samples were prepared in the same manner as in Example 1 according to the formulations in Table 10, and the evaluation was conducted in the same manner as in Example 2. Table 10 shows the results. As a comparative control, a commercially available mayonnaise-like seasoning ("Special soybean mayonnaise using whole soybean powder without using 'egg'" (manufactured by Soycom)) was used. The particle sizes, such as modal diameter, were measured according to the measurement procedure described in the "Method for measuring the particle size distribution (modal diameter, specific surface area, and maximum particle size)". The dietary fiber content, etc., were measured according to the measurement procedure described in the "modified Prosky method". The water content was measured according to the procedure described in the "measurement method prescribed in the Law Concerning Standardization, etc. of Agricultural and Forestry Products (JAS Law)"

TABLE 9

| Formulation | | Test Example 41 | Test Example 42 | Test Example 43 |
|---|---|---|---|---|
| Yield (g) | | 1000.0 | 1000.0 | 1000.0 |
| Water | | 36.0 | 486.0 | 36.0 |
| Salt | | 7.8 | 12.4 | 10.3 |
| Olive oil | | 82.0 | 65.6 | 74.0 |
| Kelp stock (kelp:water (weight ratio) = 19:1, extraction at 60° C. for 2 hr) | | 380.0 | 0.0 | 424.5 |
| Red paprika powder | | 100.0 | 72.0 | 90.0 |
| Garlic paste | | 50.0 | 40.0 | 45.0 |
| Onion powder | | 40.0 | 32.0 | 36.0 |
| Cabbage powder | | 0.0 | 30.0 | 0.0 |
| White wine vinegar | | 93.0 | 93.0 | 93.0 |
| Tomato paste | | 200.0 | 160.0 | 180.0 |
| Cumin (no pulverization treatment: ingredient) | | 5.6 | 4.5 | 5.6 |
| Caraway (no pulverization treatment: ingredient) | | 5.6 | 4.5 | 5.6 |
| Modal diameter (μm) | | 2.750 | 20.17 | 2.999 |
| Water content (% by mass) | | 63.4 | 67.9 | 66.6 |
| Dietary fiber | Water-soluble dietary fiber (% by mass) | 1.244 | 1.103 | 1.119 |
| | Water-insoluble dietary fiber (% by mass) | 1.715 | 1.718 | 1.543 |
| | Total amount of dietary fiber (% by mass) | 2.958 | 2.821 | 2.662 |
| Dietary fiber (ratio) | Water-soluble/water-insoluble ratio | 0.725 | 0.642 | 0.725 |
| Stimulation by sour taste and sour odor | | 4 | 4 | 4 |
| Unpleasant flavor of tomato | | 4 | 4 | 4 |
| Unpleasant flavor derived from fat/oil | | 4 | 4 | 4 |
| Physical properties | | 5 | 5 | 5 |
| Overall evaluation | | 4 | 4 | 4 |

TABLE 10

|  | Test Example 1-1 | Test Example 1-2 | Test Example 1-3 | Test Example 1-4 | Test Example 1-5 | Comparative Example 26 |
|---|---|---|---|---|---|---|
| Pulverized particle size (μm or less) during purification of raw materials | 350 | 350 | 350 | 350 | 500 | 650 |
| Pulverization treatment Mode (first) | No (hand mixing) | Wet bead mill (one-pass) | Wet bead mill (two-pass) | Wet bead mill (three-pass) | No (hand mixing) | No (hand mixing) |
| Mode (second) |  | No | No | No |  |  |
| Total amount of dietary fiber (% by mass) | 1.415 | 1.415 | 1.415 | 1.415 | 1.415 | 1.415 |
| Water-soluble/water-insoluble ratio of dietary fiber | 0.335 | 0.335 | 0.335 | 0.335 | 0.335 | 0.335 |
| Water content (% by mass) | 54.7 | 54.7 | 54.7 | 54.7 | 54.7 | 54.7 |
| Modal diameter (μm) | 20.17 | 5.998 | 3.889 | 3.565 | 114.1 | 124.5 |
| Median diameter (d50, μm) | 24.84 | 5.284 | 3.974 | 4.028 | 74.5 | 90.26 |
| Median diameter (d90, μm) | 296.5 | 17.78 | 8.454 | 11.25 | 359.9 | 419.3 |
| Arithmetic standard deviation (μm) | 88.91 | 4.920 | 2.359 | 3.114 | 134.4 | 182.1 |
| Stimulation by sour taste and sour odor | 4 | 5 | 5 | 5 | 3 | 1 |
| Unpleasant flavor of soybean | 4 | 5 | 5 | 5 | 3 | 1 |
| Unpleasant flavor derived from fat/oil | 4 | 5 | 5 | 5 | 3 | 1 |
| Physical properties | 4 | 5 | 5 | 5 | 4 | 4 |
| Overall evaluation (including remarks) | 4 | 5 | 5 | 5 | 3 | 1 |
| Remarks | — | — | Clearly smooth | Remarkably smooth | Felt slightly grainy, but acceptable | Felt grainy |

As a result, when pulverization treatment was performed during purification of raw materials, suppression of stimulation caused by sour taste and sour odor, suppression of the unpleasant flavor of soybean, and suppression of unpleasant flavor derived from the fat/oil were recognized (Test Examples 1-1 to 1-5), even without performing the subsequent pulverization treatment (wet bead mill treatment). However, as in Comparative Example 26 (modal diameter: 124.5 μm), the action and effect of one or more embodiments of the present invention were not recognized when pulverization treatment was not performed during purification of raw materials, and the subsequent pulverization treatment was not performed either. Further, the modal diameter tended to decrease, as the number of times of wet bead mill treatment increased. It was presumed that the modal diameter would further decrease if pulverization treatment was performed more times for a longer period of time using beads with a smaller particle size (only zirconia beads having a diameter of 2 mm were used here).

Therefore, regarding the relationship between the exhibition of the action and effect of one or more embodiments of the present invention and the particle size, the action and effect of one or more embodiments of the present invention were assumed to be exhibited when the modal diameter was 0.3 jm or more and 115 μm or less. It was assumed that in terms of production efficiency (affecting the treatment time, number of times, and lower limit), concerns about the safety of nanomaterials (affecting the lower limit), and the action and effect (affecting the upper limit), the modal diameter was more preferably 1.0 μm or more and 50 μm or less, and even more preferably 2.0 μm or more and 15 μm or less.

[Example 7] Verification of Emulsion Stability of Liquid or Semisolid Emulsion Seasoning For the mayonnaise-like seasoning prepared in Example 1 (Test Example 1-1), using three commercially available mayonnaise-like seasonings (Comparative Example 27, "Osawa's Soy Milk Mayo (manufactured by Ohsawa Japan Co., Ltd.)"), (Comparative Example 28, "Chen-Fu Soy Milk Mayo (manufactured by Nakaichifoods)"), and (Comparative Example 2, "Special soybean mayonnaise using whole soybean powder without using egg (manufactured by Soy-com)"), as well as commercially available mayonnaise (Comparative Example 29, "Kewpie Half (manufactured by Kewpie Corporation, containing xanthan gum as a thickener)") and (Comparative Example 1, "Kewpie Mayonnaise (manufactured by Kewpie Corporation)") as controls, oil-water separation when they were frozen at −20° C. for 3 days and then allowed to stand at room temperature for half a day for natural thawing, oil-water separation after heating (hot water bath) at 90° C. for 30 minutes, oil-water separation after heating at 100° C. (boiling water bath) for 20 minutes, and further oil-water separation after heating from a heat-retaining state (120° C.) to a temperature reaching 180° C. using a commercially available hot plate, were observed and evaluated. The evaluation was conducted by six professional panelists to determine whether oil-water separation occurred. Further, the "overall evaluation" was evaluated. The evaluation was conducted by six professional panelists, and their average evaluation value (rounded to the nearest decimal place) was used. The particle sizes, such as modal diameter, were measured according to the measurement procedure described in the "Method for measuring the particle size distribution (modal diameter, specific surface area, and maximum particle size)". The dietary fiber content, etc., were measured according to the measurement procedure described in the "modified Prosky method". The water content was measured according to the procedure described in the "measurement method prescribed in the Law Concerning Standardization, etc. of Agricultural and Forestry Products (JAS Law)". The other items were measured by ordinary analysis methods.

(Evaluation Criterion 11: Overall Evaluation)
5: Superior in oil-water separation resistance, physical properties, and taste
4: Slightly superior in oil-water separation resistance, physical properties, and taste
3: Normal in terms of oil-water separation resistance, physical properties, and taste
2: Slightly inferior in oil-water separation resistance, physical properties, and taste
1: Inferior in oil-water separation resistance, physical properties, and taste Table 11 and FIGS. 1A-B, 2A-C, and 3A-B show the results.

TABLE 11

|  | Comparative Example 27 | Comparative Example 28 | Comparative Example 2 | Comparative Example 29 | Comparative Example 1 | Test Example 1-1 |
|---|---|---|---|---|---|---|
| Emulsion base material | Soybean | Soybean | Soybean | Egg yolk/thickener | Egg yolk | Soybean |
| Water content (% by mass) | 36.8 | 39.5 | 23.4 | 58.6 | 20.8 | 54.7 |
| Acetic acid content (% by mass) | 0.60 | 0.62 | 0.88 | 0.70 | 0.61 | 0.68 |
| pH | 3.91 | 4.06 | 4.21 | 4.12 | 4.12 | 4.43 |
| Salt content (% by mass) | 1.23 | 1.37 | 1.74 | 2.75 | 1.83 | 1.64 |
| Sugar (% by mass) | 0.0 | 0.0 | 0.0 | 0.0 | 0.0 | 0.0 |
| Lipid content (% by mass) | 55.3 | 53.3 | 61.3 | 34.0 | 74.7 | 34.0 |
| Viscosity (Pa·s, 20° C.) | 9.3 | 14.2 | 8.72 | 15.5 | 41.3 | 16.7 |
| Total amount of dietary fiber (% by mass) | 0.000 | 0.000 | 0.700 | 0.000 | 0.000 | 1.415 |
| Water-soluble/water-insoluble ratio of dietary fiber | 0/0 | 0/0 | 0.127 | 0/0 | 0/0 | 0.335 |
| Modal diameter (μm) | 9.250 | 5.500 | 10.09 | 1.375 | 7.778 | 20.17 |
| Oil-water separation after freezing at −20° C. and thawing | Yes | Yes | Yes | No | Yes | No |
| Oil-water separation after heating at 90° C. for 30 minutes | Yes | Yes | Yes | No | Yes | No |
| Oil-water separation after heating at 100° C. for 20 minutes | Yes | Yes | Yes | No | Yes | No |
| Oil-water separation after heating at a temperature reaching 180° C. | Yes | Yes | Yes | Yes | Yes | No |
| Overall evaluation (evaluation including remarks) | 1 | 1 | 1 | 2 | 1 | 5 |
| Remarks | Oil-water separation and scorching occurred at 180° C. | Oil-water separation and remarkable scorching occurred at 180° C. | Oil-water separation and remarkable scorching occurred at 180° C. | Artificial viscosity was felt in the oral cavity, and change in taste was felt. Oil-water separation and scorching occurred at 180° C. | Dissolution associated with remarkable oil-water separation and scorching occurred at 180° C. | Only periphery was slightly yellowish even at 180° C., but shape was maintained |

\* The measurement items other than viscosity were measured according to ordinary methods.
\* The viscosity was measured using a B-type viscometer (20° C., 30 rpm, manufactured by Tokyo Keiki Inc.).

As a result, the mayonnaise using a thickener of Comparative Example 29 and the prepared mayonnaise-like seasoning of Test Example 1-1 did not undergo oil-water separation after freezing at −20° C. (see FIGS. 1A-B), and oil-water separation after heating at 90° C. for 30 minutes or heating at 100° C. for 20 minutes (see FIGS. 2A-C). However, the mayonnaise of Comparative Example 29 used a thickener (xanthan gum), which caused an artificial viscosity felt in the oral cavity and affected the taste; thus, the overall evaluation was low. In contrast, the heating at a temperature reaching 180° C. resulted in oil-water separation and dissolution associated therewith, and scorching in all of the samples (Comparative Examples 1, 2, and 27 to 29), except for Test Example 1-1. In contrast to these, in Test Example 1-1, the periphery was slightly yellowish, and bubble holes were formed due to the evaporation of water; however, oil-water separation and dissolution associated therewith, and scorching were not observed, and the shape was retained (see FIGS. 3A-B).

While the mayonnaise-like seasoning of Test Example 1-1 did not use egg yolk, but used an organic acid and a fat/oil, the quality improvement effect thereof was not correlated with the salt content, sugars, lipid, or viscosity, but was correlated with the dietary fiber content.

Further, the tomato-containing sauce of Test Example 41 in Table 9 was also evaluated in the same manner as described above.

For the prepared tomato-containing sauce (Test Example 41), using a commercially available tomato-containing sauce, ketchup (Comparative Example 30, "Kagome Tomato Ketchup (manufactured by Kagome Co., Ltd.)," provided that 8.2% by mass of olive oil was added because no fats/oils were contained), and two tomato-containing sauces (Comparative Example 31, "Gudakusan Pizza Sauce (manufactured by Kagome Co., Ltd.)") and (Comparative Example 32, "Pizza Sauce (manufactured by Megmilk Snow Brand Co., Ltd.)") as controls, oil-water separation when they were frozen at −20° C. for 3 days and then allowed to stand at room temperature for half a day for natural thawing, oil-water separation after heating (hot water bath) at 90° C. for 30 minutes, oil-water separation after heating at 100° C. (boiling water bath) for 20 minutes, and further oil-water separation after heating from a heat-retaining state (120° C.) to a temperature reaching 180° C. using a commercially available hot plate, were observed and evaluated. The evaluation was conducted by six professional panelists to determine whether oil-water separation occurred. Further, the "overall evaluation" was evaluated. The evaluation was conducted by six professional panelists, and their average evaluation value (rounded to the nearest decimal place) was used.

Table 12 and FIGS. 4A-B, 5A-C, and 6A-B show the results.

TABLE 12

| | Comparative Example 30 | Comparative Example 31 | Comparative Example 32 | Test Example 41 |
| --- | --- | --- | --- | --- |
| Emulsion base material | Tomato paste (fat/oil added) | Tomato paste | Tomato paste/ thickener | Tomato paste |
| Water content (% by mass) | 66.0 | 65.8 | 68.3 | 63.4 |
| Salt content (% by mass) | 3.60 | 1.20 | 1.20 | 1.26 |
| Lipid content (% by mass) | 8.2 | 0.5 | 5.4 | 8.2 |
| Total amount of dietary fiber (% by mass) | 4.180 | 0.800 | 1.200 | 2.958 |
| Water-soluble/water-insoluble ratio of dietary fiber | 0.500 | 0.375 | 1.040 | 0.444 |
| Modal diameter (μm) | 542.9 | 296.0 | 271.4 | 2.750 |
| Oil-water separation after freezing at −20° C. and thawing | Yes (particle aggregation) | Yes (particle aggregation) | No | No |
| Oil-water separation after heating at 90° C. for 30 minutes | Yes (particle aggregation) | Yes (particle aggregation) | No | No |
| Oil-water separation after heating at 100° C. for 20 minutes | Yes (particle aggregation, gelling) | Yes (particle aggregation, gelling) | No | No |
| Oil-water separation after heating at a temperature reaching 180° C. | Yes | Yes | Yes | No |
| Overall evaluation (evaluation including remarks) | 1 | 1 | 2 | 5 |
| Remarks | Modal diameter was 542.9 μm, median diameter (d50) was 410.1 μm, median diameter (d90) was 812.4 μm, and arithmetic standard deviation was 289.7 μm; particle size was large. Freezing and thawing, and heating resulted in particle aggregation, and caused grainy feeling. Particles were further aggregated at 100° C., and physical properties were remarkably changed to gel-like properties. Scorching and aggregation occurred at 180° C. | Freezing and thawing, and heating resulted in particle aggregation, and caused grainy feeling. Particles were further aggregated at 100° C., and physical properties were remarkably changed to gel-like properties. Remarkable scorching occurred at 180° C. | Artificial viscosity was felt in the oral cavity, and change in taste was felt. Remarkable scorching occurred at 180° C. | Bubbles were formed at 180° C.; however, appearance and shape retention properties were not changed. |

As a result, the tomato-containing sauce using a thickener of Comparative Example 32 and the prepared tomato-containing sauce of Test Example 41 did not undergo oil-water separation after freezing at −20° C. (see FIGS. 4A-B), and oil-water separation after heating at 90° C. for 30 minutes or heating at 100° C. for 20 minutes. However, in Comparative Examples 30 and 31 other than these, particles seemingly derived from the tomato paste were aggregated, and resulted in a clearly grainy texture. At 100° C., the aggregated particles were further bound to each other to result in gel-like physical properties, and the texture remarkably varied.

Figure 5A:
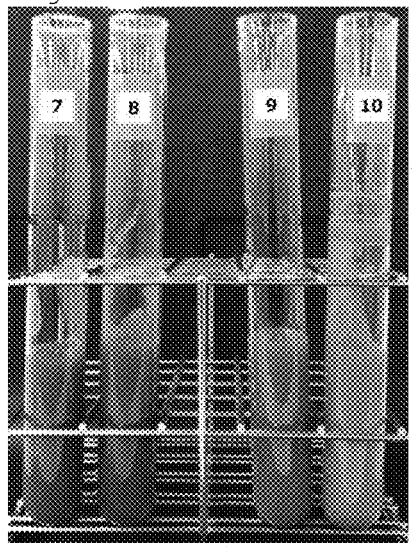
FIGS. 5A-C are diagrams (photographs) showing the state of each seasoning before heating (FIG. 5A) and after heating (FIG. 5B: at 90° C. for 30 mins, and FIG. 5C: at 100° C. for 20 mins) in Example 7. 7: Comparative Example 30 of Example 7, 8: Comparative Example 31 of Example 7, 9: Comparative Example 32 of Example 7, 10: Test Example 41 of Example 7.
Figure 5B:
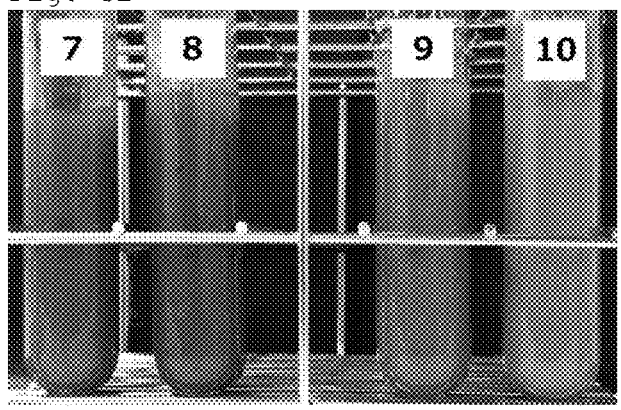
Figure 5C:
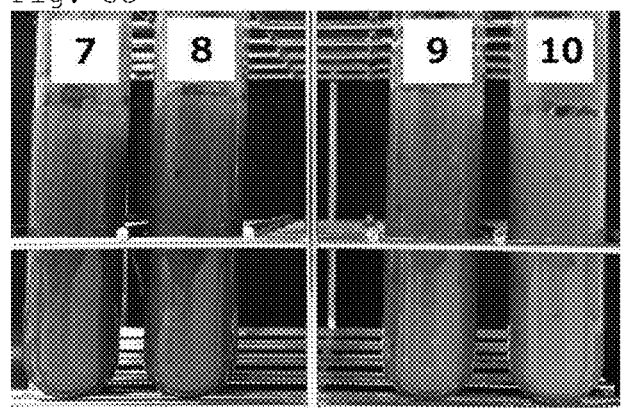
Figure 6A:
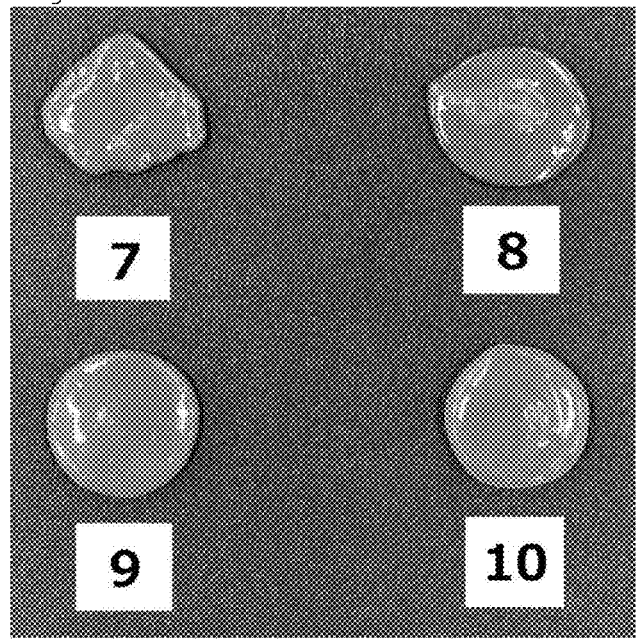
FIGS. 6A-B are diagrams (photographs) showing the state of each seasoning before heating (FIG. 6A) and after heating (FIG. 6B) in Example 7. 7: Comparative Example 30 of Example 7, 8: Comparative Example 31 of Example 7, 9: Comparative Example 32 of Example 7, 10: Test Example 41 of Example 7.
Figure 6B:
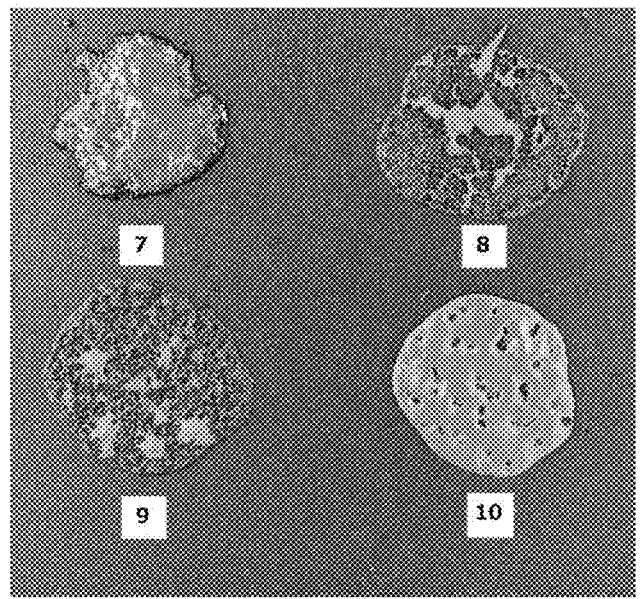

Therefore, it was determined that the emulsion stability was impaired (see FIGS. 5A-B). The tomato-containing sauce of Comparative Example 32 used a thickener (guar gum), which caused an artificial viscosity felt in the oral cavity and affected the taste; thus, the overall evaluation was low. Meanwhile, the treatment at a temperature reaching 180° C. resulted in scorching, significant aggregation, and charred solids associated with the evaporation of water in all of the samples (Comparative Examples 30 to 32), except for Test Example 41. In contrast to these, in Test Example 41, although bubbles were formed, there was no change in color due to scorching or water evaporation, and the physical properties and shape retention properties were maintained. Therefore, it was determined that the emulsion stability was not impaired in Test Example 41 (see FIGS. 6A-B).

While the tomato-containing sauce of Test Example 41 used an organic acid and a fat/oil, the quality improvement effect thereof was not correlated with the salt content or lipid, but was correlated with the dietary fiber content. However, the ketchup of Comparative Example 30 (to which olive oil was added as described above), which was a tomato-containing sauce, had a remarkably large particle size; presumably for this reason, the action and effect of one or more embodiments of the present invention were not strongly recognized, for its dietary fiber content.

[Example 8] Verification of Effect of Improving Emulsion Stability of Liquid or Semisolid Emulsion Seasoning by Dietary Fiber Content Here, since the results of Example 6 showed that the dietary fiber content tended to be correlated with the action and effect of one or more embodiments of the present invention, mayonnaise-like seasonings having different dietary fiber contents shown in Table 13 were prepared in the same manner as in Example 1, and evaluated in the same manner as in Example 7. The modal diameter was measured according to the measurement procedure described in the "Method for measuring the particle size distribution (modal diameter, specific surface area, and maximum particle size)". The dietary fiber content, etc., were measured according to the measurement procedure described in the "modified Prosky method". The water content was measured according to the procedure described in the "measurement method prescribed in the Law Concerning Standardization, etc. of Agricultural and Forestry Products (JAS Law)".

TABLE 13

| Formulation | Test Example 1-1 | Test Example 2 | Test Example 3 | Test Example 32 | Test Example 33 | Test Example 34 | Test Example 35 | Test Example 36 | Comparative Example 33 |
|---|---|---|---|---|---|---|---|---|---|
| Yield (g) | 1000.0 | 1000.0 | 1000.0 | 1000.0 | 1000.0 | 1000.0 | 1000.0 | 1000.0 | 1000.0 |
| Water | 0.0 | 200.0 | 182.8 | 0.0 | 200.0 | 200.0 | 354.0 | 200.0 | 0.0 |
| Kelp stock (kelp:water (weight ratio) = 19:1, extraction at 60° C. for 2 hr) | 467.0 | 0.0 | 0.0 | 518.8 | 0.0 | 0.0 | 0.0 | 0.0 | 521.7 |
| Salt | 14.5 | 16.2 | 16.2 | 14.5 | 15.0 | 15.0 | 15.0 | 15.0 | 14.5 |
| White wine vinegar | 80.0 | 80.0 | 80.0 | 80.0 | 80.0 | 80.0 | 80.0 | 80.0 | 80.0 |
| Cabbage paste | 0.0 | 266.3 | 276.0 | 0.0 | 0.0 | 0.0 | 0.0 | 0.0 | 0.0 |
| Onion paste | 0.0 | 40.0 | 40.0 | 0.0 | 307.5 | 0.0 | 0.0 | 0.0 | 0.0 |
| Enoki mushroom powder paste | 0.0 | 0.0 | 10.0 | 0.0 | 0.0 | 0.0 | 153.5 | 307.5 | 0.0 |
| Roasted soybean powder | 67.5 | 67.5 | 65.0 | 36.7 | 67.5 | 67.5 | 67.5 | 67.5 | 33.8 |
| Freeze-dried onion powder | 5.0 | 0.0 | 0.0 | 2.5 | 0.0 | 307.5 | 0.0 | 0.0 | 2.5 |
| Potato powder | 35.0 | 0.0 | 0.0 | 17.5 | 0.0 | 0.0 | 0.0 | 0.0 | 17.5 |
| Mustard powder | 8.0 | 7.0 | 7.0 | 7.0 | 7.0 | 7.0 | 7.0 | 7.0 | 7.0 |
| Canola oil | 323.0 | 323.0 | 323.0 | 323.0 | 323.0 | 323.0 | 323.0 | 323.0 | 323.0 |
| Modal diameter (μm) | 20.17 | 4.625 | 5.500 | 0.344 | 0.688 | 5.500 | 11.00 | 15.56 | 0.446 |
| Water content (% by mass) | 54.7 | 43.3 | 42.1 | 60.2 | 43.0 | 28.0 | 50.9 | 43.0 | 61.2 |
| Total amount of dietary fiber (% by mass) | 1.415 | 1.583 | 1.887 | 0.801 | 1.579 | 5.571 | 6.022 | 11.027 | 0.757 |
| Water-soluble/water-insoluble ratio of dietary fiber | 0.335 | 0.229 | 0.209 | 0.408 | 0.303 | 0.503 | 0.126 | 0.121 | 0.412 |

| Formulation | Comparative Example 24 | Comparative Example 25 | Test Example 44 | Test Example 37 | Test Example 38 | Test Example 45 | Test Example 39 |
|---|---|---|---|---|---|---|---|
| Yield (g) | 1000.0 | 1000.0 | 1000.0 | 1000.0 | 1000.0 | 1000.0 | 1000.0 |
| Water | 200.0 | 40.0 | 200.0 | 519.2 | 150.0 | 120.0 | 200.0 |
| Kelp stock (kelp:water (weight ratio) = 19:1, extraction at 60° C. for 2 hr) | 0.0 | 0.0 | 0.0 | 0.0 | 0.0 | 0.0 | 0.0 |
| Salt | 15.0 | 15.0 | 15.0 | 15.0 | 15.0 | 15.0 | 15.0 |
| White wine vinegar | 80.0 | 80.0 | 80.0 | 80.0 | 80.0 | 80.0 | 80.0 |
| Black Jew's ear powder | 307.5 | 0.0 | 0.0 | 0.0 | 117.5 | 0.0 | 160.5 |
| White Jew's ear powder | 0.0 | 0.0 | 307.5 | 0.0 | 0.0 | 257.5 | 0.0 |
| Shiitake powder | 0.0 | 227.5 | 0.0 | 35.0 | 0.0 | 0.0 | 0.0 |
| Roasted soybean powder | 67.5 | 307.5 | 67.5 | 15.0 | 307.5 | 197.5 | 214.5 |
| Pectin preparation | 0.0 | 0.0 | 0.0 | 5.8 | 0.0 | 0.0 | 0.0 |
| Mustard powder | 7.0 | 7.0 | 7.0 | 7.0 | 7.0 | 7.0 | 7.0 |
| Canola oil | 323.0 | 323.0 | 323.0 | 323.0 | 323.0 | 323.0 | 323.0 |
| Modal diameter (μm) | 88.00 | 33.93 | 74.00 | 31.11 | 80.70 | 40.35 | 67.66 |
| Water content (% by mass) | 28.0 | 12.0 | 28.0 | 59.9 | 23.0 | 20.0 | 28.0 |
| Total amount of dietary fiber (% by mass) | 25.448 | 14.03 | 22.16 | 7.46 | 14.03 | 20.71 | 16.02 |
| Water-soluble/water-insoluble ratio of dietary fiber | 0.090 | 0.113 | 0.102 | 3.900 | 0.117 | 0.109 | 0.105 |

Table 14 shows the results.

TABLE 14

| | Test Example 1-1 | Test Example 2 | Test Example 3 | Test Example 32 | Test Example 33 | Test Example 34 | Test Example 35 | Test Example 36 | Comparative Example 33 |
|---|---|---|---|---|---|---|---|---|---|
| Modal diameter (μm) | 20.17 | 4.63 | 5.50 | 0.34 | 0.69 | 5.50 | 11.00 | 15.56 | 0.45 |
| Water content (% by mass) | 54.7 | 43.3 | 42.1 | 60.2 | 43.0 | 28.0 | 50.9 | 43.0 | 61.2 |
| Total amount of dietary fiber (% by mass) | 1.415 | 1.583 | 1.887 | 0.801 | 1.579 | 5.571 | 6.022 | 11.027 | 0.757 |
| Oil-water separation after freezing at −20° C. and thawing | No | No | No | No | No | No | No | No | No |
| Oil-water separation after heating at 90° C. for 30 minutes | No | No | No | No | No | No | No | No | No |
| Oil-water separation after heating at 100° C. for 20 minutes | No | No | No | No | No | No | No | No | No |
| Oil-water separation after heating at a temperature reaching 180° C. | Yes, infinitesimally | No | No | Yes, slightly | No | No | No | No | Yes |

TABLE 14-continued

| | | | | | | | | |
|---|---|---|---|---|---|---|---|---|
| Overall evaluation (evaluation including remarks) | 4 | 5 | 5 | 3 | 5 | 5 | 5 | 5 | 2 |
| Remarks | 180° C. heat resistance and shape retention properties were slightly low, but acceptable | — | — | 180° C. heat resistance and shape retention properties were slightly low, but acceptable | — | — | — | — | 180° C. heat resistance was low |

| | Comparative Example 24 | Comparative Example 25 | Test Example 44 | Test Example 37 | Test Example 38 | Test Example 45 | Test Example 39 |
|---|---|---|---|---|---|---|---|
| Modal diameter (μm) | 88.00 | 33.93 | 74.00 | 31.11 | 80.70 | 40.35 | 67.66 |
| Water content (% by mass) | 28.0 | 12.0 | 28.0 | 59.9 | 23.0 | 20.0 | 28.0 |
| Total amount of dietary fiber (% by mass) | 25.448 | 14.032 | 22.158 | 7.665 | 14.030 | 20.710 | 16.020 |
| Oil-water separation after freezing at −20° C. and thawing | No | No | No | No | No | No | No |
| Oil-water separation after heating at 90° C. for 30 minutes | No | No | No | No | No | No | No |
| Oil-water separation after heating at 100° C. for 20 minutes | No | No | No | No | No | No | No |
| Oil-water separation after heating at a temperature reaching 180° C. | No | No | No | No | No | No | No |
| Overall evaluation (evaluation including remarks) | 1 | 1 | 3 | 5 | 5 | 4 | 5 |
| Remarks | Physical properties were remarkably hard and dry | Physical properties were remarkably hard and dry | Physical properties were slightly hard, but acceptable | Taste slightly changed presumably due to the combined use with pectin preparation (acceptable) | — | Physical properties were slightly hard, but acceptable | — |

Consequently, the results of Test Examples 1-1, 2, 3, 32 to 39, 44, and 45 showed that when the dietary fiber content was 0.8% by mass or more and 23% or less, the effect of one or more embodiments of the present invention was exhibited without influence on the texture and taste. It was also shown that in terms of the strength of the action and effect, and the physical properties, the dietary fiber content was more preferably 1.4% by mass or more and 21% by mass or less, and even more preferably 1.5% by mass or more and 17% by mass or less. That is, in one or more embodiments of the present invention, the dietary fibers (pectin, alginic acid, glucomannan, inulin, fucoidan, cellulose, hemicellulose, β-glucan, lignin, chitin, etc.) contained in the food materials in the above formulations were assumed to effectively function for the action and effect of one or more embodiments of the present invention. However, Comparative Example 25, which had a water content of less than 20% by mass, Comparative Example 33, which had a dietary fiber content of less than 0.8% by mass, and Comparative Example 24, which had a dietary fiber content of more than 23% by mass, were determined to be unacceptable, from the comprehensive perspective.

In Example 8, mayonnaise or a mayonnaise-like seasoning was selected and evaluated as a representative emulsion seasoning; a tomato-containing sauce containing tomato paste having an emulsifying action was also evaluated in the same manner as in Example 8. Table 15 shows the results. The pulverization treatment was performed to 350 μm or less at the stage of purification of raw materials, and the raw materials were mixed, followed by wet bead mill treatment (one-pass) (the pulverization treatment was performed under a pressurized condition of 0.01M Pa or more). Ingredients (cumin and caraway) were added after pulverization treatment, and then mixed and homogenized.

TABLE 15

| Formulation | Test Example 41 | Test Example 42 | Test Example 43 |
|---|---|---|---|
| Yield (g) | 1000.0 | 1000.0 | 1000.0 |
| Water | 36.0 | 486.0 | 36.0 |
| Salt | 7.8 | 12.4 | 10.3 |
| Olive oil | 82.0 | 65.6 | 74.0 |
| Kelp stock (kelp:water (weight ratio) = 19:1, extraction at 60° C. for 2 hr) | 380.0 | 0.0 | 424.5 |
| Red paprika powder | 100.0 | 72.0 | 90.0 |
| Garlic paste | 50.0 | 40.0 | 45.0 |
| Onion powder | 40.0 | 32.0 | 36.0 |

TABLE 15-continued

| Formulation | Test Example 41 | Test Example 42 | Test Example 43 |
|---|---|---|---|
| Cabbage powder | 0.0 | 30.0 | 0.0 |
| White wine vinegar | 93.0 | 93.0 | 93.0 |
| Tomato paste | 200.0 | 160.0 | 180.0 |
| Cumin (no pulverization treatment: ingredient) | 5.6 | 4.5 | 5.6 |
| Caraway (no pulverization treatment: ingredient) | 5.6 | 4.5 | 5.6 |
| Modal diameter (μm) | 2.750 | 20.17 | 2.999 |
| Total amount of dietary fiber (% by mass) | 2.958 | 2.821 | 2.662 |
| Water-soluble/water-insoluble ratio of dietary fiber | 0.725 | 0.642 | 0.725 |
| Water content (% by mass) | 63.4 | 67.9 | 66.6 |
| Oil-water separation after freezing at −20° C. and thawing | No | No | No |
| Oil-water separation after heating at 90° C. for 30 minutes | No | No | No |
| Oil-water separation after heating at 100° C. for 20 minutes | No | No | No |
| Oil-water separation after heating at a temperature reaching 180° C. | No | No | No |
| Overall evaluation | 5 | 5 | 5 |

The results demonstrated that the action and effect of improving emulsion stability of one or more embodiments of the present invention were also exhibited for the tomato-containing sauce.

[Example 9] Verification of Particle Size for Action and Effect of Improving Emulsion Stability (Modal Diameter, Specific Surface Area, and Maximum Particle Size)

Here, the influence of the particle size on the action and effect of improving emulsion stability of one or more embodiments of the present invention was verified. Samples were prepared in the same manner as in Example 1 according to the formulations in Table 16, and evaluated in the same manner as in Example 7. Table 16 shows the results.

As a comparative control, the tomato-containing sauce of Comparative Example 30 prepared in Example 7 ("Kagome Tomato Ketchup (manufactured by Kagome Co., Ltd.)," provided that 8.2% by mass of olive oil was added because no fats/oils were contained) was used. The particle sizes, such as modal diameter, were measured according to the measurement procedure described in the "Method for measuring the particle size distribution (modal diameter, specific surface area, and maximum particle size)". The dietary fiber content, etc., were measured according to the measurement procedure described in the "modified Prosky method". The water content was measured according to the procedure described in the "measurement method prescribed in the Law Concerning Standardization, etc. of Agricultural and Forestry Products (JAS Law)".

TABLE 16

| | Comparative Example 30 | Test Example 46-1 | Test Example 46-2 | Test Example 46-3 |
|---|---|---|---|---|
| Pulverized particle size (μm or less) during purification of raw materials | No | 350 | 350 | 350 |
| Pulverization treatment Mode (first) | No (hand mixing) | No (hand mixing) | High-pressure homogenizer treatment | High-pressure homogenizer treatment |
| Mode (second) | | | No | Wet bead mill (one-pass) |
| Total amount of dietary fiber (% by mass) | 4.180 | 4.180 | 4.180 | 4.180 |
| Water-soluble/water-insoluble ratio of dietary fiber | 0.500 | 0.500 | 0.500 | 0.500 |
| Water content (% by mass) | 66.0 | 66.0 | 66.0 | 66.0 |
| Modal diameter (μm) | 542.9 | 114.1 | 2.750 | 2.999 |
| Median diameter (d50, μm) | 410.1 | 40.81 | 3.166 | 2.922 |
| Median diameter (d90, μm) | 812.4 | 144.2 | 21.73 | 5.819 |
| Arithmetic standard deviation (μm) | 289.7 | 59.13 | 4.818 | 1.517 |
| Oil-water separation after freezing at −20° C. and thawing | Yes | No | No | No |
| Oil-water separation after heating at 90° C. for 30 minutes | Yes | No | No | No |
| Oil-water separation after heating at 100° C. for 20 minutes | Yes | No | No | No |
| Oil-water separation after heating at a temperature reaching 180° C. | Yes | No | No | No |
| Overall evaluation (including remarks) | 1 | 4 | 5 | 5 |
| Remarks | — | Slight aggregation tendency, but acceptable | — | — |

The results showed that when pulverization treatment was performed during purification of raw materials, the effect of one or more embodiments of the present invention was exhibited even if the subsequent pulverization treatment (wet bead mill treatment) was not performed or performed (Test Examples 46-1 to 46-3). However, as in Comparative Example 30, when pulverization treatment was not performed during purification of raw materials, and the subsequent pulverization treatment was not performed either, the action and effect of one or more embodiments of the present invention were not recognized. Further, the particle size tended to decrease, as the number of times of pulverization treatment increased. It was presumed that the modal diameter would further decrease if pulverization treatment was performed more times for a longer period of time using beads with a smaller particle size (only zirconia beads having a diameter of 2 mm were used here).

Therefore, regarding the relationship between the exhibition of the action and effect of improving emulsion stability of one or more embodiments of the present invention and the particle size, it was assumed that the action and effect of one or more embodiments of the present invention were exhibited when the modal diameter was 0.3 μm or more and 115 μm or less. It was assumed that in terms of production efficiency (affecting the treatment time, number of times, and lower limit), concerns about the safety of nanomaterials (affecting the lower limit), and the action and effect (affecting the upper limit), the modal diameter was more preferably 1.0 μm or more and 100 μm or less, and even more preferably 2.0 μm or more and 50 μm or less.

Example 10

For the mayonnaise-like seasoning prepared in Example 1 (Test Example 1-1), using commercially available mayonnaise (Comparative Example 1, "Kewpie Mayonnaise (manufactured by Kewpie Corporation)"), and two commercially available mayonnaise-like seasonings (Comparative Example 2, "Special soybean mayonnaise using whole soybean powder without using egg (manufactured by Soycom)"), and (Comparative Example 3, "Nisshin Mayodre made without using egg (manufactured by Nisshin Oillio Group)") as controls, the water absorption and oil absorption of each sample were measured and evaluated. Further, the "overall evaluation" was evaluated. The evaluation was conducted by six professional panelists, and their average evaluation value (rounded to the nearest decimal place) was used. The modal diameter was measured according to the measurement procedure described in the "Method for measuring the particle size distribution (modal diameter, specific surface area, and maximum particle size)". The dietary fiber content, etc., were measured according to the measurement procedure described in the "modified Prosky method". The water content was measured according to the procedure described in the "measurement method prescribed in the Law Concerning Standardization, etc. of Agricultural and Forestry Products (JAS Law)". The water absorption and oil absorption were measured according to the procedure described in the "modified method for measuring water absorption of cereal flour". The other items were measured by ordinary analysis methods.

(Evaluation Criterion 12: Overall Evaluation)
5: Superior in oil absorption suitability, water absorption suitability, and emulsion stability
4: Slightly superior in oil absorption suitability, water absorption suitability, and emulsion stability
3: Normal in terms of oil absorption suitability, water absorption suitability, and emulsion stability
2: Slightly inferior in oil absorption suitability, water absorption suitability, and emulsion stability
1: Inferior in oil absorption suitability, water absorption suitability, and emulsion stability FIGS. 8A-B and 9A-B show the measurement results of each sample. Table 17 summarizes the evaluation results extracted from these results.

TABLE 17

| Formulation | Comparative Example 1 | Comparative Example 2 | Comparative Example 3 | Test Example 1-1 |
| --- | --- | --- | --- | --- |
| Emulsion base material | Egg yolk | Soybean | Thickener/modified starch | Soybean |
| Water content (% by mass) | 20.8 | 23.4 | 58.6 | 54.7 |
| Acetic acid content (% by mass) | 0.61 | 0.88 | 0.70 | 0.68 |
| pH | 4.12 | 4.21 | 4.12 | 4.43 |
| Salt content (% by mass) | 1.83 | 1.74 | 2.75 | 1.64 |
| Sugar (% by mass) | 0.0 | 0.0 | 0.0 | 0.0 |
| Lipid content (% by mass) | 74.7 | 61.3 | 34 | 34.0 |
| Viscosity (Pa · s, 20° C.) | 41.3 | 8.72 | 15.48 | 16.72 |
| Dietary fiber (% by mass) | 0.000 | 0.700 | 0.000 | 1.415 |
| Water-soluble/water-insoluble ratio of dietary fiber | 0/0 | 0.127 | 0/0 | 0.335 |
| Modal diameter (μm) | 7.778 | 10.09 | 8.122 | 20.17 |
| Maximum water absorption rate (water absorption rate (% by mass) per gram of sample) after elapse of 2 to 90 minutes | 0.08 | 0.00 | 0.50 | 0.14 |
| Minimum water absorption rate (water absorption rate (% by mass) per gram of sample) after elapse of 2 to 90 minutes | 0.02 | −8.10 | 0.34 | 0.02 |
| Maximum oil absorption rate (oil absorption rate (% by mass) per gram of sample) after elapse of 2 to 90 minutes | 0.48 | 1.12 | 1.04 | 1.08 |

TABLE 17-continued

| Formulation | Comparative Example 1 | Comparative Example 2 | Comparative Example 3 | Test Example 1-1 |
|---|---|---|---|---|
| Minimum oil absorption rate (oil absorption rate (% by mass) per gram of sample) after elapse of 2 to 90 minutes | 0.28 | 0.78 | 0.90 | 0.90 |
| Overall evaluation (evaluation including remarks) | 1 | 1 | 2 | 5 |
| Remarks | Water absorption and oil absorption were both low. | Contents were dissolved into water during evaluation of water absorption (emulsion stability was low). | Artificial viscosity was felt in the oral cavity, and change in taste was felt. Water absorption and oil absorption were both high. | Water absorption was low, but oil absorption was high. |

*The measurement items other than viscosity were measured according to ordinary methods.
*The viscosity was measured using a B-type viscometer (20° C., 30 rpm, manufactured by Tokyo Keiki Inc.).

As a result, in the measurement of water absorption, the contents of the sample of Comparative Example 2 were dissolved into water with the lapse of time, and the water absorption showed a negative value. The contents of the other samples were not dissolved into water; however, the sample containing a thickener (xanthan gum) of Comparative Example 3 showed higher water absorption than the others. Comparative Example 1 and Test Example 1-1 showed low water absorption.

In contrast, in the measurement of oil absorption, the contents of all the samples were not dissolved into oil; however, the sample of Comparative Example 1 showed lower oil absorption than the others.

Taking these results together, Comparative Example 1 showed low water absorption and low oil absorption, Comparative Example 2 showed high oil absorption but low emulsion stability, Comparative Example 3 showed high water absorption and high oil absorption, and Test Example 1-1 showed low water absorption but high oil absorption. That is, high water absorption is not preferable, because the moistness inherent to the target foods, the soft texture associated therewith, and the taste are impaired. In addition, for application or placing on foods with a high oil content (e.g., fried tofu and deep-fried food), the oil absorption of the emulsion seasoning is preferably high, because the oiliness of the target foods is suppressed, and a preferred texture associated therewith and the original flavor of the materials are more likely to be felt. From these points of view, it was shown that only the sample of Test Example 1-1 satisfied the above preferred characteristics, and that the action and effect of improving the texture and flavor of target foods by the emulsion seasoning of one or more embodiments of the present invention were suitably exhibited.

To show objectively the water absorption and oil absorption of Test Example 1-1 above, it was found that the effect of improving the texture and flavor of target foods by the emulsion seasoning of one or more embodiments of the present invention was exhibited when the water absorption rate in a period of 2 minutes to 90 minutes after the start of measurement by the "modified method for measuring water absorption of cereal flour" was 0.20% by mass or less per gram of the emulsion seasoning, and when the oil absorption rate by the same method was within a range of 1.0% by mass or more per gram of the emulsion seasoning.

While the mayonnaise-like seasoning of Test Example 1-1 did not contain egg yolk, but contained an organic acid and a fat/oil, the action and effect of one or more embodiments of the present invention were not correlated with the salt content, sugars, lipid, or viscosity, but was correlated with the dietary fiber content, which was only a prominently high value.

Further, the tomato-containing sauce of Test Example 41 prepared in Example 7 was evaluated in the same manner as described above.

For the prepared tomato-containing sauce (Test Example 41), containing a commercially available tomato-containing sauce, ketchup (Comparative Example 30, "Kagome Tomato Ketchup (manufactured by Kagome Co., Ltd.)," provided that 8.2% by mass of olive oil was added because no fats/oils were contained), and three tomato-containing sauces (Comparative Example 31, "Gudakusan Pizza Sauce (manufactured by Kagome Co., Ltd.)") and (Comparative Example 32, "Pizza Sauce (manufactured by Megmilk Snow Brand Co., Ltd.)") as controls, the water absorption and oil absorption of each sample were measured and evaluated using the "modified method for measuring water absorption of cereal flour" mentioned above. Further, the "overall evaluation" was evaluated. The evaluation was conducted by six professional panelists, and their average evaluation value (rounded to the nearest decimal place) was used.

FIGS. 10A-B and 11A-B show the measurement results of each sample. Table 18 summarizes the evaluation results extracted from these results.

TABLE 18

| | Comparative Example 30 | Comparative Example 31 | Comparative Example 32 | Test Example 41 |
|---|---|---|---|---|
| Emulsion base material | Tomato paste (fat/oil added) | Tomato paste | Tomato paste/ thickener | Tomato paste |
| Water content (% by mass) | 66.0 | 65.8 | 68.3 | 63.4 |
| Salt content (% by mass) | 3.60 | 1.20 | 1.20 | 1.26 |
| Lipid content (% by mass) | 8.2 | 0.5 | 5.4 | 8.2 |
| Total amount of dietary fiber (% by mass) | 4.180 | 0.800 | 1.200 | 2.958 |
| Water-soluble/water-insoluble ratio of dietary fiber | 0.500 | 0.375 | 1.040 | 0.444 |

TABLE 18-continued

|  | Comparative Example 30 | Comparative Example 31 | Comparative Example 32 | Test Example 41 |
| --- | --- | --- | --- | --- |
| Modal diameter (μm) | 542.9 | 296.0 | 271.4 | 2.750 |
| Maximum water absorption rate (water absorption rate (% by mass) per gram of sample) after elapse of 2 to 90 minutes | 0.28 | 0.00 | 0.18 | 0.00 |
| Minimum water absorption rate (water absorption rate (% by mass) per gram of sample) after elapse of 2 to 90 minutes | −0.26 | −2.61 | −0.60 | −0.96 |
| Maximum oil absorption rate (oil absorption rate (% by mass) per gram of sample) after elapse of 2 to 90 minutes | 1.02 | 0.46 | 0.90 | 1.36 |
| Minimum oil absorption rate (oil absorption rate (% by mass) per gram of sample) after elapse of 2 to 90 minutes | 0.20 | −3.08 | −0.36 | 0.16 |
| Overall evaluation (evaluation including remarks) | 2 | 1 | 2 | 4 |
| Remarks | Modal diameter was 542.9 μm, median diameter (d50) was 410.1 μm, median diameter (d90) was 812.4 μm, and arithmetic standard deviation was 289.7 μm; particle size was large. Water absorption was slightly high, and oil absorption was also high. | Water absorption and oil absorption were both low. | Artificial viscosity was felt in the oral cavity, and change in taste was felt. Water absorption was slightly high, and oil absorption was also slightly high. | Water absorption was low, but oil absorption was high. |

As a result, the sample of Comparative Example 31 showed low water absorption and low oil absorption. Next, the sample of Comparative Example 32 containing a thickener (guar gum) showed slightly higher water absorption and slightly higher oil absorption. The sample of Comparative Example 30 showed slightly higher water absorption and higher oil absorption. In contrast to these, the sample of Test Example 41 showed lower water absorption but higher oil absorption.

That is, high water absorption is not preferable, because the moistness inherent to the target foods, the soft texture and the taste associated therewith are impaired. In addition, for application or placing on foods with a high oil content (e.g., fried tofu and deep-fried food), the oil absorption of the emulsion seasoning is preferably high, because the oiliness of the target foods is suppressed, and a preferred texture and the original flavor of the materials associated therewith are more likely to be felt. From these points of view, it was shown that only the sample of Test Example 41 satisfied the above preferred characteristics, and that the action and effect of improving the texture and flavor of target foods by the emulsion seasoning of one or more embodiments of the present invention were suitably exhibited.

To show objectively the water absorption and oil absorption of Test Example 41 above, it was found that the effect of improving the texture and flavor of target foods by the emulsion seasoning of one or more embodiments of the present invention was exhibited when the maximum water absorption rate in a period of 2 minutes to 90 minutes after the start of measurement by the "modified method for measuring water absorption of cereal flour" was 0.20% by mass or less per gram of the emulsion seasoning, and when the maximum oil absorption rate by the same method was within a range of 1.0% by mass or more per gram of the emulsion seasoning.

While the tomato-containing sauce of Test Example 41 used an organic acid and a fat/oil, the quality improvement effect thereof was not correlated with the salt content and lipid. Taking into account the tendency of the characteristics of the other samples, correlation with the dietary fiber content was recognized. However, the ketchup of Comparative Example 30 (to which olive oil was added as described above), which was a tomato-containing sauce, had a remarkably large particle size; presumably for this reason, the action and effect of one or more embodiments of the present invention were not strongly recognized, for its dietary fiber content.

[Example 11] Verification of Influence of Dietary Fiber Content on Effect of Improving Texture and Flavor of Target Foods by Liquid or Semisolid Emulsion Seasoning Here, since the results of Example 10 showed that the dietary fiber content tended to be correlated with the action and effect of one or more embodiments of the present invention, mayonnaise-like seasonings having different dietary fiber contents shown in Table 19 were prepared in the same manner as in Example 1. The modal diameter was measured according to the measurement procedure described in the "Method for measuring the particle size distribution (modal diameter, specific surface area, and maximum particle size)". The dietary fiber content, etc., were measured according to the measurement procedure described in the "modified Prosky method". The water content was measured according to the procedure described in the "measurement method prescribed in the Law Concerning Standardization, etc. of Agricultural and Forestry Products (JAS Law)".

TABLE 19

| Formulation | Test Example 1-1 | Test Example 2 | Test Example 3 | Comparative Example 33 | Test Example 33 | Test Example 34 | Test Example 35 | Test Example 36 |
|---|---|---|---|---|---|---|---|---|
| Yield (g) | 1000.0 | 1000.0 | 1000.0 | 1000.0 | 1000.0 | 1000.0 | 1000.0 | 1000.0 |
| Water | 0.0 | 200.0 | 182.8 | 0.0 | 200.0 | 200.0 | 354.0 | 200.0 |
| Kelp stock (kelp:water (weight ratio) = 19:1, extraction at 60° C. for 2 hr) | 467.0 | 0.0 | 0.0 | 521.7 | 0.0 | 0.0 | 0.0 | 0.0 |
| Salt | 14.5 | 16.2 | 16.2 | 14.5 | 15.0 | 15.0 | 15.0 | 15.0 |
| White wine vinegar | 80.0 | 80.0 | 80.0 | 80.0 | 80.0 | 80.0 | 80.0 | 80.0 |
| Cabbage paste | 0.0 | 266.3 | 276.0 | 0.0 | 0.0 | 0.0 | 0.0 | 0.0 |
| Onion paste | 0.0 | 40.0 | 40.0 | 0.0 | 307.5 | 0.0 | 0.0 | 0.0 |
| Enoki mushroom powder paste | 0.0 | 0.0 | 10.0 | 0.0 | 0.0 | 0.0 | 153.5 | 307.5 |
| Roasted soybean powder | 67.5 | 67.5 | 65.0 | 33.8 | 67.5 | 67.5 | 67.5 | 67.5 |
| Freeze-dried onion powder | 5.0 | 0.0 | 0.0 | 2.5 | 0.0 | 307.5 | 0.0 | 0.0 |
| Potato powder | 35.0 | 0.0 | 0.0 | 17.5 | 0.0 | 0.0 | 0.0 | 0.0 |
| Mustard powder | 8.0 | 7.0 | 7.0 | 7.0 | 7.0 | 7.0 | 7.0 | 7.0 |
| Canola oil | 323.0 | 323.0 | 323.0 | 323.0 | 323.0 | 323.0 | 323.0 | 323.0 |
| Modal diameter (μm) | 20.17 | 4.625 | 5.500 | 0.446 | 0.688 | 5.500 | 11.00 | 15.56 |
| Water content (% by mass) | 54.7 | 43.3 | 42.1 | 61.2 | 43.0 | 28.0 | 50.9 | 43.0 |
| Total amount of dietary fiber (% by mass) | 1.415 | 1.583 | 1.887 | 0.757 | 1.579 | 5.571 | 6.022 | 11.027 |
| Water-soluble/water-insoluble ratio of dietary fiber | 0.335 | 0.229 | 0.209 | 0.412 | 0.303 | 0.503 | 0.126 | 0.121 |

| Formulation | Comparative Example 24 | Comparative Example 25 | Test Example 44 | Test Example 37 | Test Example 38 | Test Example 45 | Test Example 39 |
|---|---|---|---|---|---|---|---|
| Yield (g) | 1000.0 | 1000.0 | 1000.0 | 1000.0 | 1000.0 | 1000.0 | 1000.0 |
| Water | 200.0 | 40.0 | 200.0 | 519.2 | 150.0 | 120.0 | 200.0 |
| Kelp stack (kelp:water (weight ratio) = 19:1, extraction at 60° C. for 2 hr) | 0.0 | 0.0 | 0.0 | 0.0 | 0.0 | 0.0 | 0.0 |
| Salt | 15.0 | 15.0 | 15.0 | 15.0 | 15.0 | 15.0 | 15.0 |
| White wine vinegar | 80.0 | 80.0 | 80.0 | 80.0 | 80.0 | 80.0 | 80.0 |
| Black Jew's ear powder | 307.5 | 0.0 | 0.0 | 0.0 | 117.5 | 0.0 | 160.5 |
| White Jew's ear powder | 0.0 | 0.0 | 307.5 | 0.0 | 0.0 | 257.5 | 0.0 |
| Shiitake powder | 0.0 | 227.5 | 0.0 | 35.0 | 0.0 | 0.0 | 0.0 |
| Roasted soybean powder | 67.5 | 307.5 | 67.5 | 15.0 | 307.5 | 197.5 | 214.5 |
| Pectin preparation | 0.0 | 0.0 | 0.0 | 5.8 | 0.0 | 0.0 | 0.0 |
| Mustard powder | 7.0 | 7.0 | 7.0 | 7.0 | 7.0 | 7.0 | 7.0 |
| Canola oil | 323.0 | 323.0 | 323.0 | 323.0 | 323.0 | 323.0 | 323.0 |
| Modal diameter (μm) | 88.00 | 33.93 | 74.00 | 31.11 | 80.70 | 40.35 | 67.66 |
| Water content (% by mass) | 28.0 | 12.0 | 28.0 | 59.9 | 23.0 | 20.0 | 28.0 |
| Total amount of dietary fiber (% by mass) | 25.448 | 14.03 | 22.16 | 7.46 | 14.03 | 20.71 | 16.02 |
| Water-soluble/water-insoluble ratio of dietary fiber | 0.090 | 0.113 | 0.102 | 3.900 | 0.117 | 0.109 | 0.105 |

The influence of each sample on the texture and taste of target foods (raw vegetable salad was selected as a representative example of foods with a high water content, and pork cutlet was selected as a representative example of foods with a high oil content) was evaluated based on the following evaluation criteria 13 and 14, and the evaluation criterion 12 of Example 10. The evaluation was conducted by six professional panelists, and their average evaluation value (rounded to the nearest decimal place) was used. Table 20 shows the results.

(Evaluation Criterion 13: Influence of the Emulsion Seasoning on the Texture and Taste of Salad)

5: Particularly superior in the moistness inherent to the target food, the soft texture and the taste associated therewith.
4: Slightly superior in the moistness inherent to the target food, the soft texture and the taste associated therewith.
3: Normal in terms of the moistness inherent to the target food, the soft texture and the taste associated therewith.
2: Slightly inferior in the moistness inherent to the target food, the soft texture and the taste associated therewith.
1: Inferior in the moistness inherent to the target food, the soft texture and the taste associated therewith.

(Evaluation Criterion 14: Influence of the Emulsion Seasoning on the Texture and Taste of Pork Cutlet)

5: Particularly superior in the crispy texture of the target food, and the texture and taste inherent to the ingredients.
4: Slightly superior in the crispy texture of the target food, and the texture and taste inherent to the ingredients.
3: Normal in terms of the crispy texture of the target food, and the texture and taste inherent to the ingredients.
2: Slightly inferior in the crispy texture of the target food, and the texture and taste inherent to the ingredients.
1: Inferior in the crispy texture of the target food, and the texture and taste inherent to the ingredients.

TABLE 20

|  | Test Example 1-1 | Test Example 2 | Test Example 3 | Comparative Example 33 | Test Example 33 | Test Example 34 | Test Example 35 | Test Example 36 |
|---|---|---|---|---|---|---|---|---|
| Modal diameter (μm) | 20.17 | 4.63 | 2.53 | 0.45 | 0.69 | 5.50 | 11.00 | 15.56 |
| Water content (% by mass) | 54.7 | 43.3 | 42.6 | 61.2 | 43.0 | 28.0 | 50.9 | 43.0 |
| Total amount of dietary fiber (% by mass) | 1.415 | 1.583 | 1.887 | 0.757 | 1.579 | 5.571 | 6.022 | 11.027 |
| Texture and taste of raw vegetable | 4 | 5 | 5 | 4 | 5 | 5 | 5 | 5 |
| Texture and taste of pork cutlet | 5 | 5 | 5 | 4 | 5 | 5 | 5 | 5 |
| Overall evaluation (evaluation including remarks) | 4 | 5 | 5 | 3 | 5 | 5 | 5 | 5 |
| Remarks | The water content of the emulsion seasoning was slightly high, and a small amount of water was added to the target food, but influence on the texture and taste was small | — | — | The water content of the emulsion seasoning was slightly high, and a small amount of water was added to the target food, but acceptable | — | — | — | — |

|  | Comparative Example 24 | Comparative Example 25 | Test Example 44 | Test Example 37 | Test Example 38 | Test Example 45 | Test Example 39 |
|---|---|---|---|---|---|---|---|
| Modal diameter (μm) | 88.00 | 33.93 | 74.00 | 31.11 | 80.70 | 40.35 | 67.66 |
| Water content (% by mass) | 28.0 | 12.0 | 28.0 | 59.9 | 23.0 | 20.0 | 28.0 |
| Total amount of dietary fiber (% by mass) | 25.448 | 14.032 | 22.158 | 7.461 | 14.030 | 20.710 | 16.020 |
| Texture and taste of raw vegetable | 3 | 3 | 4 | 5 | 5 | 4 | 5 |
| Texture and taste of pork cutlet | 3 | 3 | 4 | 5 | 5 | 4 | 5 |
| Overall evaluation (evaluation including remarks) | 1 | 1 | 3 | 5 | 5 | 3 | 4 |
| Remarks | The physical properties of the emulsion seasoning were remarkably hard, and miscibility with the target food was poor | The physical properties of the emulsion seasoning were remarkably hard, and miscibility with the target food was poor | The physical properties of the emulsion seasoning were slightly hard, but miscibility with the target food was acceptable | Taste slightly changed presumably due to the combined use with a pectin preparation (acceptable) | — | The physical properties of the emulsion seasoning were slightly hard, but miscibility with the target food was acceptable | The physical properties of the emulsion seasoning were slightly hard, but miscibility with the target food was not so bad. |

Consequently, the results of Test Examples 1-1, 2, 3, 33 to 39, 44, and 45 showed that the effect of one or more embodiments of the present invention was exhibited when the dietary fiber content was 0.8% by mass or more and 23% or less. It was found that, in terms of the strength of the action and effect, miscibility with the target foods due to the physical properties of the liquid or semisolid emulsion seasoning, and influence, the dietary fiber content was more preferably 1.4% by mass or more and 17% by mass or less, and even more preferably 1.5% by mass or more and 15% by mass or less.

In Example 11, a mayonnaise-like seasoning was selected and evaluated as a representative emulsion seasoning; for tomato-containing sauces containing a tomato paste having an emulsifying action, various tomato-containing sauces shown in Table 21 were prepared in the same manner as in Examples 41 to 43.

TABLE 21

| Formulation | Test Example 41 | Test Example 42 | Test Example 43 |
|---|---|---|---|
| Yield (g) | 1000.0 | 1000.0 | 1000.0 |
| Water | 36.0 | 486.0 | 36.0 |
| Salt | 7.8 | 12.4 | 10.3 |
| Olive oil | 82.0 | 65.6 | 74.0 |
| Kelp stock (kelp:water (weight ratio) = 19:1, extraction at 60° C. for 2 hr) | 380.0 | 0.0 | 424.5 |

TABLE 21-continued

| Formulation | Test Example 41 | Test Example 42 | Test Example 43 |
|---|---|---|---|
| Red paprika powder | 100.0 | 72.0 | 90.0 |
| Garlic paste | 50.0 | 40.0 | 45.0 |
| Onion powder | 40.0 | 32.0 | 36.0 |
| Cabbage powder | 0.0 | 30.0 | 0.0 |
| White wine vinegar | 93.0 | 93.0 | 93.0 |
| Tomato paste | 200.0 | 160.0 | 180.0 |
| Cumin (no pulverization treatment: ingredient) | 5.6 | 4.5 | 5.6 |
| Caraway (no pulverization treatment: ingredient) | 5.6 | 4.5 | 5.6 |
| Modal diameter (μm) | 2.750 | 20.17 | 2.999 |
| Total amount of dietary fiber (% by mass) | 2.958 | 2.821 | 2.662 |
| Water-soluble/water-insoluble ratio of dietary fiber | 0.725 | 0.642 | 0.725 |
| Water content (% by mass) | 63.4 | 67.9 | 66.6 |

The influence of each sample on the texture and taste of target foods (raw vegetable salad was selected as a representative example of foods with a high water content, and pork cutlet was selected as a representative example of foods with a high oil content) was evaluated based on the above-mentioned evaluation criteria 13 and 14, and the evaluation criterion 12 of Example 10. The evaluation was conducted by six professional panelists, and their average evaluation value (rounded to the nearest decimal place) was used. Table 22 shows the results.

TABLE 22

| Formulation | Test Example 41 | Test Example 42 | Test Example 43 |
|---|---|---|---|
| Modal diameter (μm) | 2.750 | 20.17 | 2.999 |
| Total amount of dietary fiber (% by mass) | 2.958 | 2.821 | 2.662 |
| Water content (% by mass) | 63.4 | 67.9 | 66.6 |
| Texture and taste of raw vegetable | 4 | 4 | 4 |
| Texture and taste of pork cutlet | 5 | 4 | 5 |
| Overall evaluation (evaluation including remarks) | 4 | 4 | 4 |
| Remarks | The water content of the emulsion seasoning was slightly high, and a small amount of water was added to the target food, but influence on the texture and taste was small. | The water content of the emulsion seasoning was slightly high, and a small amount of water was added to the target food, but acceptable. | The water content of the emulsion seasoning was slightly high, and a small amount of water was added to the target food, but influence on the texture and taste was small. |

The results demonstrated that the action and effect of improving the texture and flavor of target foods by the emulsion seasoning of one or more embodiments of the present invention were also exhibited for the tomato-containing sauces.

[Example 12] Verification of Influence of Particle Size on Action and Effect of Improving Texture and Flavor of Target Foods by Emulsion Seasoning (Modal Diameter, Specific Surface Area, and Maximum Particle Size)

Here, the influence of the particle size on the action and effect of one or more embodiments of the present invention was verified. Various samples were prepared based on the formulations in Table 15 of Example 8. As a comparative control, a tomato-containing sauce, ketchup (Comparative Example 30, "Kagome Tomato Ketchup (manufactured by Kagome Co., Ltd.)," provided that 8.2% by mass of olive oil was added because no fats/oils were contained) was used. The particle sizes, such as modal diameter, were measured according to the measurement procedure described in the "Method for measuring the particle size distribution (modal diameter, specific surface area, and maximum particle size)". The dietary fiber content, etc., were measured according to the measurement procedure described in the "modified Prosky method". The water content was measured according to the procedure described in the "measurement method prescribed in the Law Concerning Standardization, etc. of Agricultural and Forestry Products (JAS Law)".

Therefore, regarding the relationship between the exhibition of the action and effect of improving the texture and flavor of target foods by the emulsion seasoning of one or more embodiments of the present invention and the particle size, it was assumed that the action and effect of one or more

TABLE 23

|  | Comparative Example 30 | Test Example 46-1 | Test Example 46-2 | Test Example 46-3 |
|---|---|---|---|---|
| Pulverized particle size (μm or less) during purification of raw materials | No | 350 | 350 | 350 |
| Pulverization treatment   Mode (first) | No (hand mixing) | No (hand mixing) | High-pressure homogenizer treatment | High-pressure homogenizer treatment |
| Mode (second) |  |  | No | Wet bead mill (one-pass) |
| Total amount of dietary fiber (% by mass) | 4.180 | 4.180 | 4.180 | 4.180 |
| Water-soluble/water-insoluble ratio of dietary fiber | 0.500 | 0.500 | 0.500 | 0.500 |
| Water content (% by mass) | 66.0 | 66.0 | 66.0 | 66.0 |
| Modal diameter (μm) | 542.9 | 114.1 | 2.750 | 2.999 |
| Median diameter (d50, μm) | 410.1 | 40.81 | 3.166 | 2.922 |
| Median diameter (d90, μm) | 812.4 | 144.2 | 21.73 | 5.819 |
| Arithmetic standard deviation (μm) | 289.7 | 59.13 | 4.818 | 1.517 |

The influence of each sample on the texture and taste of target foods (raw vegetable salad was selected as a representative example of foods with a high water content, and pork cutlet was selected as a representative example of foods with a high oil content) was evaluated in the same manner as in Example 11. The evaluation was conducted by six professional panelists, and their average evaluation value (rounded to the nearest decimal place) was used. Table 24 shows the results.

embodiments of the present invention were exhibited when the modal diameter was 0.3 μm or more and 115 μm or less. In terms of production efficiency (affecting the treatment time, number of times, and lower limit), concerns about the safety of nanomaterials (affecting the lower limit), and the action and effect (affecting the upper limit), it was assumed that the modal diameter was more preferably 1.0 μm or more and 100 μm or less, and even more preferably 2.0 μm or more and 50 μm or less.

TABLE 24

|  | Comparative Example 30 | Test Example 46-1 | Test Example 46-2 | Test Example 46-3 |
|---|---|---|---|---|
| Total amount of dietary fiber (% by mass) | 4.180 | 4.180 | 4.180 | 4.180 |
| Water content (% by mass) | 66.0 | 66.0 | 66.0 | 66.0 |
| Modal diameter (μm) | 542.9 | 114.1 | 2.750 | 2.999 |
| Texture and taste of raw vegetable | 2 | 4 | 4 | 4 |
| Texture and taste of pork cutlet | 2 | 4 | 5 | 5 |
| Overall evaluation (evaluation including remarks) | 1 | 4 | 5 | 5 |
| Remarks | Low emulsion stability. A large amount of water was added to the target food. These affected the texture and taste. | The water content of the emulsion seasoning was slightly high, and a small amount of water was added to the target food, but acceptable. | The water content of the emulsion seasoning was slightly high, and a small amount of water was added to the target food, but influence on the texture and taste was small. | The water content of the emulsion seasoning was slightly high, and a small amount of water was added to the target food, but influence on the texture and taste was small. |

The results showed that when pulverization treatment was performed during purification of raw materials, the effect of one or more embodiments of the present invention was exhibited regardless of the subsequent pulverization treatment (wet bead mill treatment) (Test Examples 46-1 to 46-3). As in Comparative Example 30, when neither pulverization treatment nor the subsequent pulverization treatment was performed during purification of raw materials, the action and effect of one or more embodiments of the present invention were not recognized. Further, the particle size tended to decrease, as the number of times of pulverization treatment increased. It was presumed that the modal diameter would further decrease if pulverization treatment was performed more times for a longer period of time using beads with a smaller particle size (only zirconia beads having a diameter of 2 mm were used here).

[Example 13] Verification of Effects by Seeds, Etc.

Here, the presence or absence of the various effects described above in emulsion seasonings according to formulations using seeds, etc. was verified.

Samples were prepared in the same manner as in Example 1 according to the formulations shown in Table 25. The pulverization treatment was performed to 350 μm or less at the stage of purification of raw materials, and the raw materials were mixed, followed by high-pressure homogenizer treatment (the pulverization treatment was performed under a pressurized condition of 0.01 MPa or more). The modal diameter was measured according to the measurement procedure described in the "Method for measuring the particle size distribution (modal diameter, specific surface area, and maximum particle size)". The dietary fiber content, etc., were measured according to the measurement procedure described in the "modified Prosky method". The water content was measured according to the procedure described in the "measurement method prescribed in the Law Concerning Standardization, etc. of Agricultural and Forestry Products (JAS Law)". The evaluation was conducted in the same manner as in Examples 2, 7, and 11. The evaluation was conducted by six professional panelists, and their average evaluation value (rounded to the nearest decimal place) was used. Table 25 shows the results.

addition, the texture-improving effect, the effect of enhancing emulsion stability and shape retention properties (oil-water separation resistance), and the effect of improving the taste of target foods were confirmed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

TABLE 25

| Formulation | | Test Example 34 | Test Example 47 | Test Example 48 | Test Example 49 |
|---|---|---|---|---|---|
| Yield (g) | | 1000.0 | 1000.0 | 1000.0 | 1000.0 |
| Water | | 200.0 | 200.0 | 200.0 | 0.0 |
| Kelp stock (kelp:water (weight ratio) = 19:1, extraction at 60° C. for 2 hr) | | 0.0 | 0.0 | 0.0 | 0.0 |
| Salt | | 15.0 | 15.0 | 15.0 | 15.0 |
| White wine vinegar | | 80.0 | 70.0 | 78.0 | 78.0 |
| Cabbage paste | | 0.0 | 0.0 | 0.0 | 0.0 |
| Onion paste | | 0.0 | 0.0 | 0.0 | 0.0 |
| Enoki mushroom powder paste | | 0.0 | 0.0 | 0.0 | 0.0 |
| Roasted soybean powder | | 67.5 | 67.5 | 0.0 | 0.0 |
| Roasted almond powder | | 0.0 | 0.0 | 67.5 | 67.5 |
| Amazake (rice liquefied by enzyme treatment) | | 0.0 | 0.0 | 0.0 | 200.0 |
| Freeze-dried onion powder | | 307.5 | 307.5 | 307.5 | 307.5 |
| Potato powder | | 0.0 | 0.0 | 0.0 | 0.0 |
| Mustard powder | | 7.0 | 7.0 | 7.0 | 7.0 |
| Canola oil | | 323.0 | 323.0 | 323.0 | 323.0 |
| Lemon juice | | 0.0 | 10.0 | 0.0 | 0.0 |
| Citric acid | | 0.0 | 0.0 | 2.0 | 2.0 |
| Modal diameter (μm) | | 5.500 | 5.500 | 7.723 | 6.504 |
| Water content (% by mass) | | 28.0 | 28.0 | 28.0 | 26.4 |
| Total amount of dietary fiber (% by mass) | | 5.571 | 5.571 | 4.431 | 4.231 |
| Water-soluble/water-insoluble ratio of dietary fiber | | 0.503 | 0.503 | 0.434 | 0.467 |
| Effect of improving flavor and texture | Stimulation by sour taste and sour odor | 5 | 5 | 5 | 5 |
| | Unpleasant flavor of soybean or almond | 5 | 5 | 5 | 5 |
| | Unpleasant flavor derived from fat/oil | 5 | 5 | 5 | 5 |
| | Physical properties | 5 | 5 | 5 | 5 |
| | Overall evaluation | 5 | 5 | 5 | 5 |
| Emulsion stability, shape retention properties (oil-water separation resistance) | Oil-water separation after freezing at −20° C. and thawing | No | No | No | No |
| | Oil-water separation after heating at 90° C. for 30 minutes | No | No | No | No |
| | Oil-water separation after heating at 100° C. for 20 minutes | No | No | No | No |
| | Oil-water separation after heating at a temperature reaching 180° C. | No | No | No | No |
| | Overall evaluation | 5 | 5 | 5 | 5 |
| Effect of improving taste of target food | Texture and taste of raw vegetable | 5 | 5 | 5 | 5 |
| | Texture and taste of pork cutlet | 5 | 5 | 5 | 5 |
| | Overall evaluation | 5 | 5 | 5 | 5 |

As a result of test verification using roasted almond powder (roasted almonds processed into a powder form) or amazake (rice liquefied by enzyme treatment according to an ordinary method), in place of roasted soybean powder, the flavor-improving effect was confirmed, as with the case of using roasted soybean powder, such that unpleasant flavors (taste and odor) derived from the organic acid, food-derived emulsifier, and fat/oil were suppressed at the same time, without killing the preferred taste and aroma of flavor materials, and such that the preferred taste and aroma inherent to the flavor materials were sufficiently felt. In

What is claimed is:

1. A liquid or semisolid emulsion seasoning, comprising:
fine food particles comprising dietary fibers;
a fat or oil;
an organic acid; and
a food-derived emulsifier,
wherein:
the dietary fibers include a water-soluble dietary fiber and a water-insoluble dietary fiber,
the emulsion seasoning contains the dietary fibers in a total amount of 0.8% to 23% by mass, the food-derived emulsifier is derived from one or more selected from the group consisting of egg yolk, beans, seeds, and tomato paste, the fine food particles have a modal diameter of 0.3 μm to 115 μm, the emulsion seasoning has a water content of 20% by mass or more, and a viscosity of the emulsion seasoning ranges from 4.86 Pa·s to 16.72 Pa·s.

2. The emulsion seasoning according to claim 1, wherein a content mass ratio of the water-soluble dietary fiber to the water-insoluble dietary fiber is 0.1 to 4.

3. The emulsion seasoning according to claim 1, wherein the water-soluble dietary fiber is one or more selected from the group consisting of pectin, alginic acid, glucomannan, inulin, and fucoidan; and wherein the water-insoluble dietary fiber is one or more selected from the group consisting of cellulose, hemi cellulose, β-glucan, lignin, and chitin.

4. The emulsion seasoning according to claim 1, wherein the dietary fibers are derived from plant raw materials.

5. The emulsion seasoning according to claim 1, wherein the beans are one or more selected from the group consisting of soybeans, lentils, and chickpeas.

6. The emulsion seasoning according to claim 1, wherein the seeds are almonds.

7. The emulsion seasoning according to claim 1, further comprising a vegetable.

8. The emulsion seasoning according to claim 1, further comprising one or more selected from the group consisting of grains, potatoes, mushrooms, and algae.

9. The emulsion seasoning according to claim 1, wherein the organic acid comprises acetic acid.

10. The emulsion seasoning according to claim 1, wherein a maximum water absorption rate of the emulsion seasoning is 0.20% by mass or less per gram of the emulsion seasoning, and wherein a maximum oil absorption rate of the emulsion seasoning is 1.0% by mass or more per gram of the emulsion seasoning.

\* \* \* \* \*